United States Patent
Hamada

(10) Patent No.: US 10,671,837 B2
(45) Date of Patent: Jun. 2, 2020

(54) FACE RECOGNITION SYSTEM, FACE RECOGNITION METHOD, DISPLAY CONTROL APPARATUS, DISPLAY CONTROL METHOD, AND DISPLAY CONTROL PROGRAM

(71) Applicant: NEC CORPORATION, Tokyo (JP)

(72) Inventor: Yasushi Hamada, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 139 days.

(21) Appl. No.: 15/758,185

(22) PCT Filed: Jun. 6, 2016

(86) PCT No.: PCT/JP2016/066778
§ 371 (c)(1),
(2) Date: Mar. 7, 2018

(87) PCT Pub. No.: WO2017/043132
PCT Pub. Date: Mar. 16, 2017

(65) Prior Publication Data
US 2018/0239954 A1    Aug. 23, 2018

(30) Foreign Application Priority Data

Sep. 8, 2015    (JP) ................................. 2015-176534

(51) Int. Cl.
*G06K 9/00*    (2006.01)
*G06F 16/50*    (2019.01)
(Continued)

(52) U.S. Cl.
CPC ......... *G06K 9/00281* (2013.01); *G06F 16/50* (2019.01); *G06F 16/583* (2019.01);
(Continued)

(58) Field of Classification Search
CPC .......... G06K 9/00281; G06K 9/00234; G06K 9/00248; G06T 7/11; G06T 7/00;
(Continued)

(56) References Cited

U.S. PATENT DOCUMENTS 7,158,657 B2 *   1/2007  Okazaki ............. G06K 9/00221
                                                    382/118
8,073,287 B1 *  12/2011  Wechsler ............... G06K 9/746
                                                    359/306
(Continued)

FOREIGN PATENT DOCUMENTS

JP    9-91432 A    4/1997
JP    11-085907 A    3/1999
(Continued)

OTHER PUBLICATIONS

Communication dated Dec. 20, 2018, from Japanese Patent Office in counterpart application No. 2017-223709.

(Continued)

*Primary Examiner* — Mia M Thomas
(74) *Attorney, Agent, or Firm* — Sughrue Mion, PLLC

(57) ABSTRACT

There is provided a display control apparatus that allows an operator to grasp a factor leading a face recognition result at a glance and to confirm or modify the face recognition result on the spot. The display control apparatus comprises a similarity acquirer that acquires a similarity between each pair of partial regions of face images by performing collation processing between the each pair of partial regions of the face images, and a display controller that controls to overlay, on the face images, at least one of a first region the similarity of which exceeds a threshold and a second region the similarity of which does not exceed the threshold, and display the overlaid face images. The display controller (Continued)

controls to overlay and display the first region and the second region in contrast with each other on the face images.

12 Claims, 48 Drawing Sheets

(51) Int. Cl.
| | |
|---|---|
| *G08B 13/196* | (2006.01) |
| *H04N 7/18* | (2006.01) |
| *G06F 16/583* | (2019.01) |
| *G06T 7/11* | (2017.01) |
| *G06T 7/00* | (2017.01) |
| *G08B 25/00* | (2006.01) |

(52) U.S. Cl.
CPC ..... *G06K 9/00234* (2013.01); *G06K 9/00248* (2013.01); *G06T 7/00* (2013.01); *G06T 7/11* (2017.01); *G08B 13/196* (2013.01); *G08B 25/00* (2013.01); *H04N 7/18* (2013.01); *H04N 7/181* (2013.01); *G06T 2207/30201* (2013.01)

(58) Field of Classification Search
CPC ..... G06F 16/583; G06F 16/50; G08B 13/196; G08B 25/00; H04N 7/18; H04N 7/181
See application file for complete search history.

(56) References Cited

U.S. PATENT DOCUMENTS

| | | | | |
|---|---|---|---|---|
| 8,457,367 | B1* | 6/2013 | Sipe | G06K 9/00335 |
| | | | | 382/118 |
| 9,691,152 | B1* | 6/2017 | Borenstein | H04N 5/23219 |
| 9,792,695 | B2* | 10/2017 | Sasaki | G06K 9/4671 |
| 10,169,646 | B2* | 1/2019 | Ganong | G06K 9/00677 |
| 2001/0033702 | A1* | 10/2001 | Kawabata | G06K 9/6203 |
| | | | | 382/294 |
| 2002/0017661 | A1 | 2/2002 | Shinohara | |
| 2002/0176610 | A1 | 11/2002 | Okazaki et al. | |
| 2005/0232482 | A1 | 10/2005 | Ikeda et al. | |
| 2006/0056667 | A1 | 3/2006 | Waters | |
| 2008/0219517 | A1 | 9/2008 | Blonk et al. | |
| 2009/0273667 | A1* | 11/2009 | Nozaki | H04N 5/232 |
| | | | | 348/77 |
| 2010/0080489 | A1* | 4/2010 | Chen | G06K 9/00214 |
| | | | | 382/285 |
| 2011/0317872 | A1* | 12/2011 | Free | G06K 9/00228 |
| | | | | 382/103 |
| 2012/0120269 | A1 | 5/2012 | Capata et al. | |
| 2012/0120283 | A1 | 5/2012 | Capata et al. | |
| 2012/0162242 | A1* | 6/2012 | Amano | G06F 3/04886 |
| | | | | 345/592 |
| 2012/0223956 | A1* | 9/2012 | Saito | A45D 44/005 |
| | | | | 345/582 |
| 2012/0260307 | A1* | 10/2012 | Sambamurthy | G06F 21/554 |
| | | | | 726/1 |
| 2014/0016823 | A1* | 1/2014 | Ye | G06T 19/20 |
| | | | | 382/103 |
| 2014/0016837 | A1* | 1/2014 | Nechyba | G06K 9/00906 |
| | | | | 382/118 |
| 2014/0140624 | A1 | 5/2014 | Kasahara et al. | |
| 2014/0153832 | A1* | 6/2014 | Kwatra | G06T 11/00 |
| | | | | 382/195 |
| 2014/0376772 | A1 | 12/2014 | Lin et al. | |
| 2015/0145882 | A1* | 5/2015 | Nguyen | H04N 1/622 |
| | | | | 345/589 |
| 2015/0189177 | A1 | 7/2015 | Matsushima et al. | |
| 2015/0324632 | A1 | 11/2015 | Whitehill et al. | |
| 2016/0019417 | A1* | 1/2016 | Kobayashi | G06F 3/04842 |
| | | | | 382/118 |
| 2016/0028939 | A1 | 1/2016 | Ogawa | |
| 2016/0034748 | A1 | 2/2016 | Wang et al. | |
| 2016/0191822 | A1* | 6/2016 | Kosugou | H04N 5/23219 |
| | | | | 382/118 |
| 2016/0224825 | A1* | 8/2016 | Tomita | G06K 9/00268 |
| 2016/0364626 | A1 | 12/2016 | Sasaki | |
| 2017/0032443 | A1* | 2/2017 | Nakashima | G06Q 30/0282 |
| 2017/0235848 | A1* | 8/2017 | Van Dusen | H04L 41/04 |
| | | | | 705/12 |
| 2017/0249670 | A1* | 8/2017 | Awad | G06Q 30/0254 |
| 2018/0024633 | A1* | 1/2018 | Lo | G06F 3/0482 |
| | | | | 345/156 |
| 2018/0046855 | A1 | 2/2018 | Ganong et al. | |
| 2018/0082107 | A1 | 3/2018 | Li et al. | |
| 2018/0189581 | A1 | 7/2018 | Turcot et al. | |

FOREIGN PATENT DOCUMENTS

| | | |
|---|---|---|
| JP | 2003099763 A | 4/2003 |
| JP | 2004-272357 A | 9/2004 |
| JP | 2005-78413 A | 3/2005 |
| JP | 2005-078590 A | 3/2005 |
| JP | 2006-053608 A | 2/2006 |
| JP | 2010-146581 A | 7/2010 |
| JP | 2012-212969 A | 11/2012 |
| JP | 2013-196294 A | 9/2013 |
| JP | 2013-242702 A | 12/2013 |
| JP | 2014-11523 A | 1/2014 |
| JP | 2014-59819 A | 4/2014 |
| JP | 2014-186496 A | 10/2014 |

OTHER PUBLICATIONS

Nagamine et al., "Analysis of 3D Facial Image Distinctive Features," Technical Report of Information Processing Society, vol. 91, No. 111, Dec. 20, 1991, pp. 57-64.

International Search Report of PCT/JP2016/066778, dated Jun. 28, 2016.

Office Action dated Mar. 5, 2020 in U.S. Appl. No. 16/129,275.

Office Action dated Mar. 6, 2020 in U.S. Appl. No. 16/129,342.

* cited by examiner

FIG. 6

| FACE RECOGNITION ID 601 | CAPTURED IMAGE ID 602 | ACCUMULATED IMAGE ID 603 | FACE RECOGNITION RESULT 604 | OVERLAYING IMAGE FLAG 605 | ... |
|---|---|---|---|---|---|
| | | | | | |
| | | | | | |
| | | | | | |
| ... | | | | | |

503

| MARK ID | SHAPE | BASIC IMAGE DATA | | | CHANGE DEPENDING ON SIMILARITY |
|---|---|---|---|---|---|
| | | SIZE | COLOR | DENSITY | |
| M001 | ○ | | | | SIMILARITY OVER THRESHOLD → SIZE CORRESPONDING TO (SIMILARITY - THRESHOLD) <br> SIMILARITY NOT OVER THRESHOLD → SIZE CORRESPONDING TO (THRESHOLD - SIMILARITY) |
| M002 | □ | | | | SIMILARITY OVER THRESHOLD → SIZE CORRESPONDING TO (SIMILARITY - THRESHOLD) <br> SIMILARITY NOT OVER THRESHOLD → SIZE CORRESPONDING TO (THRESHOLD - SIMILARITY) |
| M003 | △ | | | | SIMILARITY OVER THRESHOLD → SIZE CORRESPONDING TO (SIMILARITY - THRESHOLD) <br> SIMILARITY NOT OVER THRESHOLD → SIZE CORRESPONDING TO (THRESHOLD - SIMILARITY) |
| ... | | | | | |
| M101 | PARTIAL REGION | | | | SIMILARITY OVER THRESHOLD → SATURATION CORRESPONDING TO (SIMILARITY - THRESHOLD) <br> SIMILARITY NOT OVER THRESHOLD → SATURATION CORRESPONDING TO (THRESHOLD - SIMILARITY) |
| M102 | PARTIAL REGION | | | | SIMILARITY OVER THRESHOLD → DENSITY CORRESPONDING TO (SIMILARITY - THRESHOLD) <br> SIMILARITY NOT OVER THRESHOLD → DENSITY CORRESPONDING TO (THRESHOLD - SIMILARITY) |
| M201 | PARTIAL REGION | | | | SIMILARITY OVER THRESHOLD → TRANSPARENCY CORRESPONDING TO (SIMILARITY - THRESHOLD) <br> SIMILARITY NOT OVER THRESHOLD → TRANSPARENCY CORRESPONDING TO (THRESHOLD - SIMILARITY) |
| ... | | | | | |

F I G. 8A

1006

| PARTIAL REGION ID | PARTIAL REGION GENERATION ALGORITHM |
|---|---|
| | RECTANGULAR MESH (H × W) |
| | FEATURE PORTION (EYES, NOSE, MOUTH,...) |
| | OVERLAPPED FEATURE PORTION AND RECTANGULAR MESH (h × w) |
| | OVERLAPPED RECTANGULAR MESH (H × W) AND RECTANGULAR MESH (h × w) |
| ⋮ | |
| | TRIANGULAR MESH |
| | HEXAGONAL MESH |
| ⋮ | |
| | OVERLAPPED CIRCULAR MESH (RADIUS r) |
| | OPERATION BY OPERATOR |

FIG. 12

| CAPTURED FACE IMAGE ID | COLLATION TARGET FACE IMAGE ID | SIMILARITY SCORE | | | TOTAL SCORE | RESULT OF COMPARING TOTAL SCORE WITH FACE SIMILARITY THRESHOLD | RESULT OF SIMILARITY OR DISSIMILARITY |
|---|---|---|---|---|---|---|---|
| | | PARTIAL REGION (1, 1) | ... | PARTIAL REGION (m, n) | | | |
| ... | | | | | | | |

| PARTIAL REGION ID | SIMILARITY CONDITION | | POSITION CONDITION | | RESULT OF WHETHER OR NOT TO CONNECT REGIONS | CONNECTED REGION COORDINATES | CONNECTION MARK |
|---|---|---|---|---|---|---|---|
| | SIMILARITY | SIMILARITY RANGE | PARTIAL REGION COORDINATES | ADJACENT REGION | | | |
| | | A | | ○ | ○ | | |
| | | A | | × | × | | |
| | | B | | ○ | × | | |
| | | B | | ○ | ○ | | |
| ... | | | | | | | |

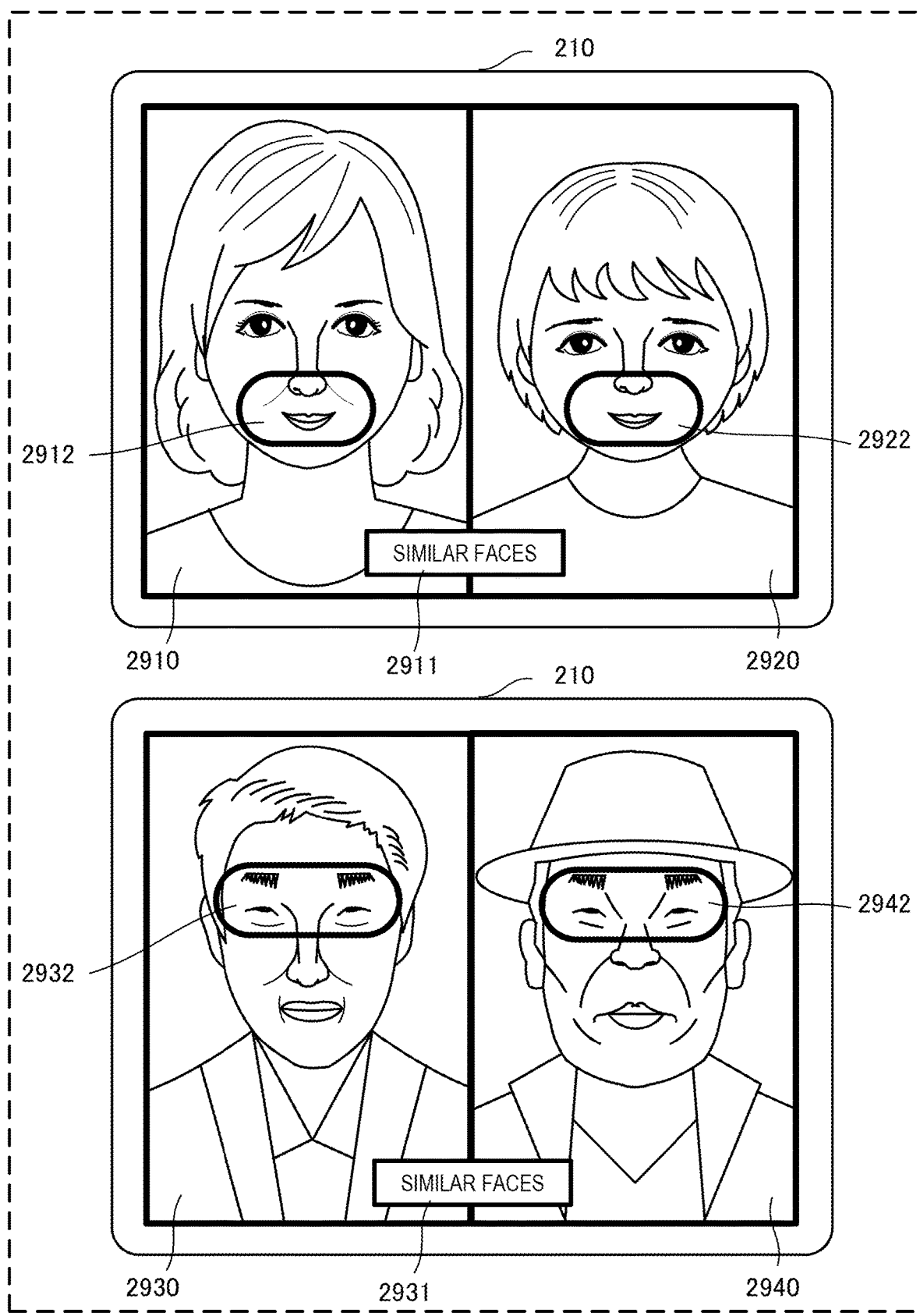
F I G. 29

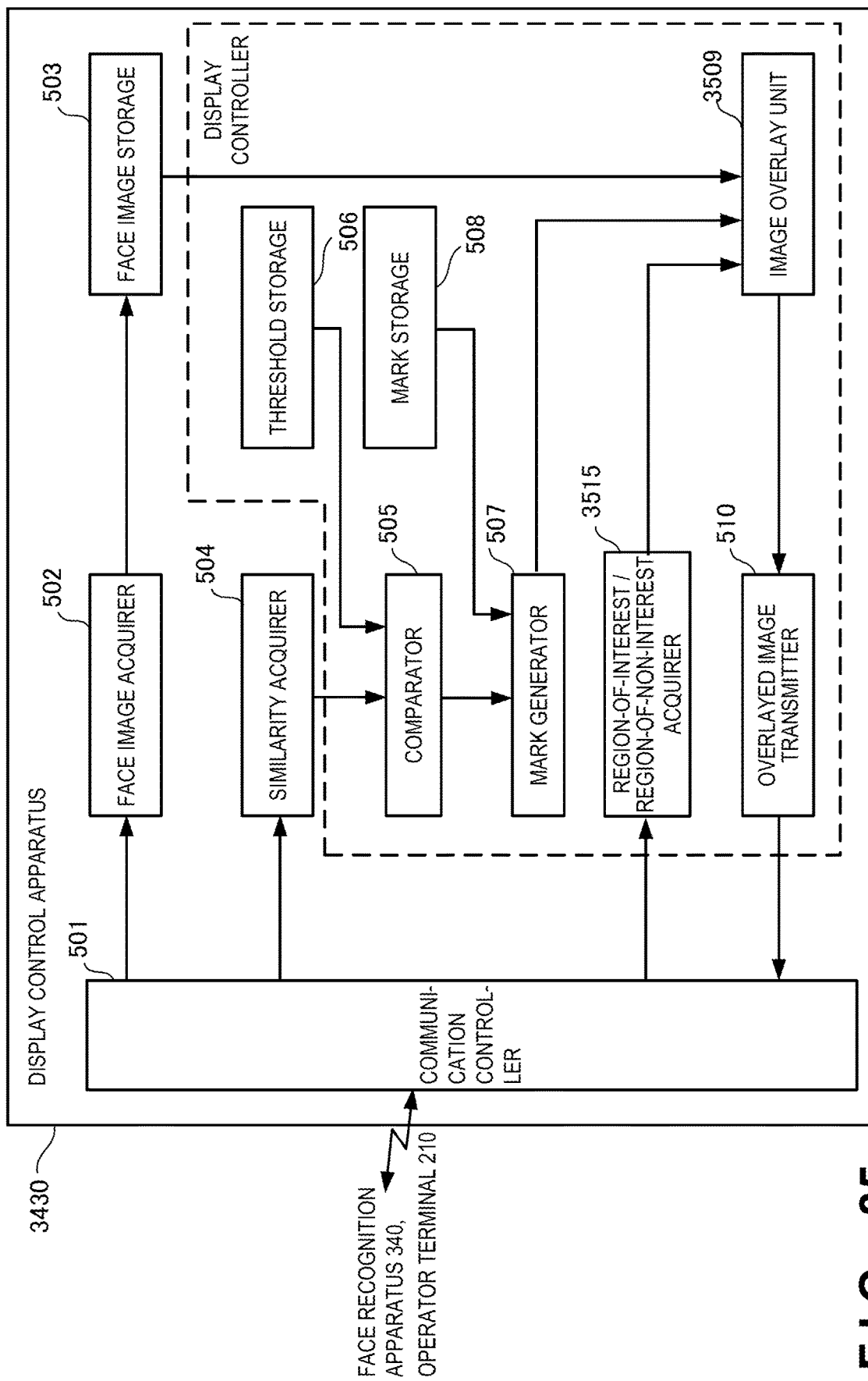
F I G. 35

FIG. 39

| 3901 Partial Region ID | 3902 Partial Region Coordinates | 3903 Degree of Influence on Recognition Result | | 3904 Region of Interest | 3905 Region of Non-Interest |
|---|---|---|---|---|---|
| | | High Influence Score | Low Influence Score | | |
| | | | | ○ | × |
| | | | | ○ | × |
| | | | | × | ○ |
| ... | | | | × | × |

3714

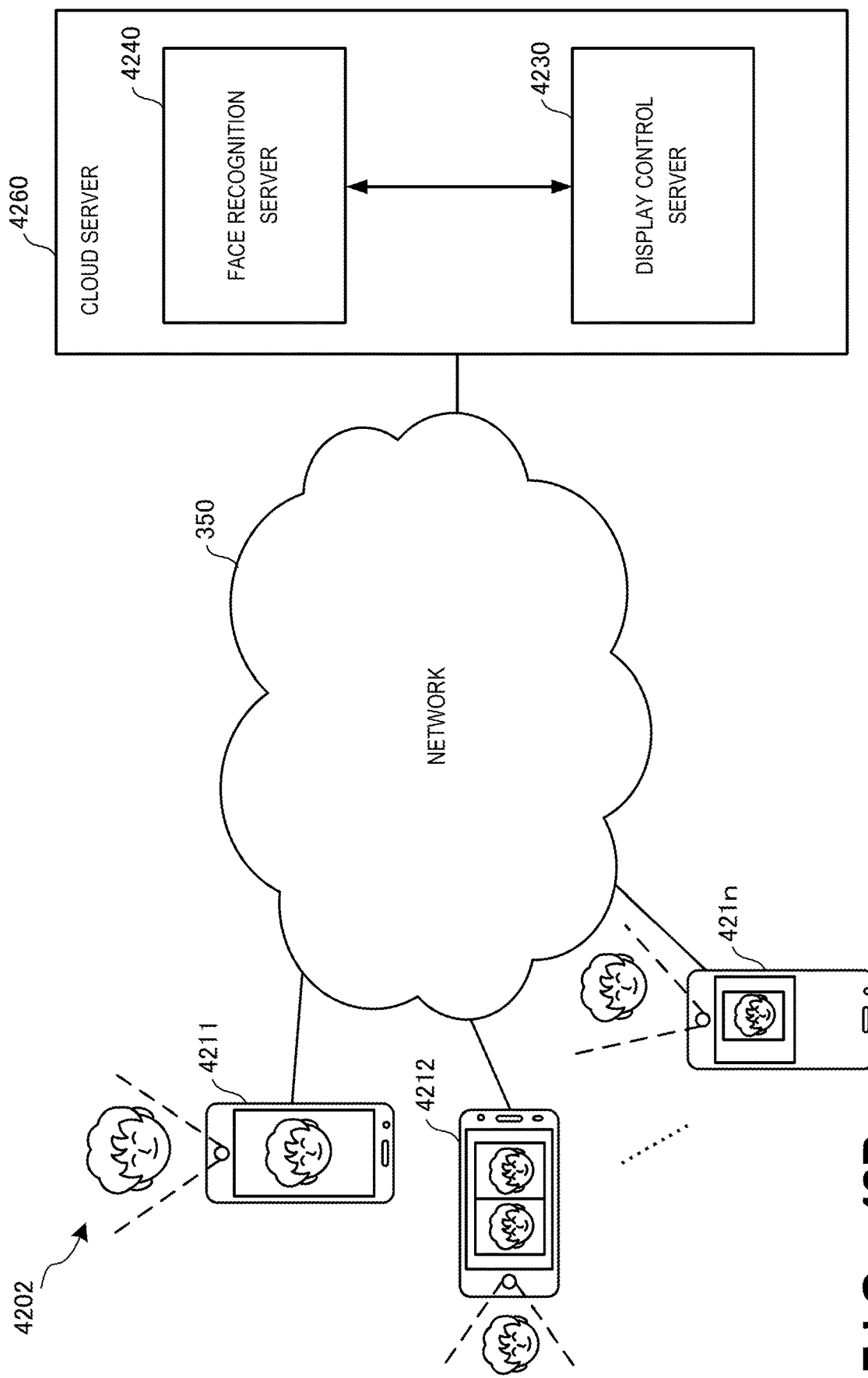
F I G. 42B

FACE RECOGNITION SYSTEM, FACE RECOGNITION METHOD, DISPLAY CONTROL APPARATUS, DISPLAY CONTROL METHOD, AND DISPLAY CONTROL PROGRAM

CROSS REFERENCE TO RELATED APPLICATIONS

This application is a National Stage of International Application No. PCT/JP2016/066778 filed Jun. 6, 2016, claiming priority based on Japanese Patent Application No. 2015-176534, filed Sep. 8, 2015.

TECHNICAL FIELD

The present invention relates to a face recognition system, a face recognition method, a display control apparatus, a display control method, and a display control program.

BACKGROUND ART

In the above technical field, patent literature 1 discloses a technique of searching for an image from an image database by collation for each pair of portions (eyes, mouths, or noses) of face images. Patent literature 2 discloses a technique of notifying a user of a corresponding response sentence based on a similarity obtained by collation for each pair of portion regions (eye regions, mouth regions, or nose regions) of face images.

CITATION LIST

Patent Literature

Patent literature 1: Japanese Patent Laid-Open No. 2010-146581
Patent literature 2: Japanese Patent Laid-Open No. 2005-078413

SUMMARY OF THE INVENTION

Technical Problem

In the techniques described in the above patent literatures, however, only information based on a face recognition result is output. Therefore, an operator cannot grasp a factor leading the face recognition result at a glance to confirm or modify the face recognition result on the spot.

The present invention enables to provide a technique of solving the above-described problem.

Solution to Problem

One example aspect of the present invention provides a display control apparatus comprising:
a similarity acquirer that acquires a similarity between each pair of partial regions of face images by performing collation processing between the each pair of partial regions of the face images; and
a display controller that controls to overlay, on the face images, at least one of a first region the similarity of which exceeds a threshold and a second region the similarity of which does not exceed the threshold, and display the overlaid face images.

Another example aspect of the present invention provides a display control method comprising:
acquiring a similarity between each pair of partial regions of face images by performing collation processing between the each pair of partial regions of the face images; and
controlling to overlay, on the face images, at least one of a first region the similarity of which exceeds a threshold and a second region the similarity of which does not exceed the threshold, and display the overlaid face images.

Still other example aspect of the present invention provides a display control program for causing a computer to execute a method, comprising:
acquiring a similarity between each pair of partial regions of face images by performing collation processing between the each pair of partial regions of the face images; and
controlling to overlay, on the face images, at least one of a first region the similarity of which exceeds a threshold and a second region the similarity of which does not exceed the threshold, and display the overlaid face images.

Still other example aspect of the present invention provides a face recognition system comprising:
an image capturer that generates a first face image;
an accumulator that accumulates a second face image;
a deriving unit that derives a similarity between each pair of a partial region of the first face image and a partial region of the second face image by performing collation processing between the each pair of partial regions of the first face image and the second face image;
a face recognizer that recognizes the first face image based on derived similarities of the partial regions; and
a display unit that overlays, on at least one of the first face image and the second face image, a result of recognizing the first face image and at least one of a first region the similarity of which exceeds a threshold and a second region the similarity of which does not exceed the threshold, and displays the overlaid face images.

Still other example aspect of the present invention provides a face recognition method comprising:
deriving a similarity between each pair of a partial region of a first face image generated by an image capturer and a partial region of a second face image accumulated by an accumulator by performing collation processing between the each pair of partial regions of the first face image and the second face image;
recognizing the first face image based on derived similarities of the partial regions; and
overlaying, on at least one of the first face image and the second face image, a result of recognizing the first face image and at least one of a first region the similarity of which exceeds a threshold and a second region the similarity of which does not exceed the threshold, and displaying the overlaid face images on a display unit.

Advantageous Effects of Invention

According to the present invention, since an operator can grasp a factor leading a face recognition result at a glance, he/she can confirm or modify the face recognition result on the spot.

BRIEF DESCRIPTION OF DRAWINGS

FIG. 6 is a table showing the structure of a face image storage according to the second example embodiment of the present invention;

FIG. 8A is a table showing the structure of a mark storage according to the second example embodiment of the present invention;

FIG. 12 is a table showing the structure of a partial region database according to the second example embodiment of the present invention;

FIG. 13 is a table showing the structure of a face recognition table according to the second example embodiment of the present invention;

FIG. 23 is a table showing the structure of a region connection table according to the third example embodiment of the present invention;

FIG. 29 is a view showing an outline of a display screen according to the fifth example embodiment of the present invention;

FIG. 35 is a block diagram showing the functional arrangement of a display control apparatus according to the sixth example embodiment of the present invention;

FIG. 39 is a table showing the structure of a region-of-interest and region-of-non-interest generation table according to the sixth example embodiment of the present invention;

FIG. 42B is a block diagram showing another arrangement of the face recognition system according to the eighth example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A display control apparatus 100 according to the first example embodiment of the present invention will be described with reference to FIG. 1. The display control apparatus 100 is an apparatus that controls display of a face image to undergo face recognition.

Figure 1:
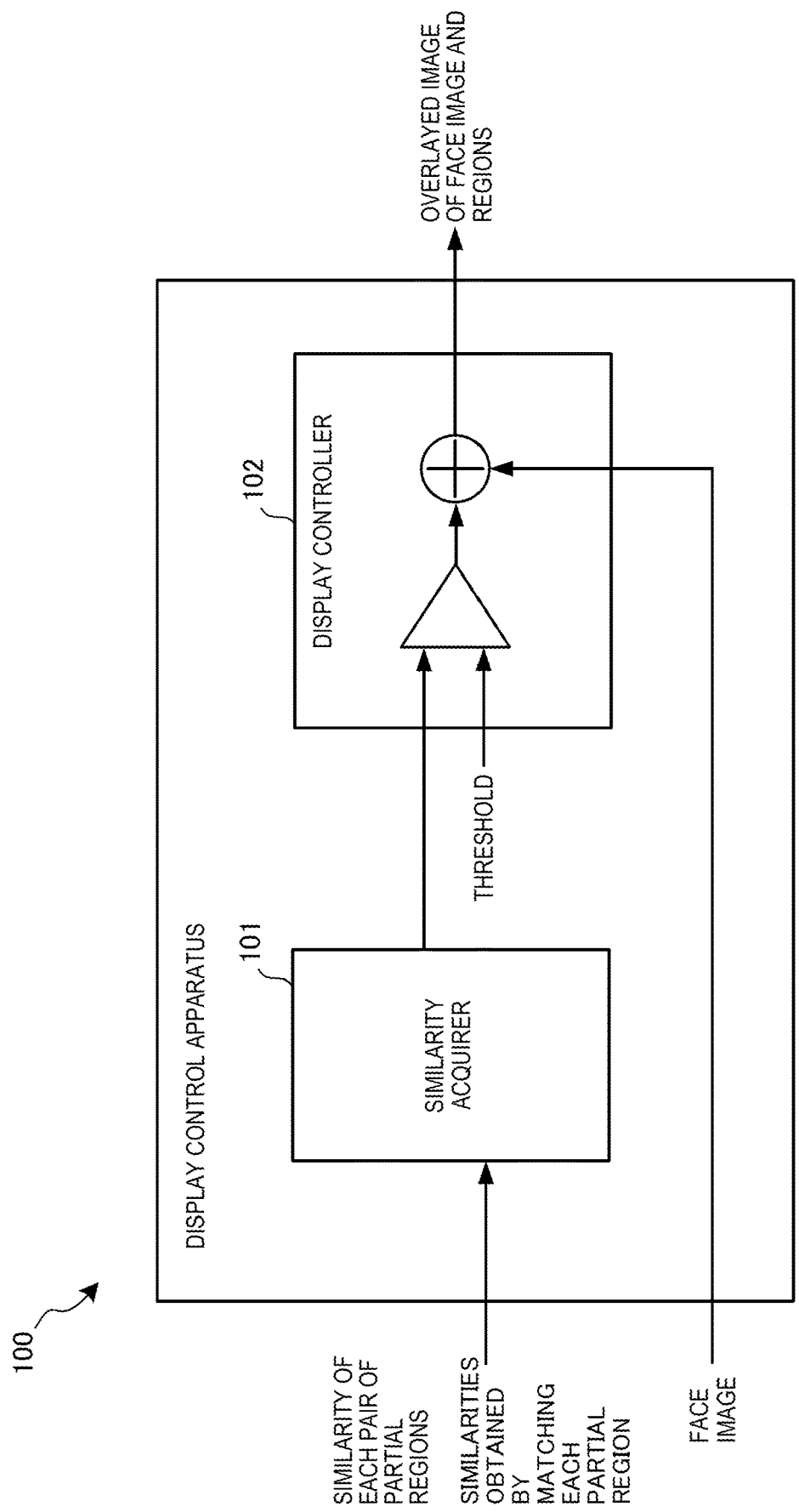
FIG. 1 is a block diagram showing the arrangement of a display control apparatus according to the first example embodiment of the present invention.

As shown in FIG. 1, the display control apparatus 100 includes a similarity acquirer 101 and a display controller 102. The similarity acquirer 101 acquires a similarity between each pair of partial regions of face images by performing collation processing between the each pair of partial regions of the face images. The display controller 102 controls to overlay, on the face images, at least one of the first region the similarity of which exceeds a threshold and the second region the similarity of which does not exceed the threshold, and display the overlaid face images.

According to this example embodiment, when the degree of similarity for each pair of partial regions of face images is overlaid and displayed on the face images, the operator can grasp a factor leading a face recognition result at a glance, and thus can confirm or modify the face recognition result on the spot.

Second Example Embodiment

A face recognition system including a display control apparatus according to the second example embodiment of the present invention will be described next. The display control apparatus according to this example embodiment acquires a similarity derived by performing collation for each pair of partial regions of face images in a face recognition apparatus, and controls to overlay and display, on the face images, marks each indicating whether the acquired similarity exceeds a threshold or not. This allows the user or operator to grasp a factor for a face recognition result at a glance, and confirm or modify the face recognition result on the spot.

<<Display Screen of Face Recognition Result>>

Figure 2A:
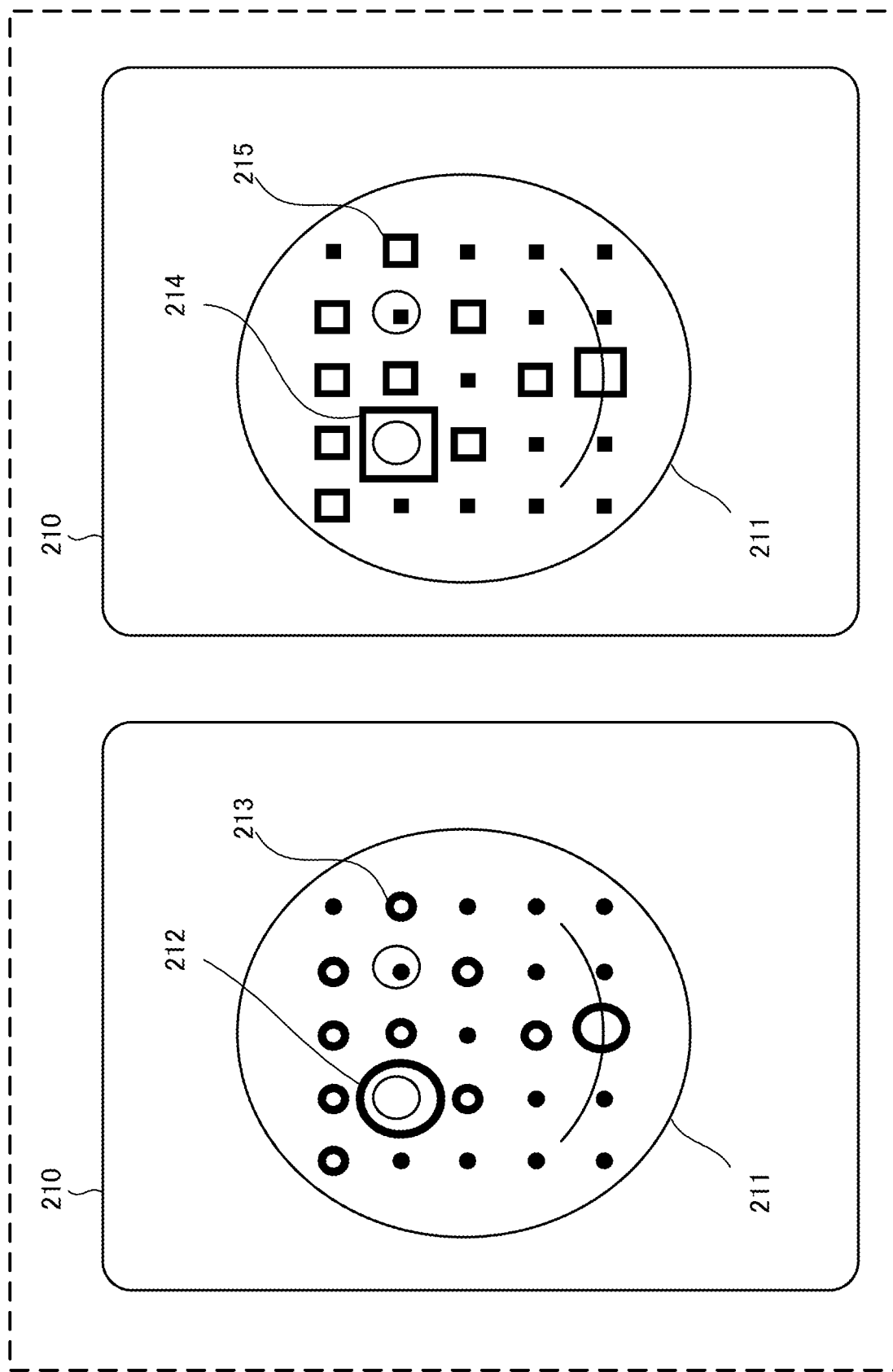
FIG. 2A is a view showing an outline of a display screen according to the second example embodiment of the present invention.

FIG. 2A is a view showing an outline of the display screen of a terminal 210 according to this example embodiment. Note that the display screen shown in FIG. 2A is not limited, and may be the display screen of a mobile terminal, the display screen of a PC (Personal Computer), or the display screen of an apparatus dedicated for face recognition or surveillance.

Figure 5:
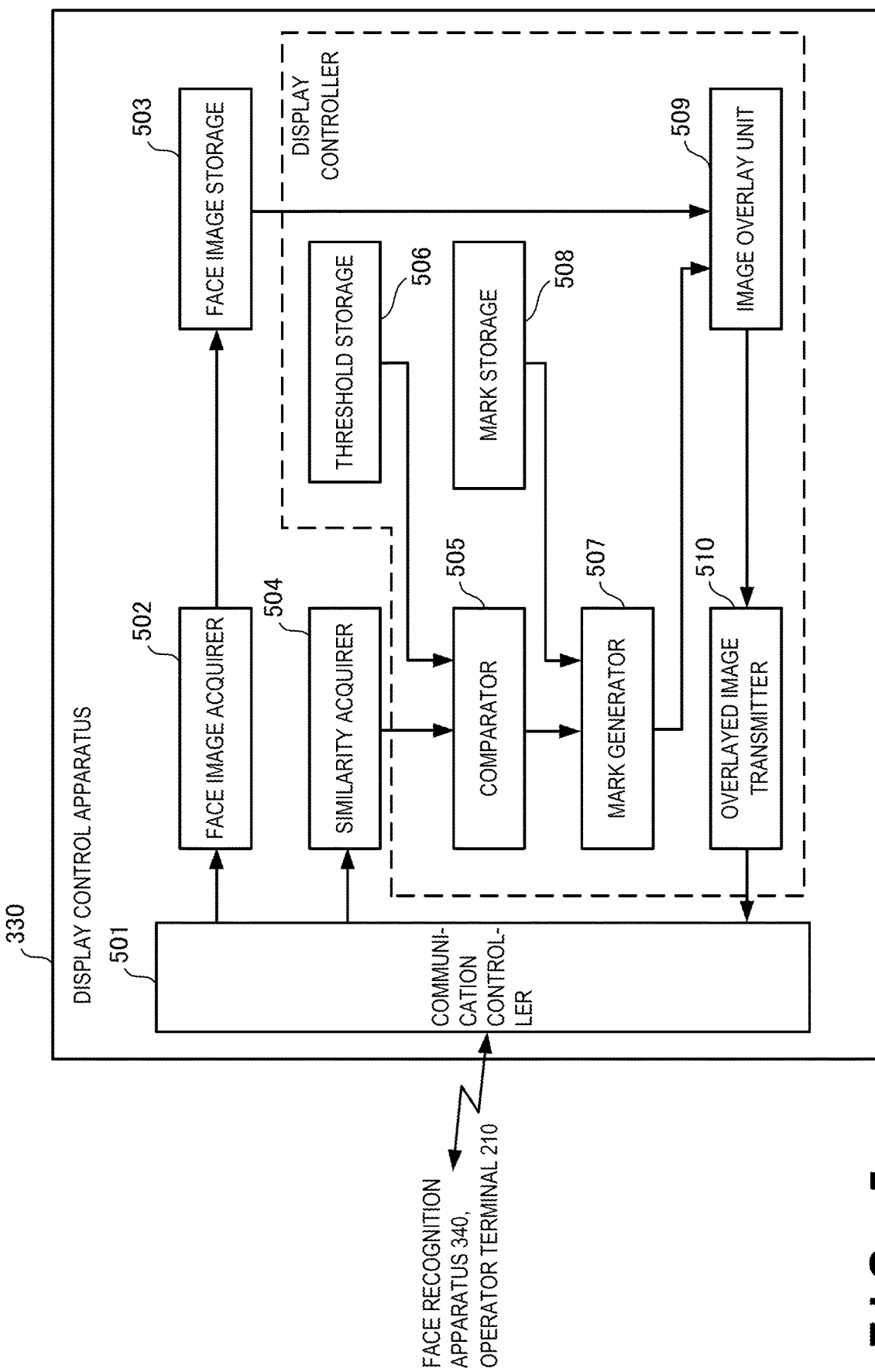
FIG. 5 is a block diagram showing the functional arrangement of a display control apparatus according to the second example embodiment of the present invention.

In the display screen of the terminal 210 shown on the left side of FIG. 2A, a mark "○" indicating that the similarity of each pair of partial regions (in FIG. 2A, 5 (vertical)×5 (horizontal)=25) exceeds a predetermined threshold as a result of comparison is overlaid on a captured face image or recognition target face image 211. The size of the mark "○" corresponds to a difference value obtained by subtracting the predetermined threshold from the similarity. That is, a mark "○" 212 of a large size indicates a partial region whose similarity is much larger than the predetermined threshold. On the other hand, a mark "○" 213 of a small size indicates a partial region whose similarity is not much larger than the predetermined threshold. In this way, the marks "○" are overlaid and displayed so as to discriminate between the high and low similarities. Note that in the display screen on the left side, a mark "●" indicates a partial region whose similarity does not exceed the predetermined threshold. From the display screen on the left side, the user or operator can understand at a glance that the peripheral regions of eyes and the central region of a mouth are similar regions.

In the display screen of the terminal 210 shown on the right side of FIG. 2A, a mark "□" indicating that the similarity of each pair of the partial regions (in FIG. 2A, 5 (vertical)×5 (horizontal)=25) exceeds a predetermined threshold as a result of comparison is overlaid on the captured face image or recognition target face image 211. The size of the mark "□" corresponds to a difference value obtained by subtracting the predetermined threshold from the similarity. That is, a mark "□" 214 of a large size indicates a partial region whose similarity is much larger than the predetermined threshold. On the other hand, a mark "□" 215 of a small size indicates a partial region whose similarity is not much larger than the predetermined threshold. Note that in the display screen on the right side, a mark "■" indicates a partial region whose similarity does not exceed the predetermined threshold. Similarly to the display screen on the left side, from the display screen on the right side, the user or operator can understand at a glance that the peripheral regions of the eyes and the central region of the mouth are similar regions.

Note that FIG. 2A shows the marks "○" of large and small sizes and the marks "□" of large and small sizes are shown as marks each indicating the similarity. The shape of the mark is not limited to them shown in FIG. 2A. The degree of similarity corresponds to the size of the mark but may be represented by the type or chromaticity of the color of the mark, the density of the mark, or the transparency when the mark is overlaid on the face images.

Figure 2B:
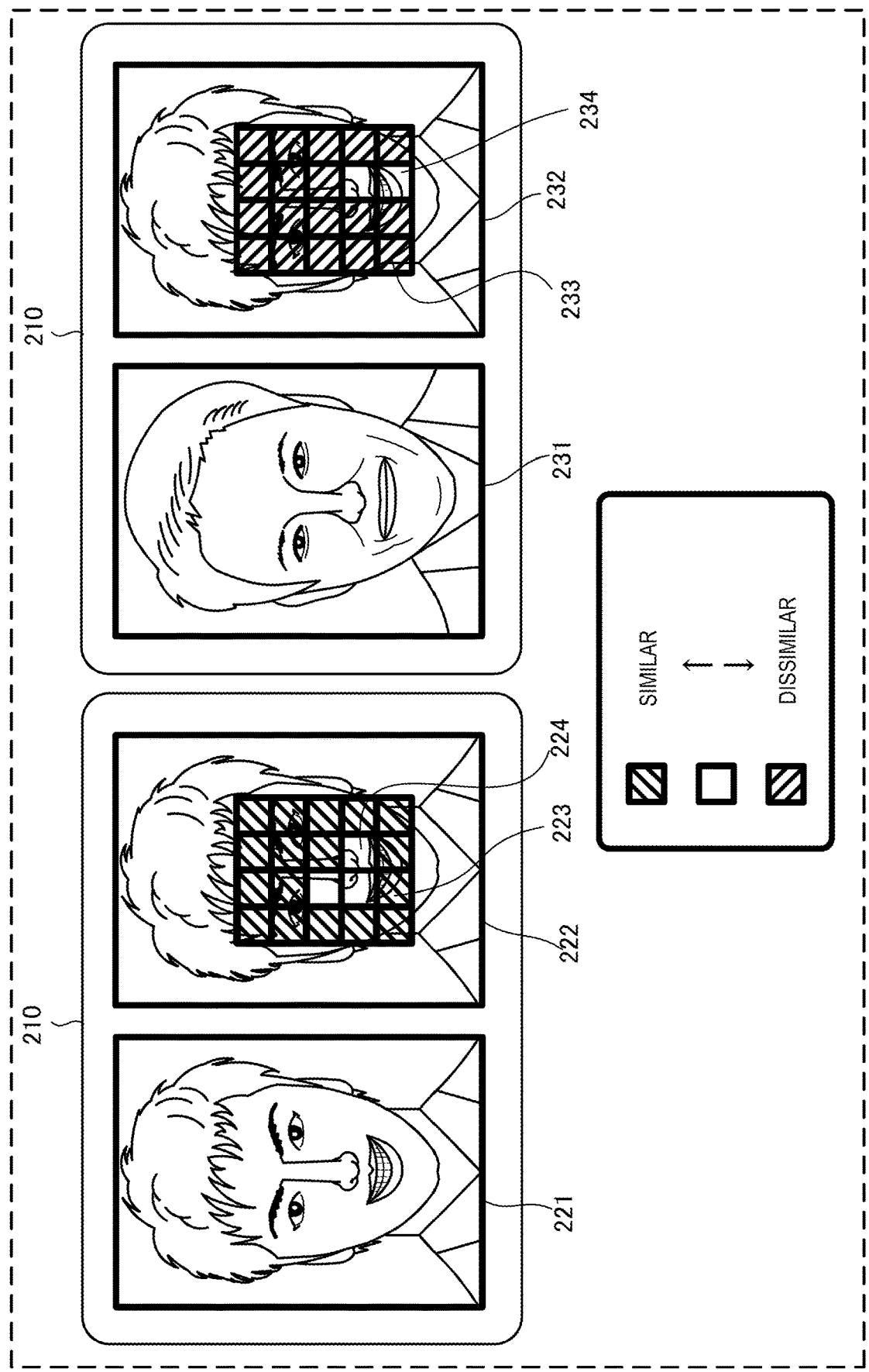
FIG. 2B is a view showing another outline of the display screen according to the second example embodiment of the present invention.

FIG. 2B is a view showing another outline of the display screen of the terminal 210 according to this example embodiment.

A captured face image 221 and an accumulated recognition target face image 222 are displayed in the display screen of the terminal 210 shown on the left side of FIG. 2B. In the accumulated recognition target face image 222, a similar portion 223 of 5 (vertical)×4 (horizontal)=20 partial regions is filled with a predetermined transparent color (represented by backward diagonal hatching in FIG. 2B). On the other hand, a dissimilar portion 224 is not filled. The similar portion indicates a region where the partial region similarity exceeds the predetermined threshold. Note that this overlay and display processing is implemented by overlaying, as similar region marks, frames filled with the transparent color on the partial regions of the face image 222.

A captured face image 231 and an accumulated recognition target face image 232 are displayed in the display screen of the terminal 210 shown on the right side of FIG. 2B. In the accumulated recognition target face image 232, a dissimilar portion 233 of 5 (vertical)×4 (horizontal)=20 partial regions is filled with a predetermined transparent color (represented by forward diagonal hatching in FIG. 2B). On the other hand, a similar portion 234 is not filled. The dissimilar portion indicates a region where the partial region similarity does not exceed the predetermined threshold. Note that this overlay and display processing is implemented by overlaying, as dissimilar region marks, frames filled with the transparent color on the partial regions of the face image 232.

Note that FIG. 2B shows an example in which the similar region marks or dissimilar region marks are overlaid on the accumulated recognition target face image 222 or 232. However, the similar region marks or dissimilar region marks may be overlaid on the captured face image 221 or 231. Alternatively, one or both of a similar region mark and a dissimilar region mark may be overlaid on the face images. If both the marks are overlaid, the similar region mark and the dissimilar region mark are displayed to be collated. A face image overlaid and displayed on the screen may be one of the captured face image 221 or 231 and the accumulated recognition target face image 222 or 232.

In FIGS. 2A and 2B, the captured face image is compared with the accumulated recognition target face image to calculate the similarity. However, a plurality of captured face images or a plurality of accumulated face images may be compared with each other. The mark includes a symbol of a predetermined shape, a colored partial region, or a filled partial region.

<<Face Recognition System>>

The arrangement and operation of a face recognition system 300 according to this example embodiment will be described with reference to FIGS. 3 and 4.

(System Arrangement)

Figure 3:
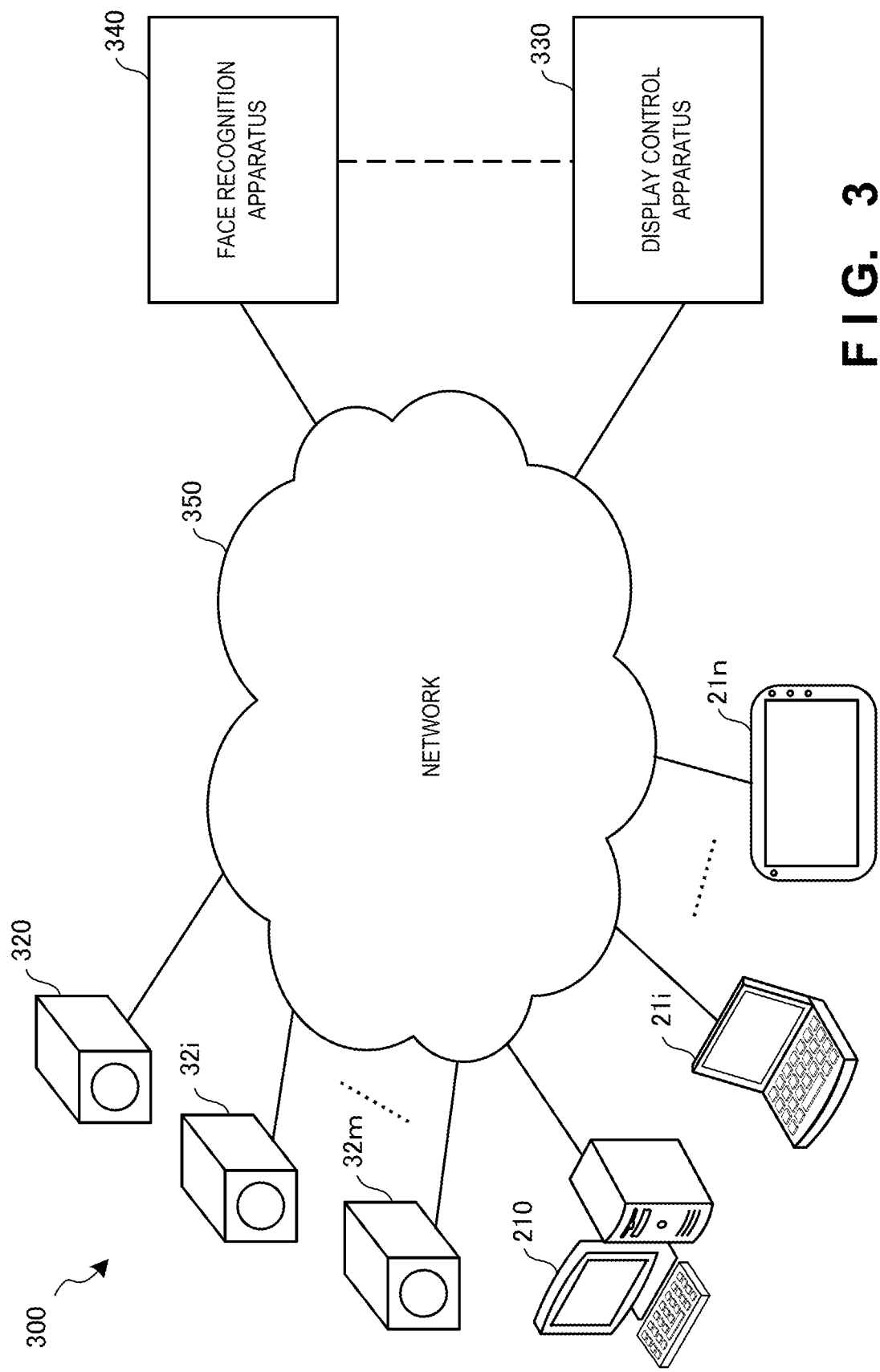
FIG. 3 is a block diagram showing the arrangement of a face recognition system according to the second example embodiment of the present invention.

FIG. 3 is a block diagram showing the arrangement of the face recognition system 300 according to this example embodiment.

The face recognition system 300 includes image capturing apparatuses (cameras) 320 to 32m, terminals 210 to 21n, a display control apparatus 330, and a face recognition apparatus 340, all of which are connected by a network 350.

The image capturing apparatuses (cameras) 320 to 32m include surveillance cameras arranged in an airport and the like. The terminals 210 to 21n may include the operator terminal 210 for surveillance arranged in an airport or the like, and the note PC 21i or a mobile terminal (smartphone, tablet, or the like) as a user terminal. The display control apparatus 330 compares, with a threshold, a similarity as a result of comparison for each pair of partial regions of face images in the face recognition apparatus 340, and controls display on the terminals 210 to 21n by overlaying the result on the face images. The face recognition apparatus 340 extracts a face image from an image captured by one of the image capturing apparatuses (cameras) 320 to 32m, derives a similarity by comparing each partial region of the extracted face image with a corresponding partial region of a face image read out from an accumulator, and recognizes a face based on the similarities. The face recognition apparatus 340 transmits the face recognition result and the similarities of the pairs of partial regions to the display control apparatus 330, and also transmits the face recognition result to the terminals 210 to 21n.

Note that the display control apparatus 330 and the face recognition apparatus 340 may be connected by a local network, as indicated by a dashed line.

(Operation Sequence)

Figure 4:
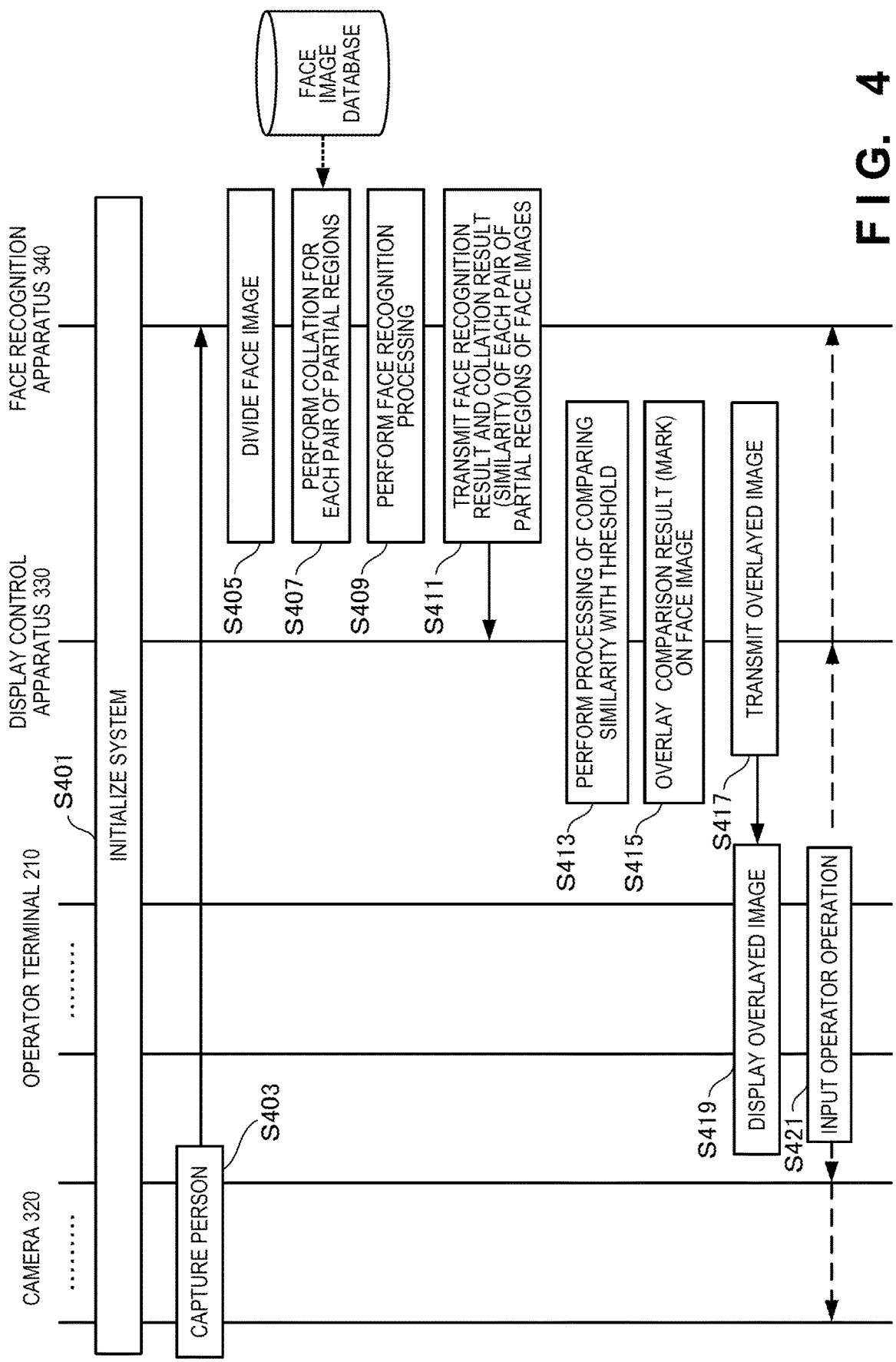
FIG. 4 is a sequence chart showing the operation procedure of the face recognition system according to the second example embodiment of the present invention.

FIG. 4 is a sequence chart showing the operation procedure of the face recognition system 300 according to this example embodiment. Note that in FIG. 4, the image capturing apparatuses (cameras) 320 to 32m are represented by the camera 320, and the terminals 210 to 21n are represented by the operator terminal 210.

In step S401, the face recognition system 300 is initialized. In step S403, the camera 320 captures a person and transmits a captured image to the face recognition apparatus 340. Note that the camera 320 may capture a crowd in the lobby of an airport or on a road instead of a specific person, and the face recognition apparatus 340 or the like extracts each person, and extracts a face image of each person. An arrangement in which an advanced image processor is provided in the camera 320 and only the feature of a face image is transmitted to the face recognition apparatus 340 may be adopted.

Upon receiving the captured image from the camera 320, the face recognition apparatus 340 divides the face image into partial regions in step S405. Note that the partial regions may be rectangular regions having different areas in accordance with the importance of face recognition or regions each surrounded by a curve, instead of regions obtained by dividing the image in a grid pattern shown in FIG. 2A or 2B. Furthermore, the partial regions may be regions respectively including portions such as eyes, a nose, and a mouth extracted from the captured face image but are not limited to them.

In step S407, the face recognition apparatus 340 calculates a similarity by comparing corresponding partial regions of the captured face image and each face image read out from a face image database in which face images are accumulated. Note that enlargement/reduction processing for associating the partial regions of the face images is also performed. However, the aspect ratio of the face in each of the face images captured at the same angle desirably remains the same. To calculate the similarity between the partial regions, for example, the accumulation of comparison results of luminances, colors, or the like on a pixel basis, the accumulation of the features of regions obtained by subdividing each partial region, or the feature of the luminance or color of each entire partial region or the feature of an edge in each partial region is used. The present invention, however, is not limited to them. For example, an SSD (Sum of Squared Difference), an SAD (Sum of Absolute Difference), a normalized correlation value, or the like may be calculated as the similarity using the arrangement of the luminance values of the respective pixels of each partial region or each of regions obtained by subdividing each partial region.

In step S409, the face recognition apparatus 340 accumulates the similarity of each pair of partial regions in consideration of a weight, and comparing the accumulated values with a threshold, thereby performing face recognition of determining similarity or dissimilarity. If there exists a similar face, the user is notified of the face as a recognition result. At the same time, in step S411, the face recognition apparatus 340 transmits, to the display control apparatus 330, the face recognition result and the collation result (similarity) of each pair of partial regions of the face images. Note that the operator terminal 210 may be directly notified of the face recognition result.

In step S413, the display control apparatus 330 compares, with a predetermined threshold, each partial region similarity received from the face recognition apparatus 340. In step S415, the display control apparatus 330 generates an overlaid display image data by overlaying a predetermined mark on the partial region of the face image whose similarity exceeds the predetermined threshold and/or the partial region whose similarity does not exceed the predetermined threshold. In step S417, the display control apparatus 330 transmits the overlaid display image data to the operator terminal 210.

In step S419, the operator terminal 210 displays an overlaid image received from the display control apparatus 330. Note that the operator terminal 210 displays the face recognition result (similarity or dissimilarity) by the face recognition apparatus 340 at the same time. In step S421, the operator terminal 210 transmits, to the camera 320, the display control apparatus 330, and the face recognition apparatus 340, an operation performed by the operator by viewing the overlay and display.

Note that FIG. 4 shows a case in which the display control apparatus 330 generates an overlaid display image. An image indicating the mark transmitted from the display control apparatus 330 may be overlaid on the face images in the operator terminal 210.

<<Functional Arrangement of Display Control Apparatus>>

FIG. 5 is a block diagram showing the functional arrangement of the display control apparatus 330 according to this example embodiment.

The display control apparatus 330 includes a communication controller 501, a face image acquirer 502, a face image storage 503, a similarity acquirer 504, a comparator 505, and a threshold storage 506. The display control apparatus 330 further includes a mark generator 507, a mark storage 508, an image overlay unit 509, and an overlaid image transmitter 510.

The communication controller 501 controls communication with the face recognition apparatus 340 or the operator terminal 210 via the network 350. The face image acquirer 502 acquires a face image having undergone face recognition from the face recognition apparatus 340 via the communication controller 501. The face image having undergone face recognition includes at least one of a captured face image and an accumulated recognition target face image.

The similarity acquirer 504 acquires each partial region similarity in association with a partial region ID (Identifier) from the face recognition apparatus 340. The comparator 505 compares each partial region similarity with the predetermined threshold, and outputs a comparison result (data indicating whether the similarity exceeds the threshold). The threshold storage 506 stores the threshold to be compared with each partial region similarity in the comparator 505. As the threshold, one threshold used to determine whether the similarity exceeds the threshold, or two thresholds used to determine whether the similarity exceeds the first threshold or the second threshold (first threshold>one threshold>second threshold) may be stored. Furthermore, various thresholds can be set in accordance with information of which the operator is notified by an overlaid image.

The mark generator 507 generates a mark to be overlaid on each partial region of the face image in accordance with the output from the comparator 505. Note that a mark is generated by selecting, in accordance with the output from the comparator 505, a mark to be used from the mark storage 508. The mark storage 508 stores a mark to be overlaid on each partial region of the face image in accordance with the output from the comparator 505. Note that the mark includes the fill of the partial region.

The image overlay unit 509 overlays, on the face images stored in the face image storage 503, the mark generated by the mark generator 507 and indicating whether the similarity exceeds the threshold. The overlaid image transmitter 510 transmits, to the operator terminal 210 via the network 350, the face image in which the marks are overlaid on the partial regions by the image overlay unit 509.

Note that in FIG. 5, the comparator 505, the threshold storage 506, the mark generator 507, the mark storage 508, the image overlay unit 509, and the overlaid image transmitter 510 correspond to the display controller 102 shown in FIG. 1.

(Face Image Storage)

FIG. 6 is a table showing the structure of the face image storage 503 according to this example embodiment. The face image storage 503 stores the face image and the face recognition result in the face recognition apparatus 340 for generating an overlaid image with the marks. Note that the structure of the face image storage 503 is not limited to that shown in FIG. 6.

The face image storage 503 stores a face recognition ID 601 for identifying face recognition processing, a captured image ID 602 for identifying an image captured by the camera 320, an accumulated image ID 603 for identifying an accumulated image as a recognition target in the face recognition apparatus 340, and a face recognition result 604 in the face recognition apparatus 340. The face image storage 503 also stores an overlaying image flag 605 indicating whether a face image to undergo overlay is one or both of a captured image and an accumulated image.

(Threshold Storage)

Figure 7:
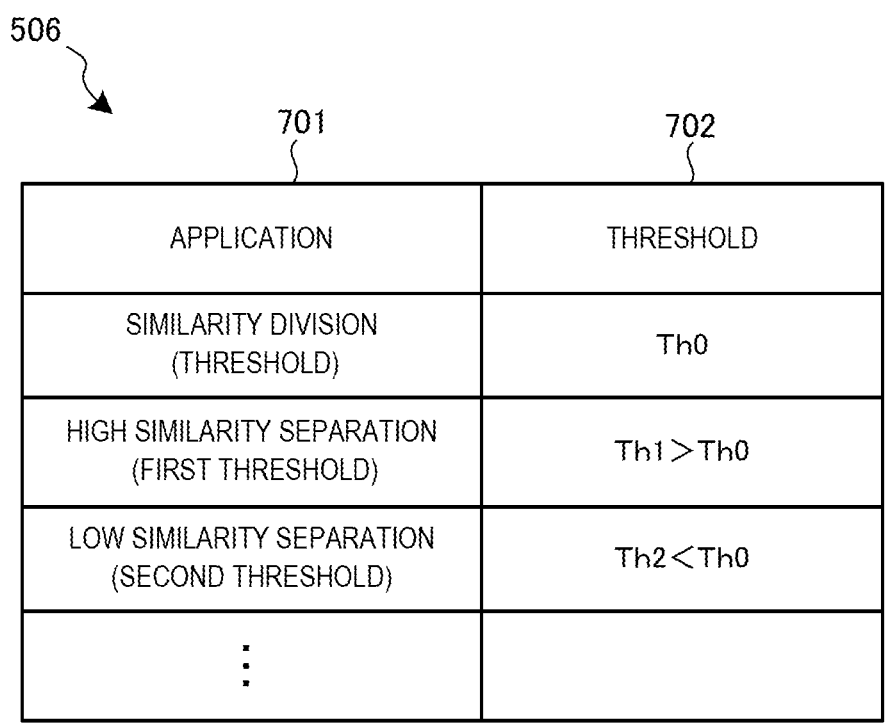
FIG. 7 is a table showing the structure of a threshold storage according to the second example embodiment of the present invention.

FIG. 7 is a table showing the structure of the threshold storage 506 according to this example embodiment. The threshold storage 506 stores a threshold that corresponds to an overlaying mark and is to be compared with the similarity of each pair of partial regions of the face images. Note that the structure of the threshold storage 506 is not limited to that shown in FIG. 7.

The threshold storage 506 stores a threshold 702 in association with an application 701 of the threshold in comparison with the similarity. In FIG. 7, for example, one threshold Th0 for dividing the partial region based on the similarity, which is used to determine whether the similarity exceeds the threshold, and two thresholds Th1 (first threshold) and Th2 (second threshold) for separating the partial region of a high similarity exceeding the first threshold and separating the partial region of a low similarity not exceeding the second threshold are stored. Note that a threshold for separating the similarity may be further provided to finely change the overlaying mark.

(Mark Storage)

FIG. 8A is a table showing the structure of the mark storage 508 according to this example embodiment. The mark storage 508 stores various marks to be selected in consideration of the condition of the comparison result between each partial region similarity and the threshold and the condition of the mark indicating the comparison result to the operator. Note that the structure of the mark storage 508 is not limited to that shown in FIG. 8.

The mark storage 508 stores, in association with a mark ID 811 for identifying a mark, a shape 812 of the mark, basic image data 813 of the mark, and a change 814 corresponding to the similarity. The basic image data 813 stores the size, color, and density as the basis of the mark, image data on a pixel basis, or the like.

(Overlaying Image Data Generation Table)

Figure 8B:
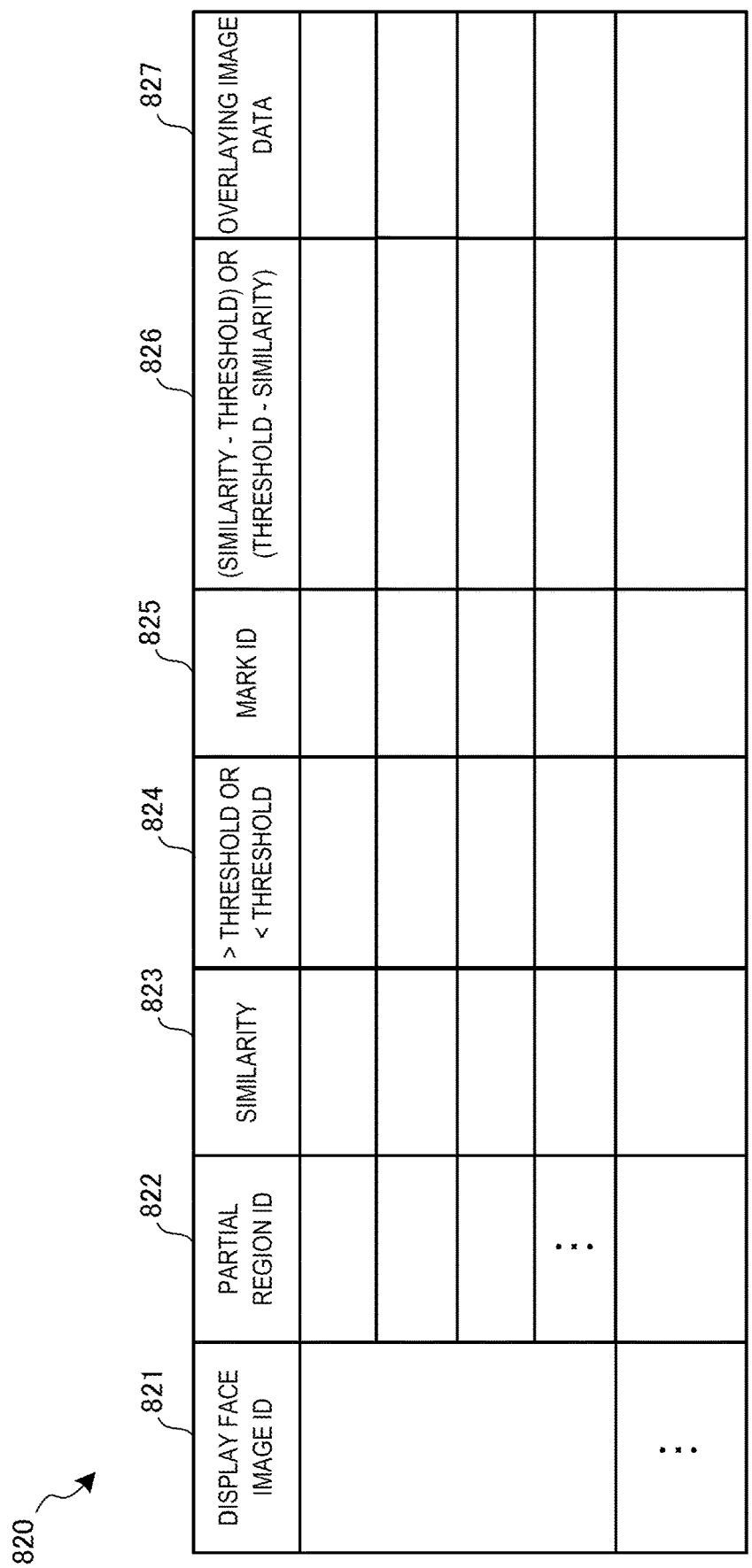
FIG. 8B is a table showing the structure of an overlaying image data generation table according to the second example embodiment of the present invention.

FIG. 8B is a table showing the structure of an overlaying image data generation table 820 according to this example embodiment. The overlaying image data generation table 820 is used in processing up to the mark generator 507 to generate overlaying image data of each partial region.

In association with each partial region ID 822 of a display face image ID 821 for identifying a face image on which a mark is overlaid and displayed, the overlaying image data generation table 820 stores a partial region similarity 823, a comparison result 824 indicating whether or not the threshold is exceeded, a mark ID 825 for indicating the comparison result 824, and a level 826 corresponding to the comparison result 824, for example, (similarity—threshold) or (threshold—similarity). The overlaying image data generation table 820 stores overlaying image data 827 to be overlaid on each partial region.

(Overlaid Display Data Generation Table)

Figure 9:
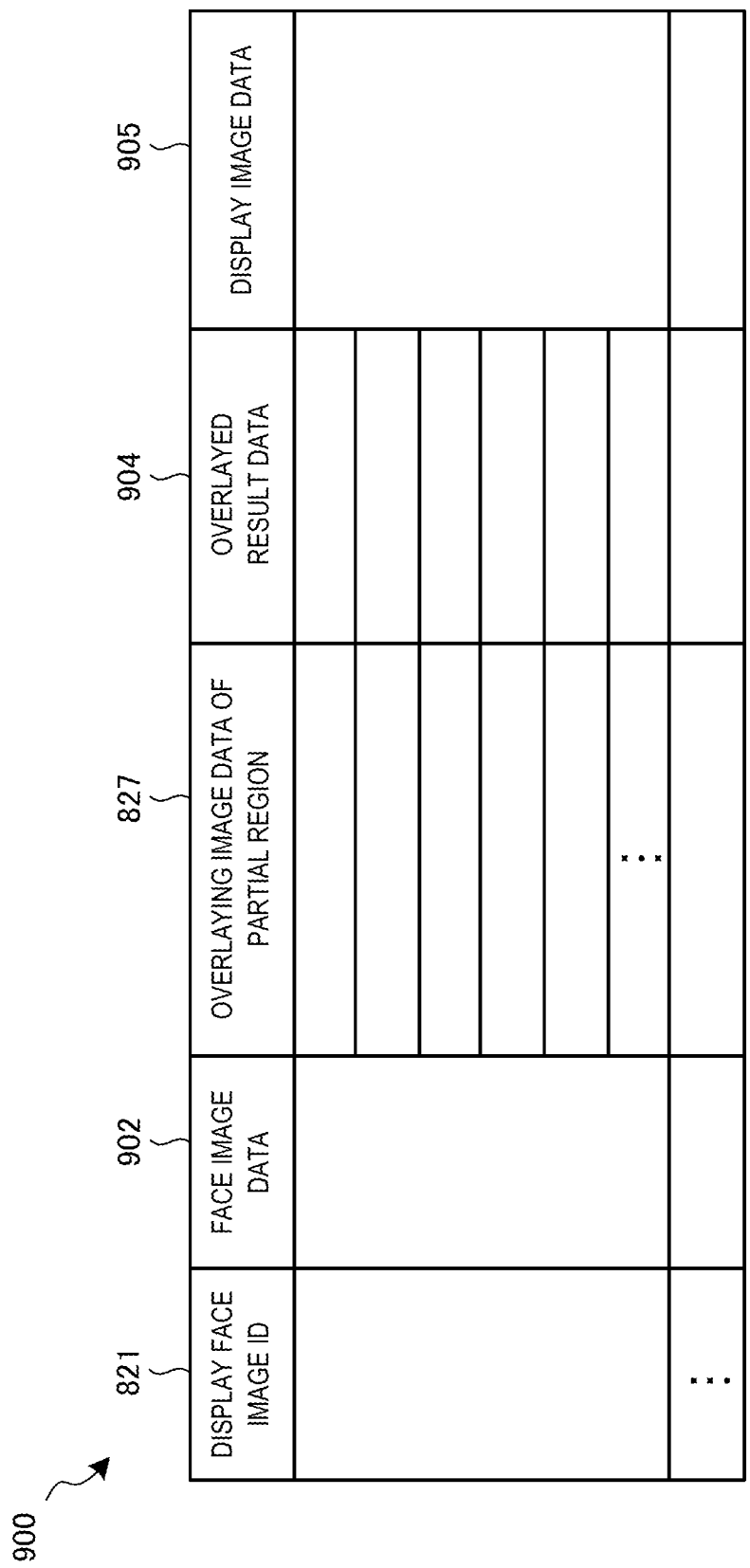
FIG. 9 is a table showing the structure of an overlaid display data generation table according to the second example embodiment of the present invention.

FIG. 9 is a table showing the structure of an overlaid display data generation table 900 according to this example embodiment. The overlaid display data generation table 900 is used in the processing of the image overlay unit 509 to generate display image data by overlaying the overlaying image data of each partial region on each partial region of the face image.

The overlaid display data generation table 900 stores face image data 902 in association with the display face image ID 821. The overlaid display data generation table 900 stores the overlaying image data 827 of each partial region generated by the mark generator 507 and overlaid result data 904 of each partial region. In addition, the overlaid display data generation table 900 stores display image data 905 obtained by setting the overlaid result data 904 of the respective partial regions as the entire face image.

Note that in FIG. 9, an overlaying image is generated for each partial region. However, overlaying image data may be generated by individually collecting the marks, and the display face image data and the overlaying image data may be collectively overlaid.

<<Functional Arrangement of Face Recognition Apparatus>>

Figure 10:
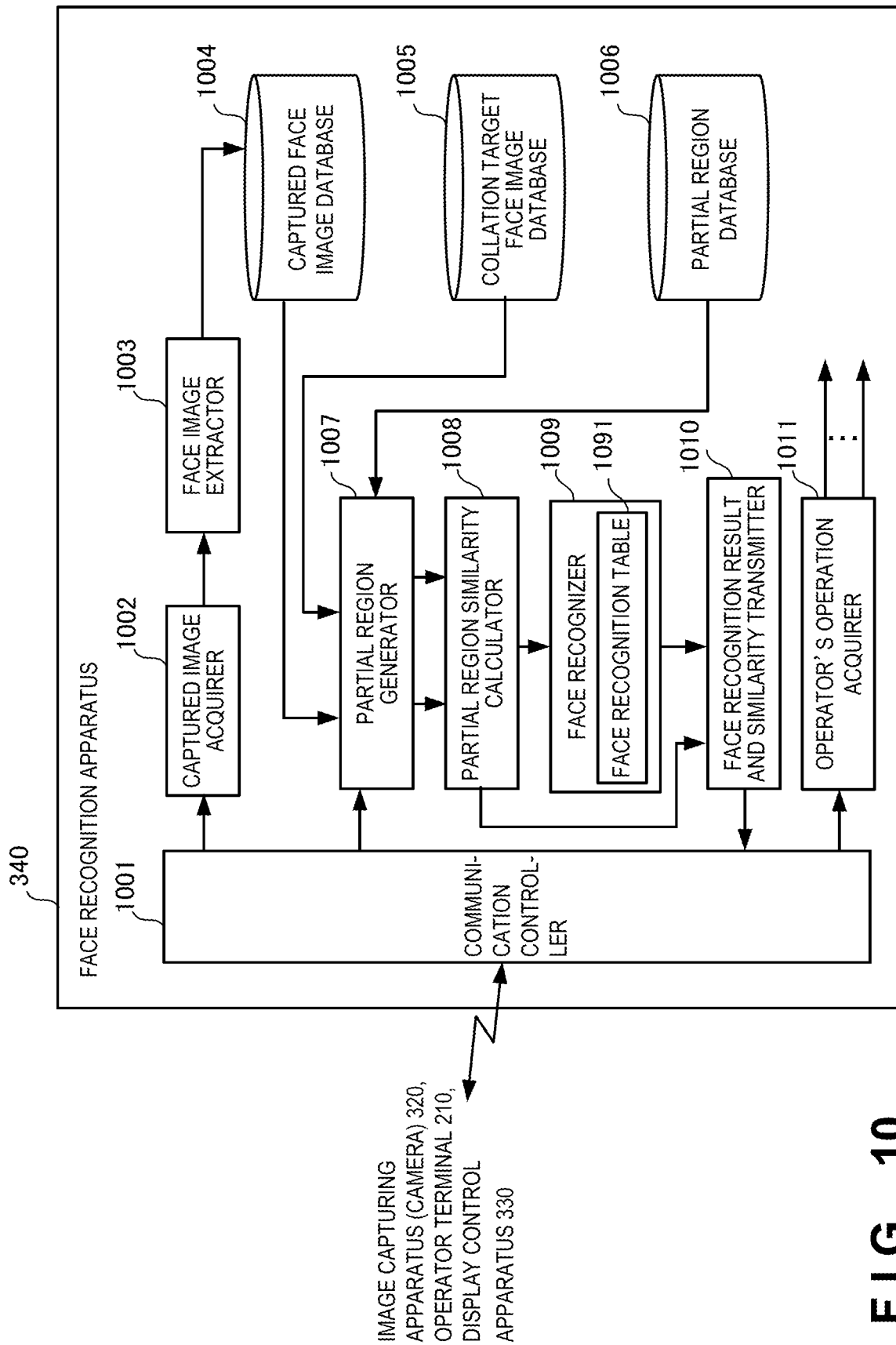
FIG. 10 is a block diagram showing the functional arrangement of a face recognition apparatus according to the second example embodiment of the present invention.

FIG. 10 is a block diagram showing the functional arrangement of the face recognition apparatus 340 according to this example embodiment.

The face recognition apparatus 340 includes a communication controller 1001, a captured image acquirer 1002, a face image extractor 1003, a captured face image database 1004, a collation target face image database 1005, and a partial region database 1006. The face recognition apparatus 340 includes a partial region generator 1007, a partial region similarity calculator 1008, a face recognizer 1009, a face recognition result and similarity transmitter 1010, and an operator's operation acquirer 1011.

The communication controller 1001 controls communication with the image capturing apparatus (camera) 320, the operator terminal 210, and the display control apparatus 330 via the network 350. The captured image acquirer 1002 acquires a captured image from the image capturing apparatus (camera) 320 via the communication controller 1001. The face image extractor 1003 extracts a face image from the captured image acquired by the captured image acquirer 1002. Note that if the image capturing apparatus (camera) 320 transmits a face image or the feature of the face image, the face image extractor 1003 is unnecessary. The captured face image database 1004 accumulates the captured face image to be searchable.

The collation target face image database 1005 accumulates a reference face image to undergo collation for recognition of the captured face image to be searchable. In this example embodiment, the partial region database 1006 stores a partial region, for which the similarity is calculated by collation, to be searchable. Note that the partial region database 1006 may store not only data for a partial region but also an algorithm of generating a partial region.

The partial region generator 1007 generates partial regions of the captured face image found from the captured face image database 1004 and the captured face image found from the collation target face image database 1005 based on the defined partial region selected from the partial region database 1006. The partial region similarity calculator 1008 associates the partial regions of the captured image and those of the collation target face image, which have been generated by the partial region generator 1007, and compares them, thereby calculating the similarity of each pair of partial regions. The face recognizer 1009 includes a face recognition table 1091, and recognizes whether the face images are similar based on the pattern or the accumulation of the similarities of the pairs of partial regions calculated by the partial region similarity calculator 1008.

The face recognition result and similarity transmitter 1010 transmits, to the display control apparatus 330 via the communication controller 1001, the face recognition result indicating whether the faces are similar, which has been output from the face recognizer 1009, and the similarities of the pairs of partial regions output from the partial region similarity calculator 1008. Note that the face recognition result may be directly sent to the operator terminal 210. The operator's operation acquirer 1011 receives an operator operation from the operator terminal 210 via the communication controller 1001, and executes processing corresponding to the operator operation.

Note that the face recognition apparatus 340 shown in FIG. 10 performs face recognition based on the captured face image and the collation target face image. However, if both the face images are captured face images or collation target face images, the face images are read out from the same database.

(Captured Face Image Database)

Figure 11A:
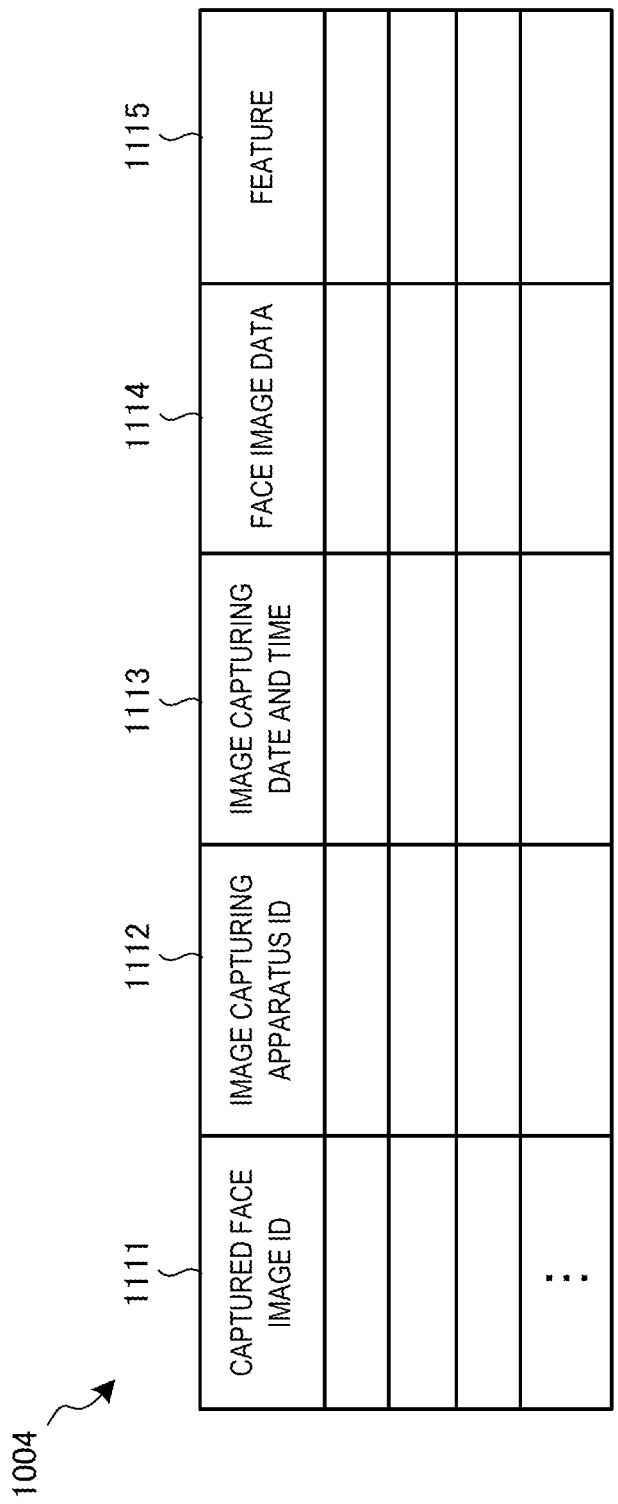
FIG. 11A is a table showing the structure of a captured face image database according to the second example embodiment of the present invention.

FIG. 11A is a table showing the structure of the captured face image database 1004 according to this example embodiment. Note that the structure of the captured face image database 1004 is not limited to that shown in FIG. 11A.

In association with a captured face image ID 1111 for identifying a captured face image, the captured face image database 1004 stores an image capturing apparatus ID 1112 for identifying an image capturing apparatus, an image capturing date and time 1113, captured face image data 1114, and a feature 1115 of the face image data.

(Collation Target Face Image Database)

Figure 11B:
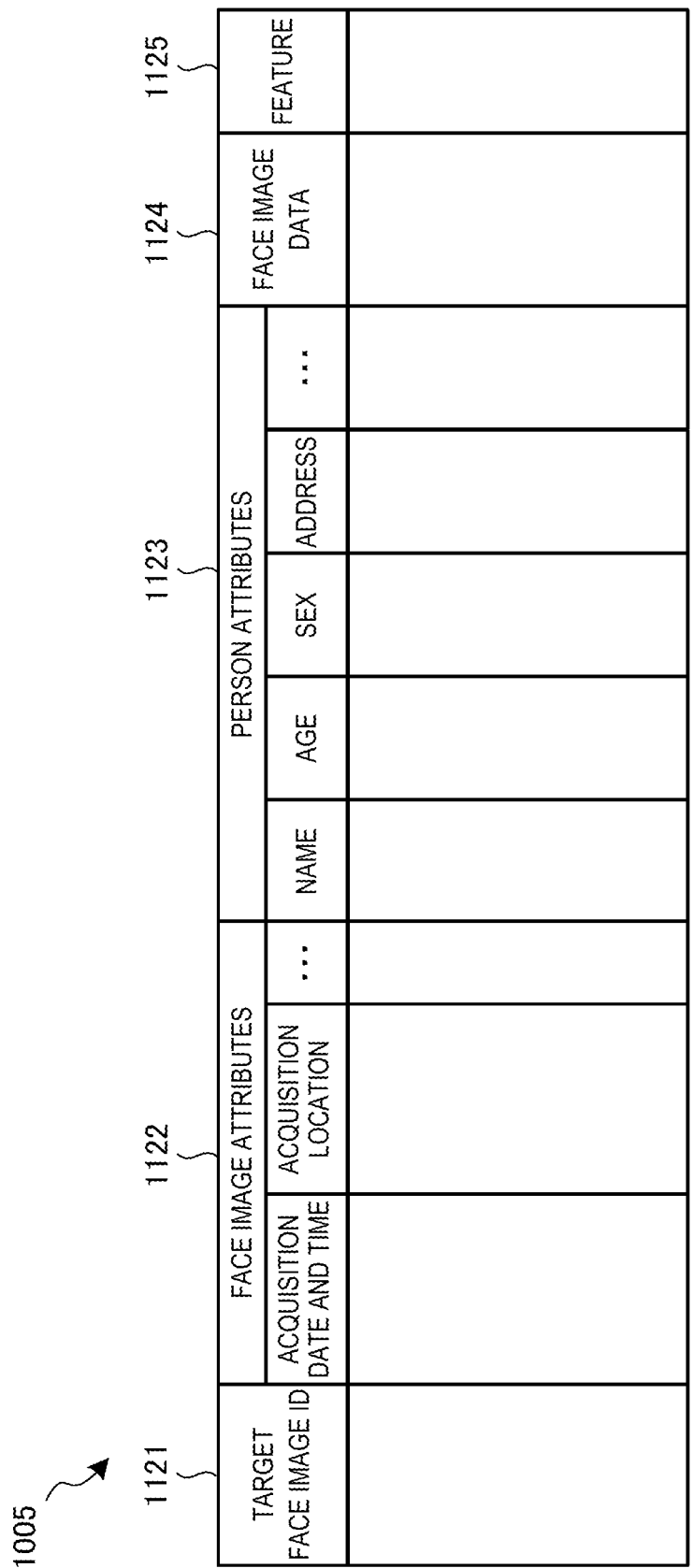
FIG. 11B is a table showing the structure of a collation target face image database according to the second example embodiment of the present invention.

FIG. 11B is a table showing the structure of the collation target face image database 1005 according to this example embodiment. Note that the structure of the collation target face image database 1005 is not limited to that shown in FIG. 11B.

In association with a target face image ID 1121 for identifying a target face image to be collated, the collation target face image database 1005 stores face image attributes 1122 added to the face image, person attributes 1123 added to the person of the face image, face image data 1124, and a feature 1125 of the face image data. The face image attributes 1122 store the acquisition date and time of the face image, the acquisition location of the face image, and the like. The person attributes 1123 store the name, age, sex, address, and the like of the person.

(Partial Region Database)

FIG. 12 is a table showing the structure of the partial region database 1006 according to this example embodiment. Note that the structure of the partial region database 1006 is not limited to that shown in FIG. 12.

The partial region database 1006 stores a partial region generation algorithm 1202 in association with a partial region ID 1201 for identifying a partial region obtained by dividing the face image. For example, as the partial region generation algorithm 1202, the size of mesh division of the face image, that is, H (vertical)×W (horizontal), regions respectively including feature portions such as eyes, a nose, and mouth, a mixture of a feature portion and a mesh (a smaller size of h (vertical)×w (horizontal)), a mixture of a mesh (a size of H (vertical)×W (horizontal)) and a mesh (a smaller size of h (vertical)×w (horizontal)), and the like are shown.

However, the algorithm is not limited to those shown in FIG. 12. For example, a fine region is set as an important region for face recognition and a coarse region is set as an unimportant region, or vice versa. The partial region generation algorithm 1202 can be changed in accordance with a method (similarity calculation method) of performing collating each pair of partial regions. The following partial region generation method is also included. •A region is generated as a mesh by a polygon such as a triangle or hexagon, or a closed curve such as a circle, instead of a rectangle. •Regions in which two or more regions overlap each other are generated. •Partial regions are generated based on an operator operation.

(Face Recognition Table)

FIG. 13 is a table showing the structure of the face recognition table 1091 according to this example embodiment. The face recognition table 1091 is used to perform face recognition based on the similarities of the pairs of partial regions in the face recognizer 1009.

The face recognition table 1091 stores a similarity score 1303 obtained by assigning a score to the similarity of each pair of partial regions and a total score 1304 in association with a captured face image ID 1301 for identifying a captured face image and a collation target face image ID 1302 for identifying a collation target face image. The face recognition table 1091 also stores a comparison result 1305 between the total score 1304 and a face similarity threshold stored in advance, and a face recognition result 1306 of similarity or dissimilarity corresponding to the comparison result 1305. Note that the total score 1304 may be calculated by giving a region weight to the similarity score 1303 of the pair of partial regions. The face similarity threshold is preferably set in accordance with the partial region division method, the similarity calculation method, and the scoring method.

<<Functional Arrangement of Operator Terminal>>

Figure 14:
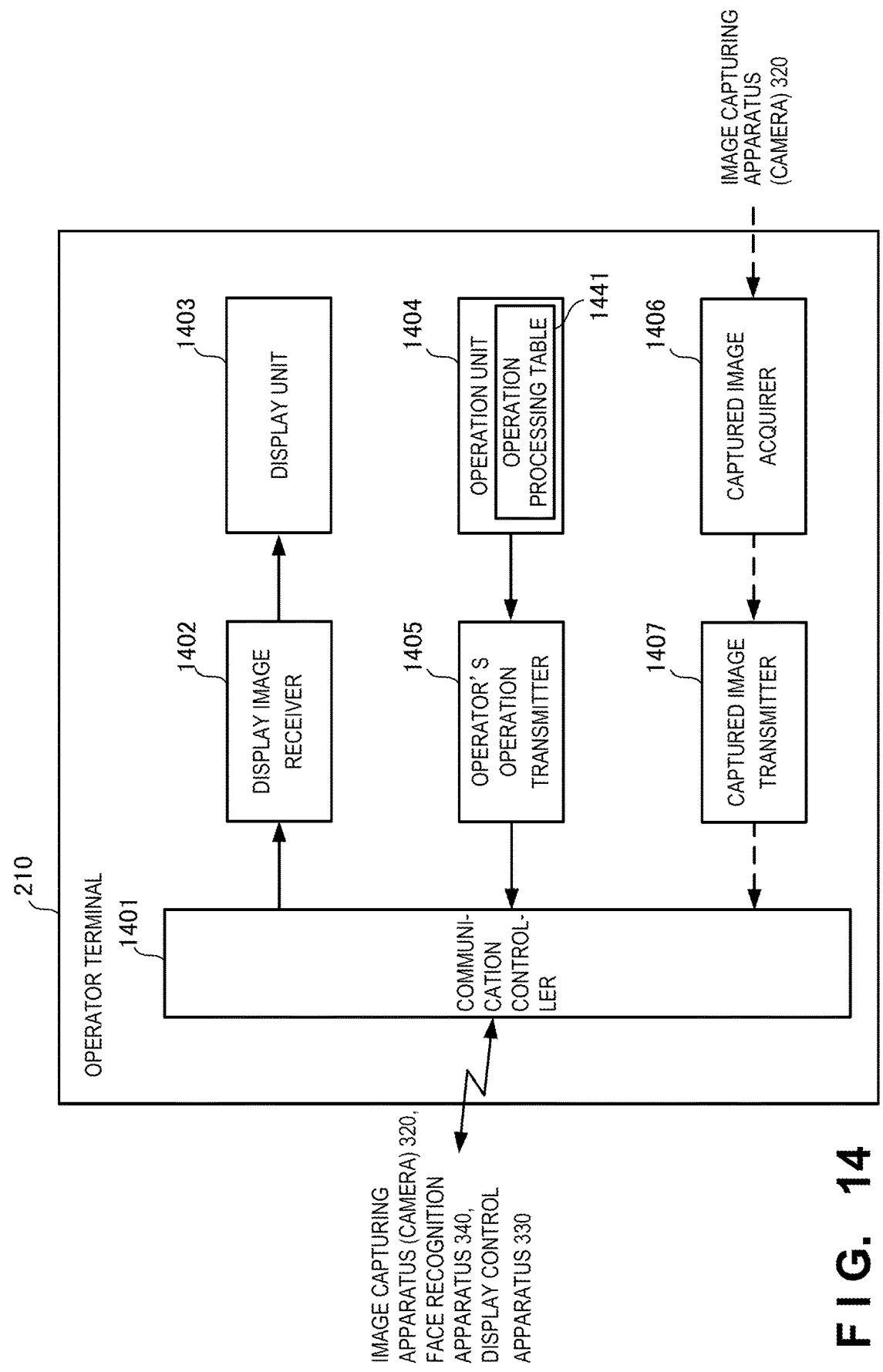
FIG. 14 is a block diagram showing the functional arrangement of an operator terminal according to the second example embodiment of the present invention.

FIG. 14 is a block diagram showing the functional arrangement of the operator terminal 210 according to this example embodiment.

The operator terminal 210 includes a communication controller 1401, a display image receiver 1402, a display unit 1403, an operation unit 1404, and an operator's operation transmitter 1405. If the image capturing apparatus (camera) 320 is locally connected to the operator terminal 210, the operator terminal 210 includes a captured image acquirer 1406 and a captured image transmitter 1407.

The communication controller 1401 controls communication with the image capturing apparatus (camera) 320, the face recognition apparatus 340, and the display control apparatus 330 via the network 350. The display image receiver 1402 receives, via the communication controller 1401, normal image data, overlaying image data, image data to be overlaid, or the like to be displayed on the display unit 1403. For example, a captured image is received from the image capturing apparatus (camera) 320. A notification image of a face recognition result is received from the face recognition apparatus 340. Image data obtained by overlaying, on each partial region of the face image, a mark indicating a result of comparison with the similarity threshold is received from the display control apparatus 330. The display unit 1403 displays the image received by the display image receiver 1402.

The operation unit 1404 includes an operation processing table 1441, and determines operation contents input by the operator from a touch panel or the like. Note that in the case of the touch panel, the operation contents are also associated with the display contents of the display unit 1403. The operator's operation transmitter 1405 transmits, via the communication controller 1401, the operation contents by the operator to the respective apparatuses that implement the operation. The captured image acquirer 1406 acquires a captured image from the locally connected image capturing apparatus (camera) 320. The captured image transmitter 1407 transmits the captured image to the face recognition apparatus 340 via the communication controller 1401. Note that a communication terminal incorporating a camera, such as a smartphone or tablet, includes the captured image acquirer 1406 and the captured image transmitter 1407.

(Operation Processing Table)

Figure 15:
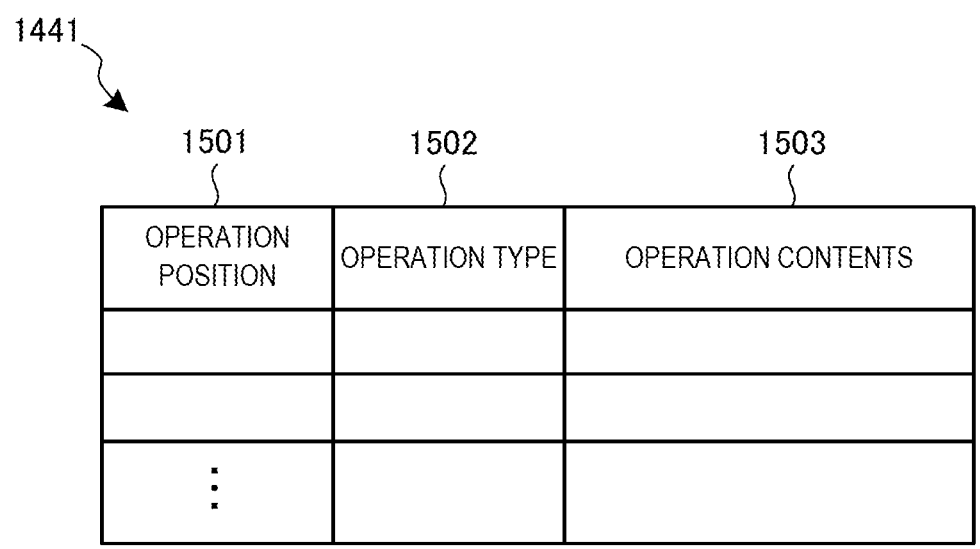
FIG. 15 is a table showing the structure of an operation processing table according to the second example embodiment of the present invention.

FIG. 15 is a table showing the structure of the operation processing table 1441 according to this example embodiment. The operation processing table 1441 is used to determine an operation input from the operator to, for example, a touch panel, and convert the operation input into an appropriate operation instruction.

The operation processing table 1441 stores operation contents 1503 in association with an operation position (coordinates) 1501 on the touch panel serving as the operation unit 1404 and an operation type 1502 of the operator (especially, a finger). Note that practical examples of the operation action and operation contents by the operator will be omitted.

<<Hardware Arrangement of Display Control Apparatus>>

Figure 16:
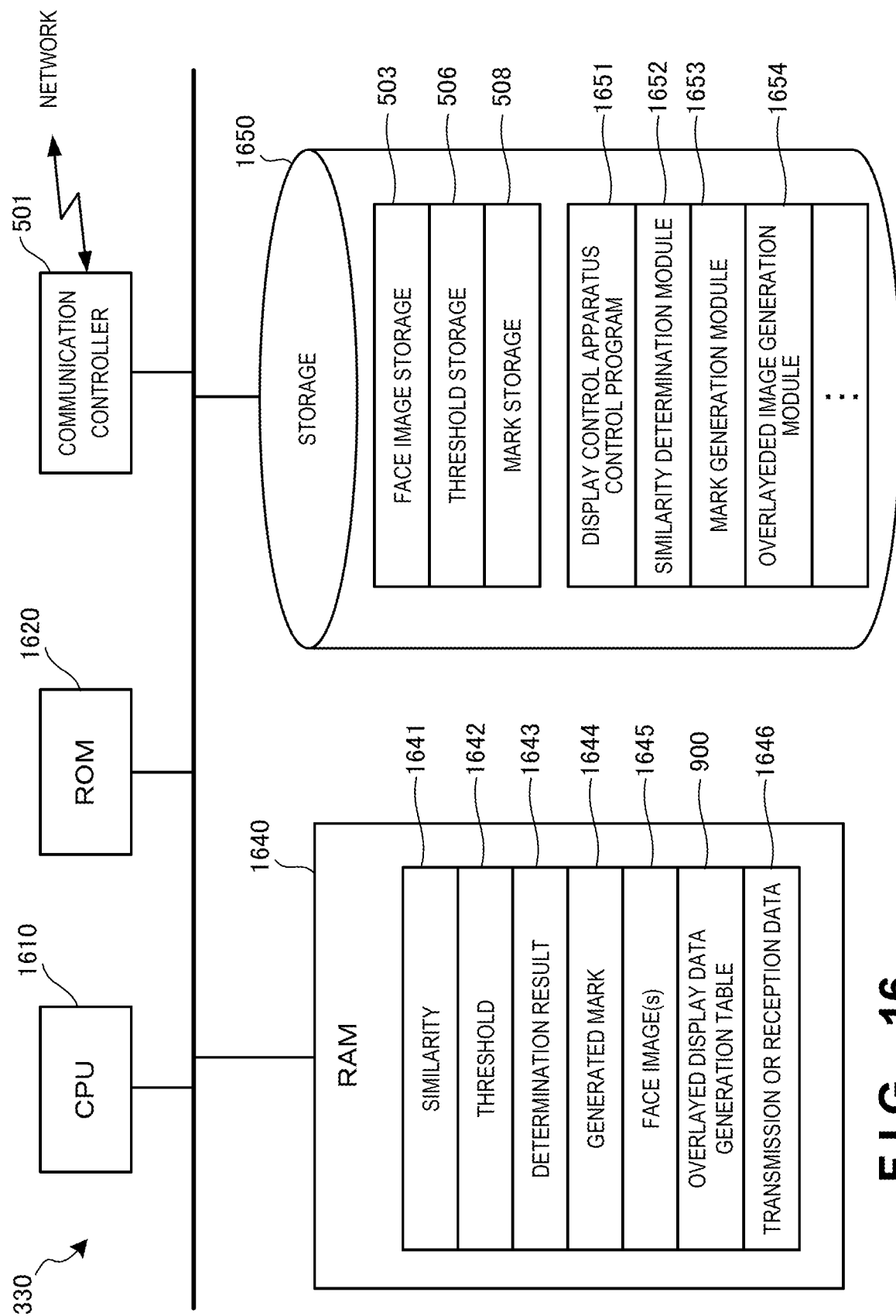
FIG. 16 is a block diagram showing the hardware arrangement of the display control apparatus according to the second example embodiment of the present invention.

FIG. 16 is a block diagram showing the hardware arrangement of the display control apparatus 330 according to this example embodiment.

Referring to FIG. 16, a CPU (Central Processing Unit) 1610 is an arithmetic control processor, and implements the functional components shown in FIG. 5 by executing a program. A ROM (Read Only Memory) 1620 stores permanent data such as initial data and a program, and programs. The communication controller 501 controls communication with the face recognition apparatus 340, the operator terminal 210, and other apparatuses via the network 350.

A RAM (Random Access Memory) 1640 is a random access memory used as a temporary storage work area by the CPU 1610. An area to store data necessary for implementation of the example embodiment is allocated to the RAM 1640. A similarity 1641 serves as an area to store the similarity of each pair of partial regions received from the face recognition apparatus 340. A threshold 1642 serves as an area to store a threshold to be compared with the similarity 1641. A determination result 1643 serves as an area to store a result of comparing the similarity 1641 of each pair of partial regions with the threshold 1642. A generated mark 1644 serves as an area to store a mark corresponding to the determination result 1643, with which the similarity can be recognized at a glance. A face image 1645 serves as an area to store a face image on which the generated mark 1644 is overlaid. The overlaid display data generation table 900 serves as an area to store a table for generating overlaid display data, as shown in FIG. 9. Transmission/reception data 1646 serves as an area to store data transmitted/received via the communication controller 501.

A storage 1650 stores a database, various parameters, or the following data or programs necessary for implementation of the example embodiment. As shown in FIG. 6, the face image storage 503 stores a face image in which a mark is overlaid on each partial region. As shown in FIG. 7, the threshold storage 506 stores a threshold to be compared with the similarity of each pair of partial regions. As shown in FIG. 8A, the mark storage 508 stores a mark to be overlaid, in accordance with a result of comparing the similarity of each pair of partial regions with the threshold. The storage 1650 stores the following programs. A display control apparatus control program 1651 is a program for controlling the overall display control apparatus 330. A similarity determination module 1652 is a module for generating a determination result by comparing the similarity of each pair of partial regions with the threshold. A mark generation module 1653 is a module for generating a mark corresponding to the determination result of the similarity determination module 1652 with reference to the mark storage 508. An overlaid image generation module 1654 is a module for generating overlaid display data by overlaying the generated mark 1644 on the face image 1645 and controlling display in the operator terminal 210.

Note that programs and data which are associated with the general-purpose functions of the display control apparatus 330 and other feasible functions are not shown in the RAM 1640 or the storage 1650 of FIG. 16.

<<Processing Procedure of Display Control Apparatus>>

Figure 17:
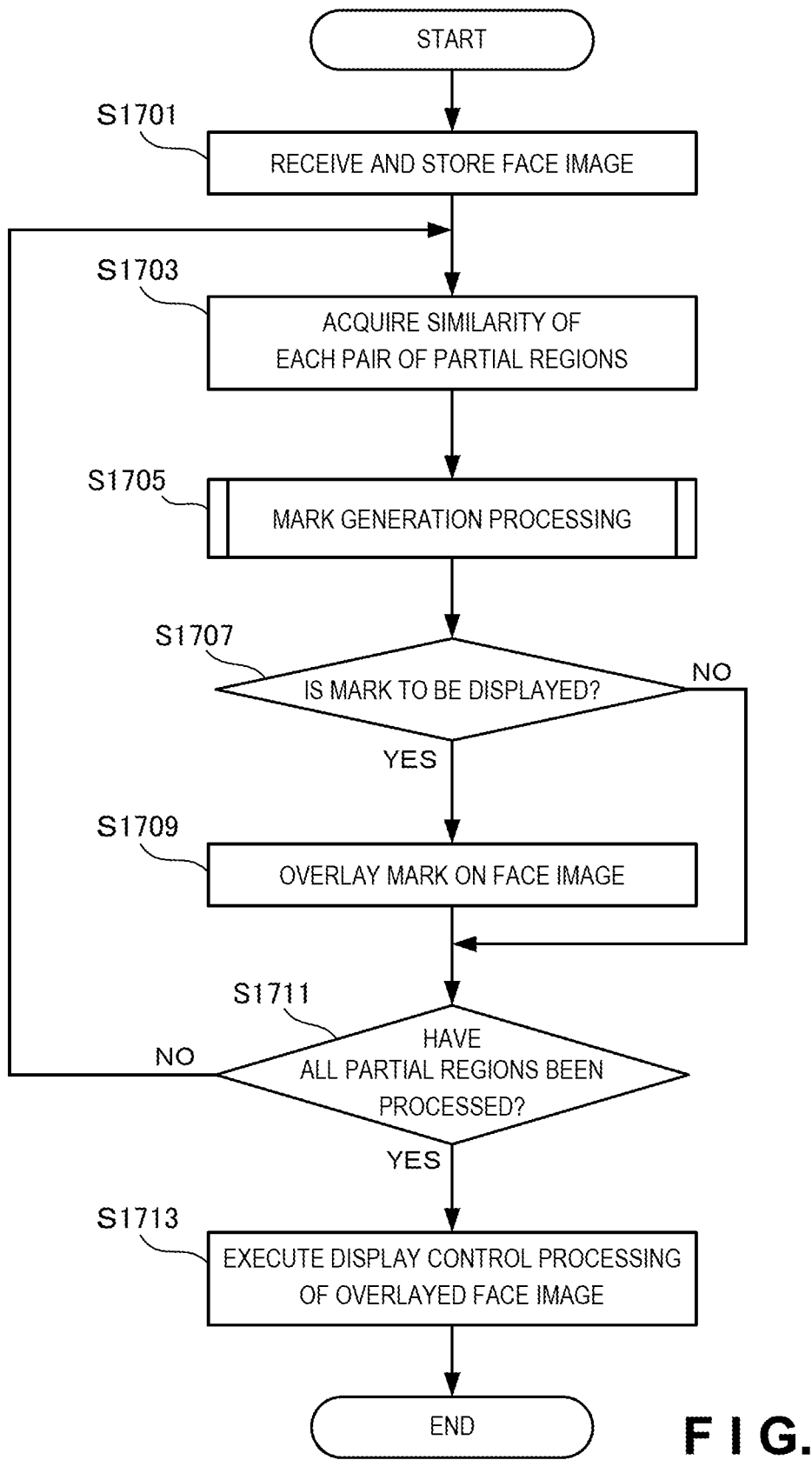
FIG. 17 is a flowchart illustrating the processing procedure of the display control apparatus according to the second example embodiment of the present invention.

FIG. 17 is a flowchart illustrating the processing procedure of the display control apparatus 330 according to this example embodiment.

This flowchart is executed by the CPU 1610 of FIG. 16 using the RAM 1640, thereby implementing the functional components of FIG. 5.

In step S1701, the display control apparatus 330 receives face images, and stores them in the face image storage 503. In step S1703, the display control apparatus 330 acquires the similarity of each pair of partial regions of the face images from the face recognition apparatus 340. In step S1705, the display control apparatus 330 executes mark generation processing of generating a corresponding mark by comparing the similarity of each pair of partial regions with the threshold.

After generating the mark corresponding to each pair of partial regions, the display control apparatus 330 determines in step S1707 based on an operator operation in the operator terminal 210 whether the mark is to be overlaid and displayed. If the operator instructs to display the mark, the display control apparatus 330 overlays, in step S1709, the mark corresponding to the similarity on the partial region of the face image.

In step S1711, the display control apparatus 330 determines whether the all partial regions have been processed. If the all partial regions have not been processed, the display control apparatus 330 returns to step S1703 to acquire the similarity of each of the remaining pairs of partial regions, and repeats the processes up to step S1709; otherwise, the display control apparatus 330 executes, in step S1713, display control processing so that the face image on which the marks are overlaid is displayed on the display unit 1403 of the operator terminal 210.

(Mark Generation Processing: Threshold)

Figure 18A:
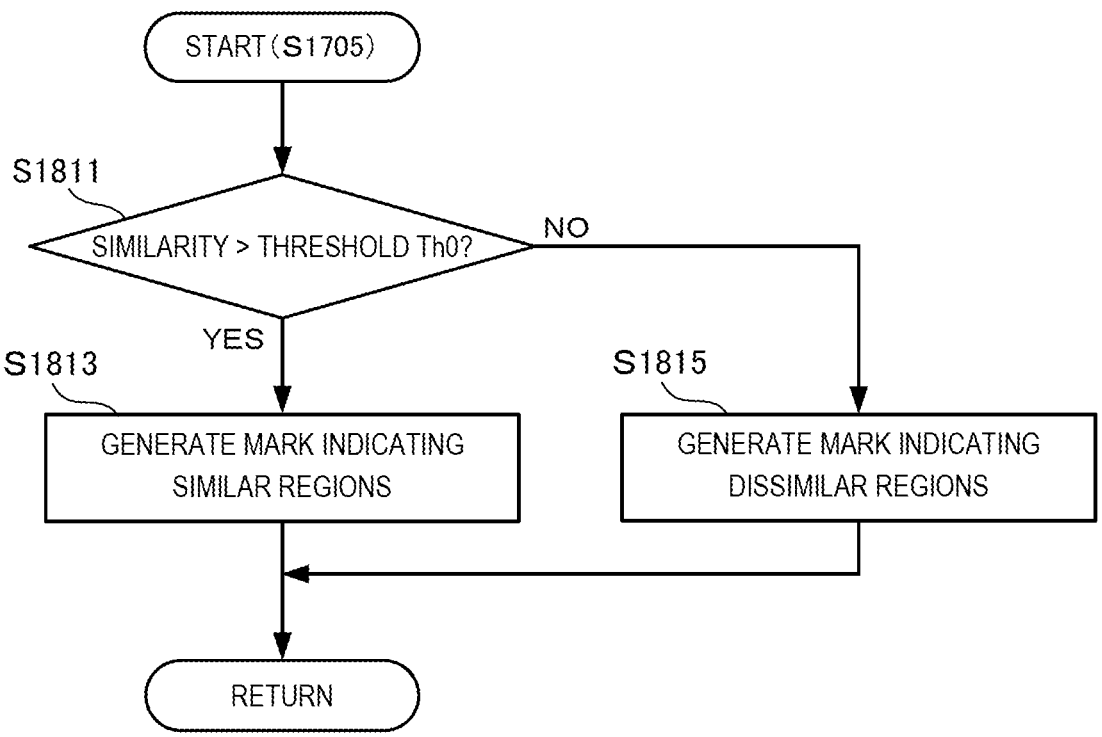
FIG. 18A is a flowchart illustrating an example of the procedure of mark generation processing according to the second example embodiment of the present invention.

FIG. 18A is a flowchart illustrating an example of the procedure of the mark generation processing (S1705) according to this example embodiment. FIG. 18A shows an example in which corresponding marks are generated using one threshold when the similarity of the pair of partial regions exceeds the threshold and when the similarity of the pair of partial regions does not exceed the threshold.

In step S1811, the display control apparatus 330 determines whether the similarity of each pair of partial regions exceeds the threshold Th0. If the similarity exceeds the threshold Th0, the display control apparatus 330 generates, in step S1813, a mark indicating that the partial regions are similar regions whose similarity exceeds the threshold Th0 so as to represent the similarity level. On the other hand, if the similarity does not exceed the threshold Th0, the display control apparatus 330 generates, in step S1815, a mark indicating that the partial regions are dissimilar regions whose similarity does not exceed the threshold Th0 so as to represent the similarity level.

Note that if the mark is overlaid only when the threshold is or is not exceeded, one of steps S1813 and S1815 is necessary. Alternatively, both the marks may be generated and one of the marks may be selected to be overlaid at the time of overlaying.

(Mark Generation Processing: First and Second Thresholds)

Figure 18B:
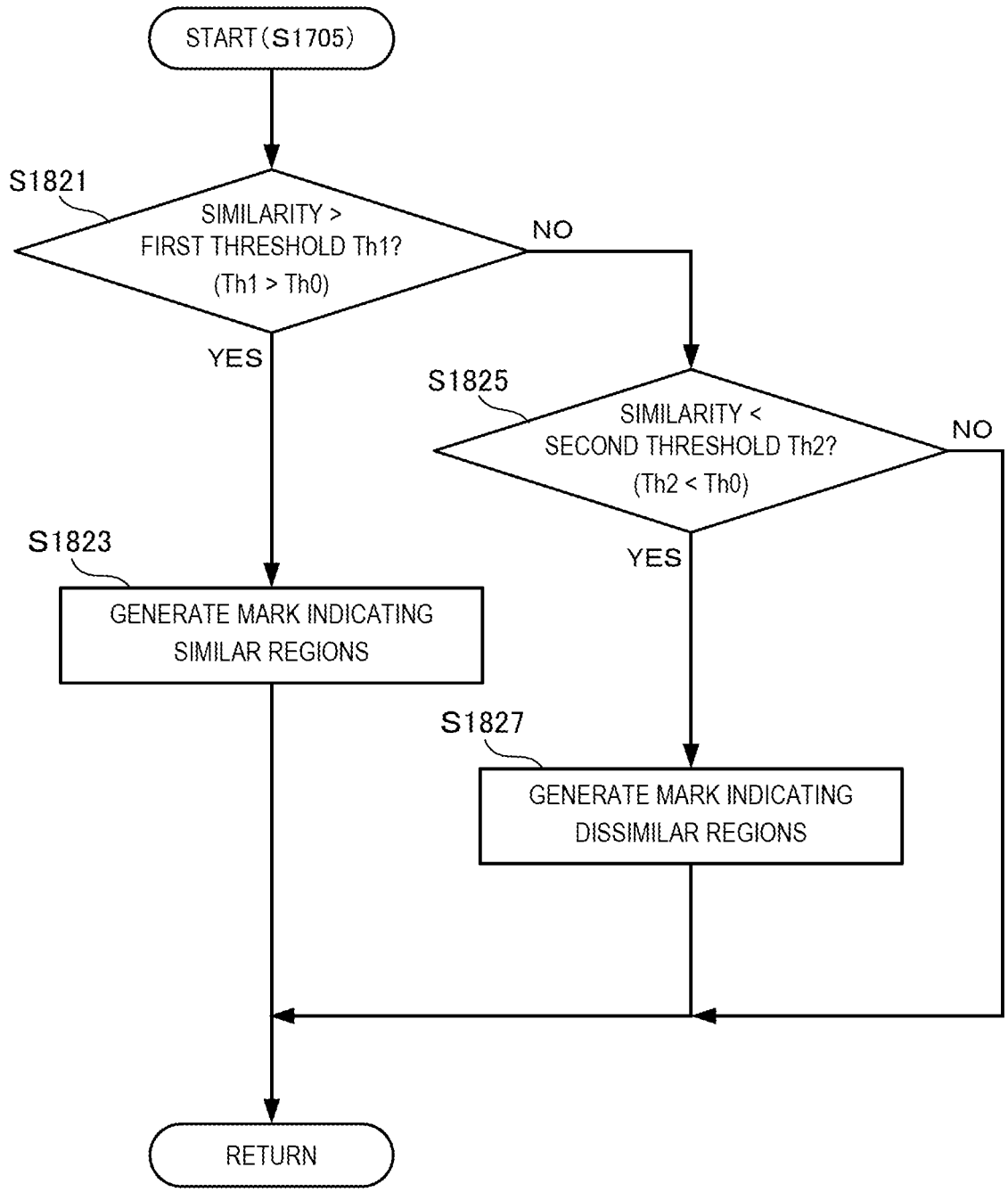
FIG. 18B is a flowchart illustrating another example of the procedure of the mark generation processing according to the second example embodiment of the present invention.

FIG. 18B is a flowchart illustrating another example of the procedure (S1705) of the mark generation processing according to this example embodiment. FIG. 18B shows an example in which corresponding marks are generated using the two thresholds when the similarity of the pair of partial regions exceeds the higher threshold and when the similarity of the pair of partial regions is smaller than the lower threshold.

In step S1821, the display control apparatus 330 determines whether the similarity of each pair of partial regions exceeds the threshold Th1 (>Th0). If the similarity exceeds the threshold Th1, the display control apparatus 330 generates, in step S1823, a mark indicating that the partial regions are similar regions whose similarity exceeds the threshold Th1 so as to represent the similarity level. On the other hand, the display control apparatus 330 determines in step S1825 whether the similarity of each pair of partial regions is smaller than the threshold Th2 (<Th0). If the similarity is smaller than the threshold Th2 (<Th0), the display control apparatus 330 generates, in step S1827, a mark indicating that the partial regions are dissimilar regions whose similarity is smaller than the threshold Th2 so as to represent the similarity level.

Note that if the mark is overlaid only when the threshold is or is not exceeded, only steps S1821 and S1823 or steps S1825 and S1827 are necessary. Alternatively both the marks may be generated and one of the marks may be selected to be overlaid at the time of overlaying.

<<Hardware Arrangement of Face Recognition Apparatus>>

Figure 19:
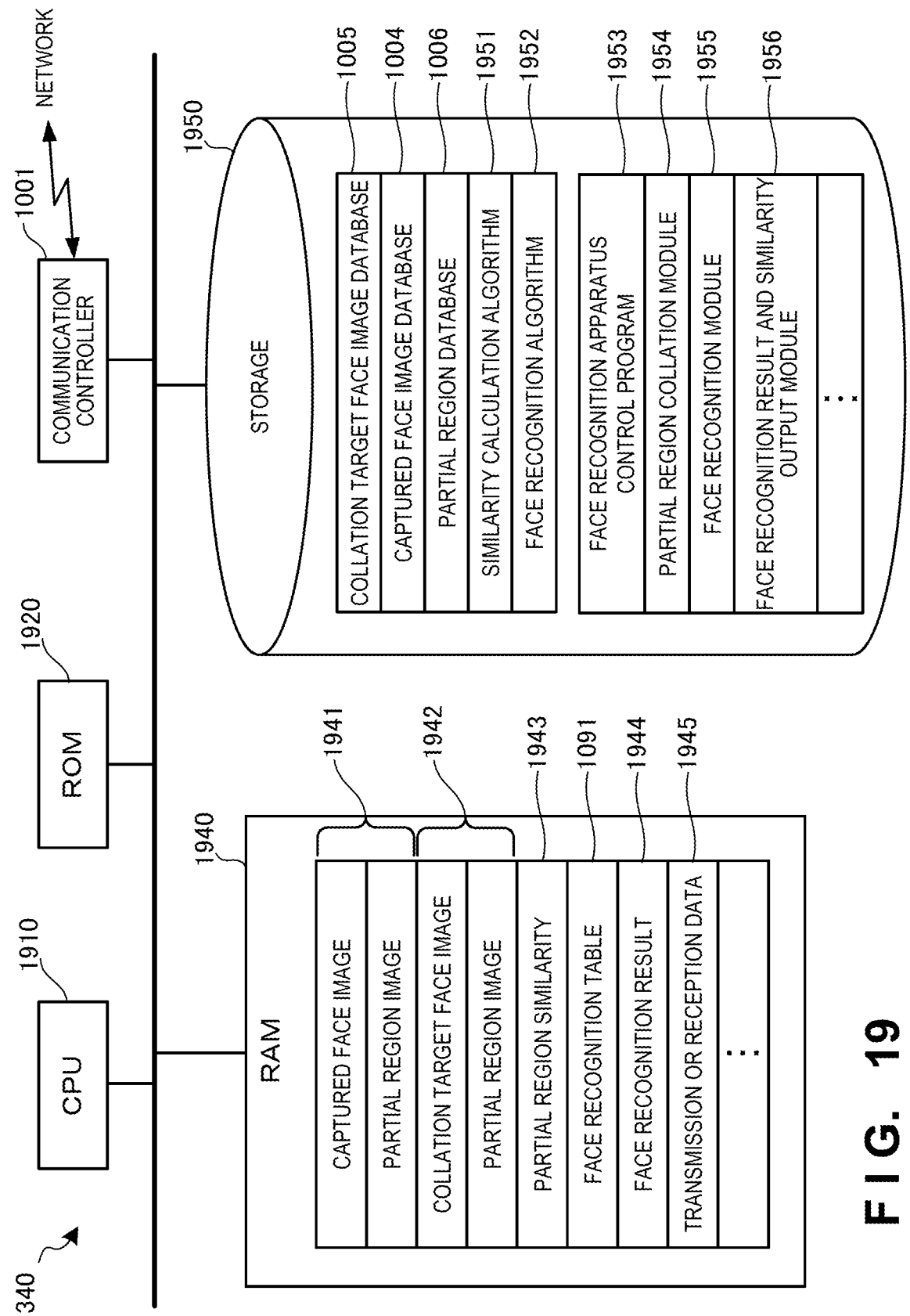
FIG. 19 is a block diagram showing the hardware arrangement of the face recognition apparatus according to the second example embodiment of the present invention.

FIG. 19 is a block diagram showing the hardware arrangement of the face recognition apparatus 340 according to this example embodiment.

Referring to FIG. 19, a CPU 1910 is an arithmetic control processor, and implements the functional components shown in FIG. 5 by executing a program. A ROM 1920 stores permanent data such as initial data and a program, and programs. The communication controller 1001 controls communication with the display control apparatus 330, the operator terminal 210, and other apparatuses via the network 350.

A RAM 1940 is a random access memory used as a temporary storage work area by the CPU 1910. An area to store data necessary for implementation of the example embodiment is allocated to the RAM 1940. A captured face image and partial region image 1941 serve as areas to store a captured face image and its partial region images. A collation target face image and partial region image 1942 serve as areas to store an accumulated collation target face image and its partial region images. A partial region similarity 1943 serves as an area to store a similarity as a result of collating the corresponding partial regions of the captured face image and collation target image. The face recognition table 1091 serves as an area to store a table for performing face recognition based on the similarities of the pairs of partial regions, as shown in FIG. 13. A face recognition result 1944 serves as an area to store a result of performing face recognition using the face recognition table 1091.

Transmission/reception data 1945 serves as an area to store data transmitted/received to/from the display control apparatus 330, the operator terminal 210, and the image capturing apparatus (camera) 320 via the communication controller 1001.

A storage 1950 stores a database, various parameters, or the following data or programs necessary for implementation of the example embodiment. As shown in FIG. 11B, the collation target face image database 1005 is a database for accumulating collation target images. As shown in FIG. 11A, the captured face image database 1004 is a database for storing face images captured by the image capturing apparatus (camera) 320. As shown in FIG. 12, the partial region database 1006 is a database for defining a partial region appropriate for collation of the face images. A similarity calculation algorithm 1951 stores an algorithm for calculating the similarity of each pair of partial regions of the face images. A face recognition algorithm 1952 stores an algorithm for performing face recognition based on the similarities of the pairs of partial regions. The storage 1950 stores the following programs. A face recognition apparatus control program 1953 is a program for controlling the overall face recognition apparatus 340. A partial region collation module 1954 is a module for performing comparison and collation to generate partial regions of the captured face image and collation target face image and generate the similarity of each pair of partial regions. A face recognition module 1955 is a module for recognizing the face image based on the similarities of the pairs of partial regions. A face recognition result and similarity output module 1956 is a module for outputting, to the display control apparatus 330 or the operator terminal 210, the face recognition result as an output from the face recognition module 1955 and the similarities of the pairs of partial regions as an output from the partial region collation module 1954.

Note that programs and data which are associated with the general-purpose functions of the face recognition apparatus 340 and other feasible functions are not shown in the RAM 1940 or the storage 1950 of FIG. 19.

<<Processing Procedure of Face Recognition Apparatus>>

Figure 20:
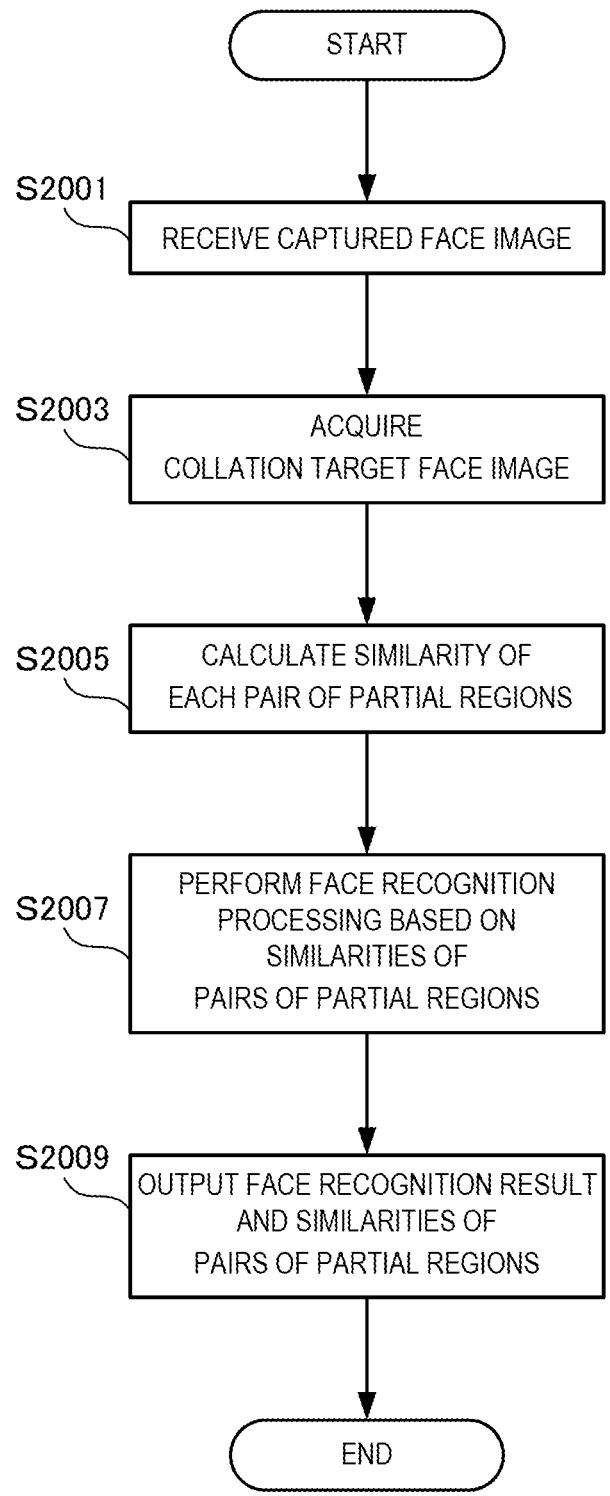
FIG. 20 is a flowchart illustrating the processing procedure of the face recognition apparatus according to the second example embodiment of the present invention.

FIG. 20 is a flowchart illustrating the processing procedure of the face recognition apparatus 340 according to this example embodiment. This flowchart is executed by the CPU 1910 of FIG. 19 using the RAM 1940, thereby implementing the functional components of FIG. 10.

In step S2001, the face recognition apparatus 340 receives a captured face image from the image capturing apparatus (camera) 320. Alternatively, the face recognition apparatus 340 receives a captured image and extracts a face image. In step S2003, the face recognition apparatus 340 acquires a collation target face image from the collation target face image database 1005. Note that acquisition of the collation target face image may be implemented by sequentially reading out the images without any algorithm, but it is desirable to read out a collation target face image within a selected range in accordance with the feature of the captured image or an instruction from the operator, and perform collation.

In step S2005, the face recognition apparatus 340 divides each of the captured face image and the collation target face image into identical partial regions, and calculates the similarity of each pair of partial regions. In step S2007, the face recognition apparatus 340 performs face recognition processing based on the similarities of the pairs of partial regions. In step S2009, the face recognition apparatus 340 outputs a face recognition result and the similarities of the pairs of partial regions to the display control apparatus 330 or the operator terminal 210.

According to this example embodiment, by controlling to overlay and display, on a face image, marks each indicating whether the similarity exceeds the threshold or not, the operator can grasp a factor for a face recognition result at a glance, and confirm or modify the face recognition result on the spot.

Third Example Embodiment

A face recognition system including a display control apparatus according to the third example embodiment of the present invention will be described next. The display control apparatus according to this example embodiment is different from that according to the second example embodiment in that a new connected region is generated by connecting adjacent partial regions having similarities falling within a predetermined range, and overlaid and displayed on a face image. The remaining components and operations are the same as those in the second example embodiment. Hence, the same reference numerals denote the same components and operations, and a detailed description thereof will be omitted.

<<Display Screen of Face Recognition Result>>

Figure 21:
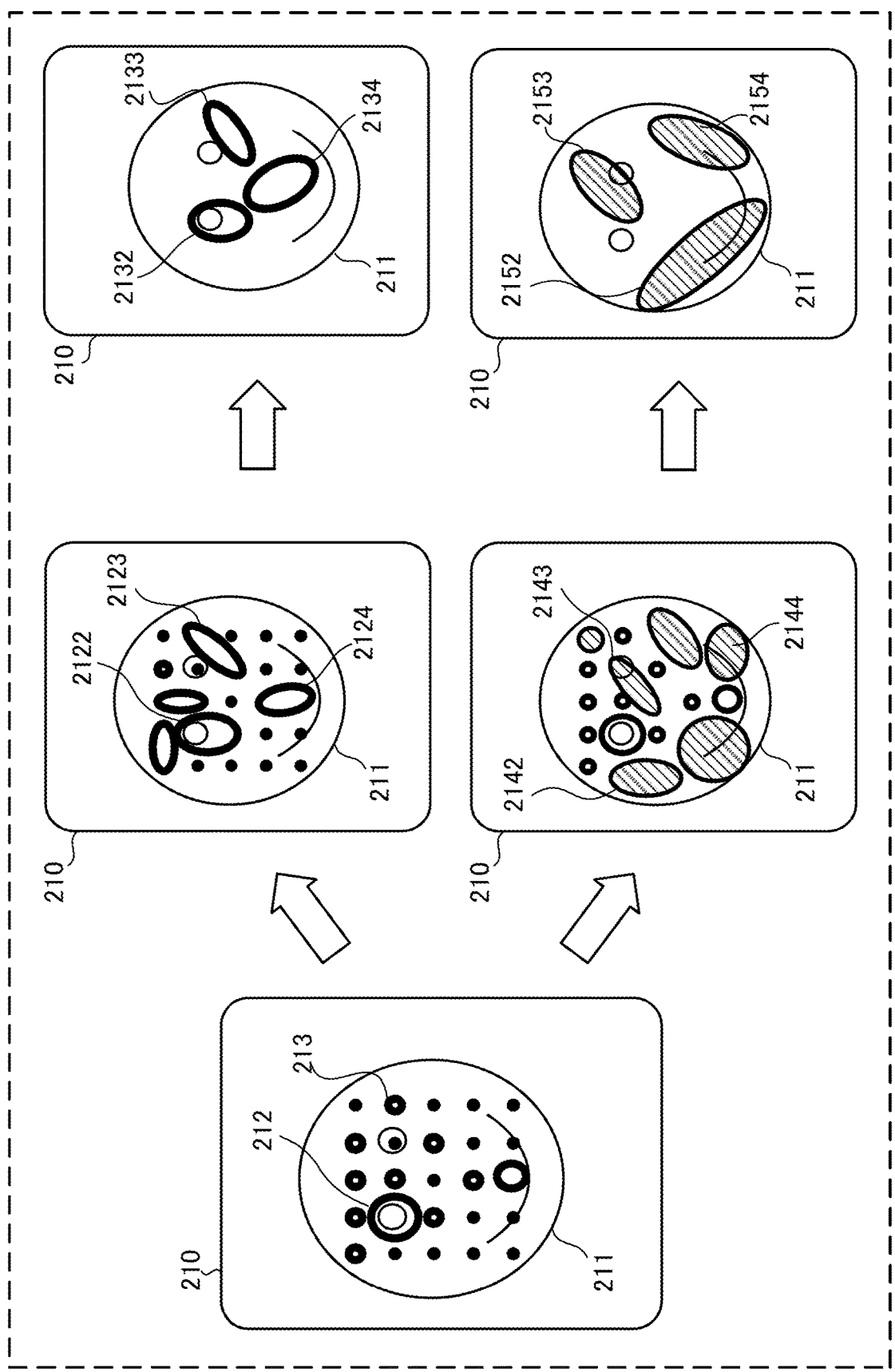
FIG. 21 is a view showing an outline of a display screen according to the third example embodiment of the present invention.

FIG. 21 is a view showing an outline of the display screen of a terminal 210 according to this example embodiment. The display screen shown in FIG. 21 is not limited, and may be the display screen of a mobile terminal, the display screen of a PC, or an apparatus dedicated for face recognition or surveillance. Note that in FIG. 21, the same reference numerals as those in FIG. 2A denote the same components and a repetitive description thereof will be omitted.

The display screen of the terminal 210 shown at the left end of FIG. 21 is the same as that shown on the left side of FIG. 2A. Display screens shown at the center and right end on the upper side of FIG. 21 are obtained by connecting similar regions whose partial region similarities exceed a threshold in the display screen at the left end to more readily recognize the similar regions. On the other hand, display screens shown at the center and right end on the lower side of FIG. 21 are obtained by connecting dissimilar regions whose partial region similarities do not exceed the threshold in the display screen at the left end to more readily recognize the dissimilar regions.

The display screen of the terminal 210 shown at the center on the upper side of FIG. 21 displays regions 2122 to 2124 obtained by connecting regions where marks "○" 212 of a large size or marks "○" 213 of a small size are adjacent to each other in the display screen at the left end. The display screen of the terminal 210 shown at the right end on the upper side of FIG. 21 displays regions 2132 to 2134 obtained by further connecting the regions 2122 to 2124 in the display screen at the center on the upper side. On the upper side of FIG. 21, similar regions whose similarities exceed the threshold are combined (connected) based on a result of collating the similarities of the pairs of subdivided partial regions of the face images with the threshold, thereby changing the partial regions to the similar regions divided more coarsely.

The display screen of the terminal 210 shown at the center on the lower side of FIG. 21 displays regions 2142 to 2144 obtained by connecting regions where marks "●" are adjacent to each other in the display screen at the left end. The display screen of the terminal 210 shown at the right end on the lower side of FIG. 21 displays regions 2152 to 2154 obtained by further connecting the regions 2142 to 2144 in the display screen at the center on the lower side. On the lower side of FIG. 21, dissimilar regions are combined (connected) based on a result of collating the similarities of the pairs of subdivided partial regions of the face images with the threshold, thereby changing the partial regions to the dissimilar regions divided more coarsely.

Note that the similar regions or dissimilar regions are connected by processing of connecting adjacent similar regions or adjacent dissimilar regions, by processing of changing the threshold and connecting remaining portions as similar regions or dissimilar regions, or by changing the initial size (corresponding to the division number) of the partial regions. FIG. 21 shows only three stages. However, partial regions of multiple stages can be implemented and the number of stages at which the operator recognizes a similarity factor more easily when referring to the face images can be selected. Since an appropriate number of stages is influenced by the size of the display screen, the size and density of the face image, the shape of the overlaying mark, and the like, the operator may select the number of stages.

<<Functional Arrangement of Display Control Apparatus>>

Figure 22:
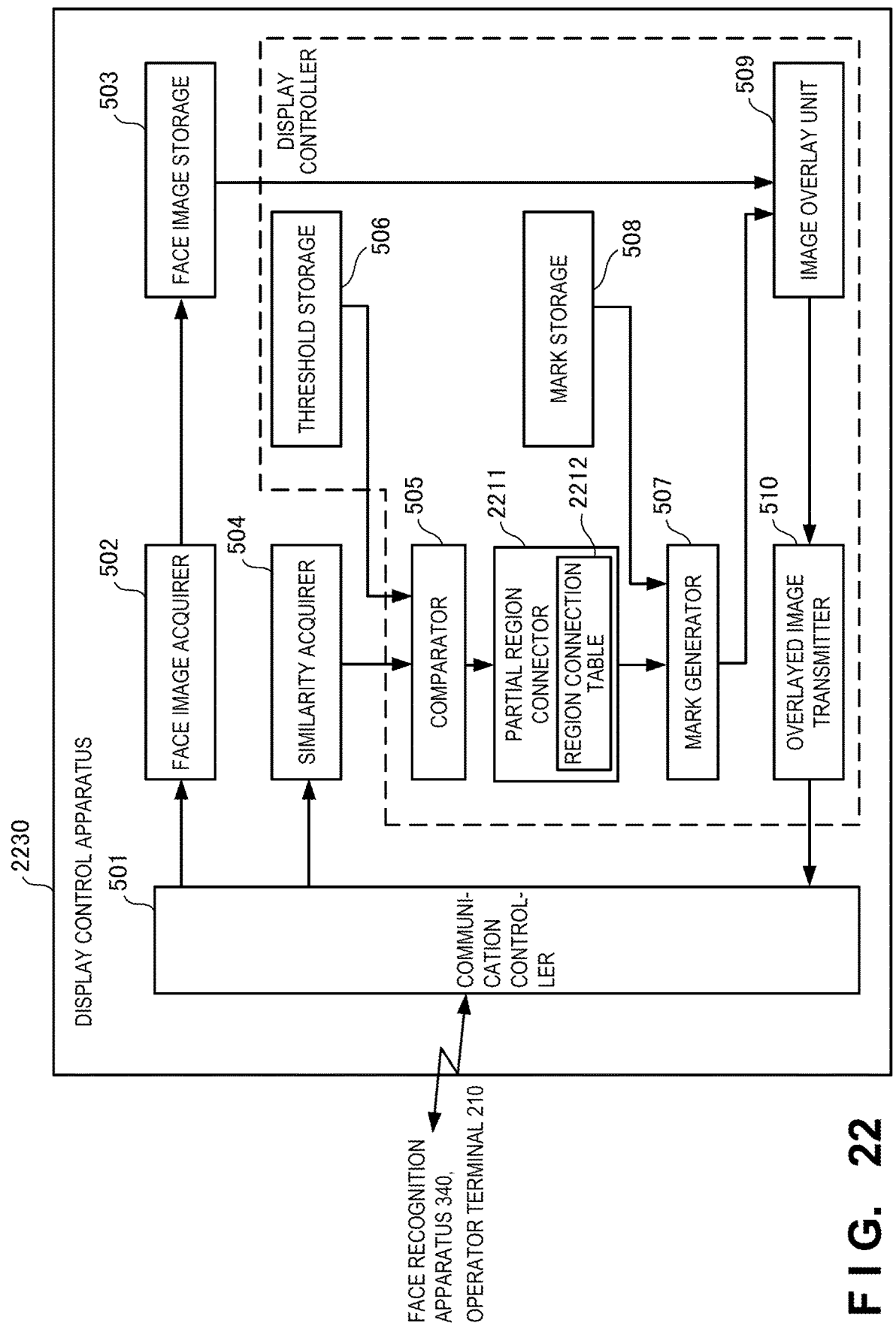
FIG. 22 is a block diagram showing the functional arrangement of a display control apparatus according to the third example embodiment of the present invention.

FIG. 22 is a block diagram showing the functional arrangement of a display control apparatus 2230 according to this example embodiment. Note that in FIG. 22, the same reference numerals as those in FIG. 5 denote the same functional components and a repetitive description thereof will be omitted.

A partial region connector 2211 includes a region connection table 2212, and connects adjacent similar regions or adjacent dissimilar regions based on a comparison result indicating similar regions or dissimilar regions as an output from a comparator 505, and causes a mark generator 507 to generate a larger mark indicating a connected region.

Note that as described with reference to FIG. 21, if the initial size (corresponding to the division number) of the partial regions is gradually changed, a face recognition apparatus 340 in the face recognition system according to this example embodiment changes the size (corresponding to the division number) of the partial regions. However, an apparatus or system in which a display control apparatus 330 and the face recognition apparatus 340 are integrated can uniformly, gradually change the size (corresponding to the division number) of the partial regions.

(Region Connection Table)

FIG. 23 is a table showing the structure of the region connection table 2212 according to this example embodiment. The region connection table 2212 is used by the partial region connector 2211 to connect similar regions or dissimilar regions and by the mark generator 507 to generate a connection mark corresponding to a new connected region.

In association with a partial region ID 2301 for identifying a partial region, the region connection table 2212 stores a similarity condition 2302 for connection, a position condition 2303 for connection, and a result 2304 of whether or not to connect regions. The region connection table 2212 also stores connected region coordinates 2305 of the connected region on the face image after connecting the partial regions, and a connection mark 2306 to be overlaid on the connected region of the face image. Note that as for the connected region coordinates 2305 and the connection mark 2306, the same coordinates and connection mark are assigned to connected partial regions 2310.

<<Region Connection Processing Procedure>>

Figure 24:
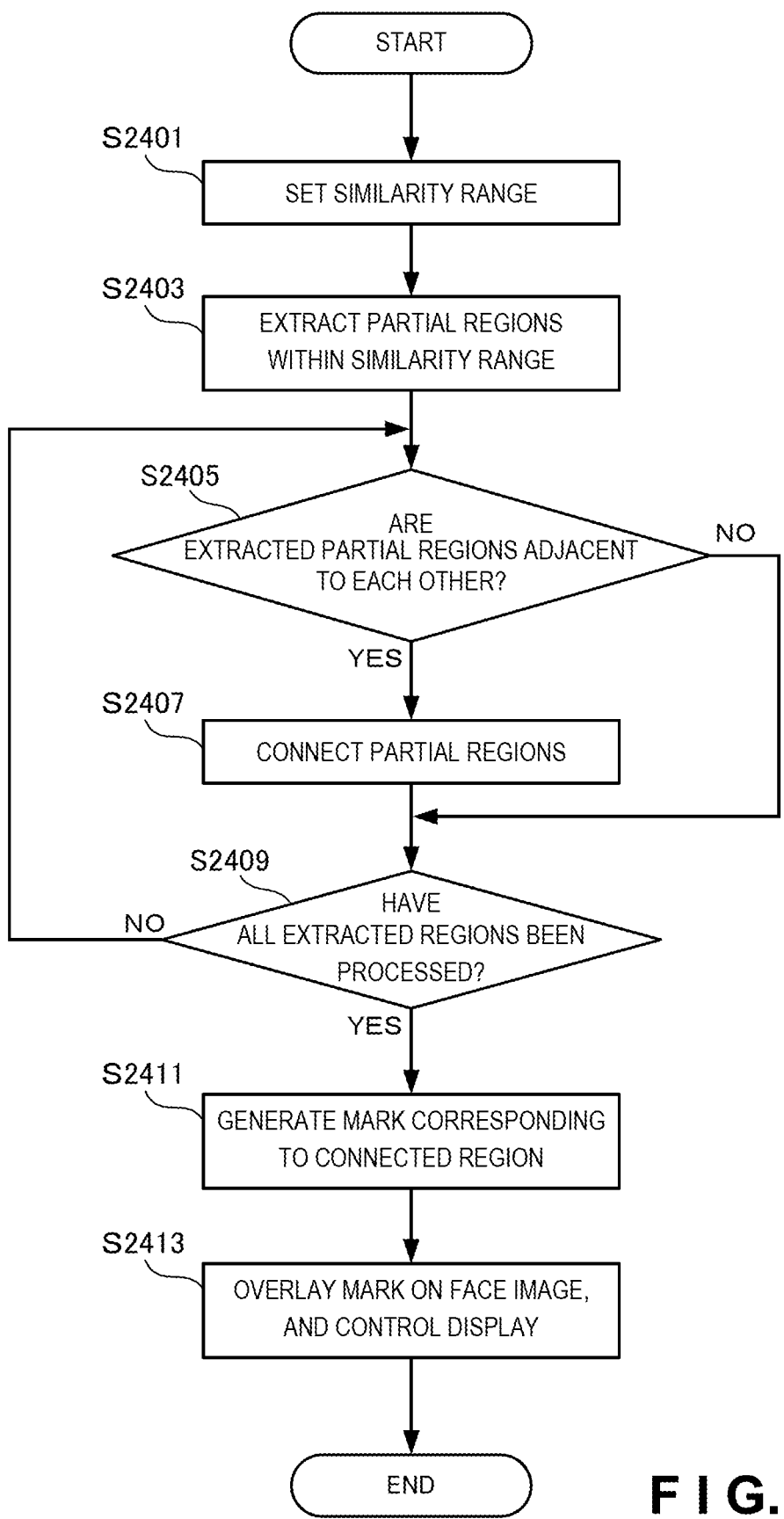
FIG. 24 is a flowchart illustrating the procedure of the region connection processing of the display control apparatus according to the third example embodiment of the present invention.

FIG. 24 is a flowchart illustrating the procedure of the region connection processing of the display control apparatus 2230 according to this example embodiment. This flowchart is executed by a CPU 1610 of FIG. 16 using a RAM 1640, thereby implementing the functional components of FIG. 22. Note that processing of overlaying the mark of the similarity on the face images is similar to the processing procedure shown in FIG. 17 and a description thereof will be omitted.

In step S2401, the display control apparatus 2230 sets a similarity range to connect partial regions. In step S2403, the display control apparatus 2230 extracts partial regions within the set similarity range. In step S2405, the display control apparatus 2230 selects adjacent partial regions from the extracted partial regions within the similarity range. If there are adjacent partial regions, the display control apparatus 2230 connects, in step S2407, the adjacent partial regions within the set similarity range.

In step S2409, the display control apparatus 2230 determines whether all the partial regions extracted in step S2403 have been processed. Steps S2405 to S2409 are repeated until all the partial regions are processed. If the processing of all the extracted partial regions ends, the display control apparatus 2230 generates, in step S2411, a mark corresponding to the larger connected region generated by connecting the partial regions. In step S2413, the display control apparatus 2230 overlays the connection mark indicating the connected region of the face image, and controls display on the operator terminal 210.

Note that the connection mark may also represent the similarity level by changing the shape, color, density, transparency, or the like.

According to this example embodiment, since a new connected region is generated by connecting adjacent partial regions having similarities falling within the predetermined range, and overlaid and displayed on a face image, the operator can readily grasp a factor for a face recognition result, and confirm or modify the face recognition result on the spot.

Fourth Example Embodiment

A face recognition system including a display control apparatus according to the fourth example embodiment of the present invention will be described next. The display control apparatus according to this example embodiment is different from those according to the second and third example embodiments in that partial regions as a factor for erroneous face recognition are generated, and overlaid and displayed on face images. The remaining components and operations are the same as those in the second and third example embodiments. Hence, the same reference numerals denote the same components and operations, and a detailed description thereof will be omitted.

<<Display Screen of Face Recognition Result>>

Figure 25:
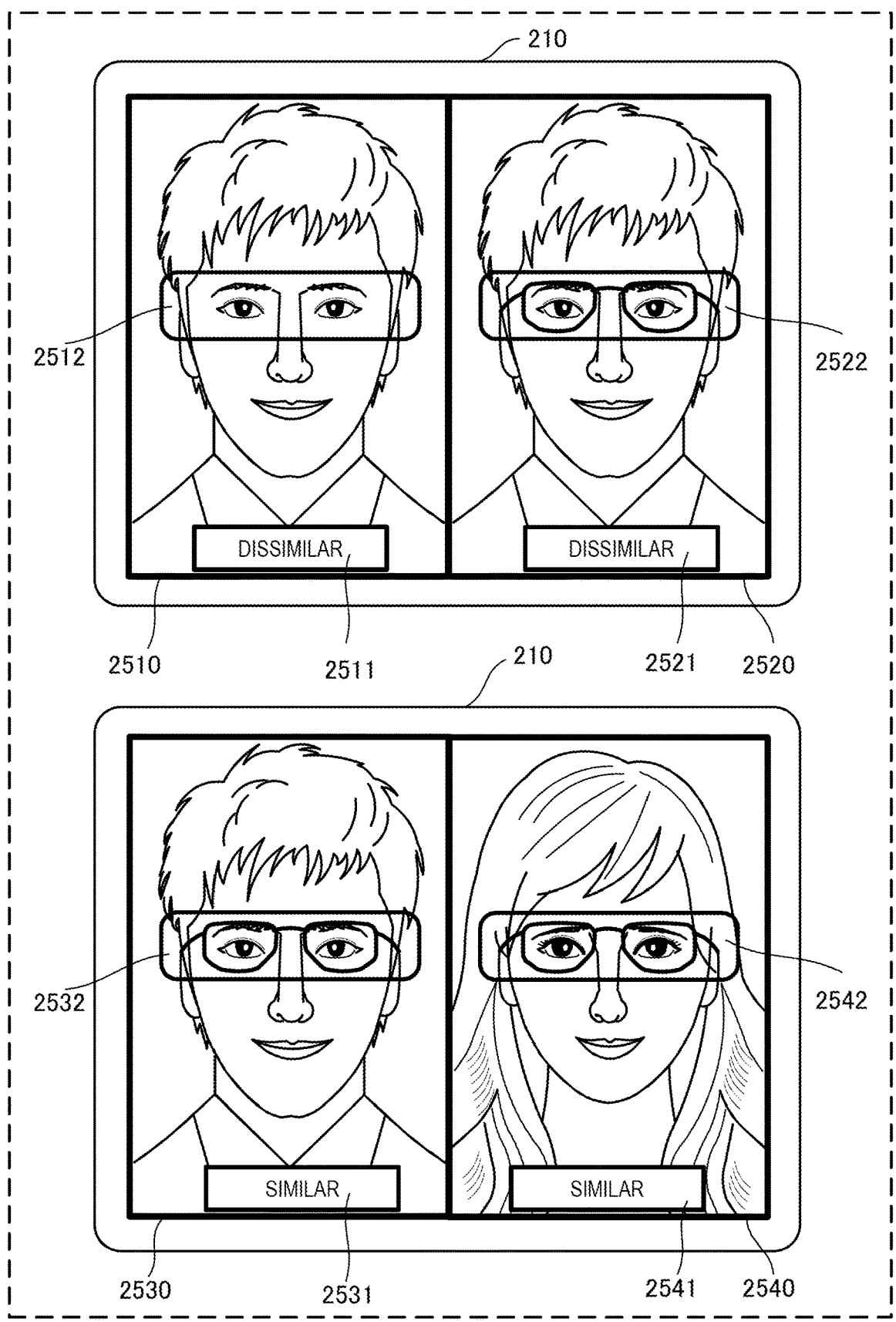
FIG. 25 is a view showing an outline of a display screen according to the fourth example embodiment of the present invention.

FIG. 25 is a view showing an outline of the display screen of a terminal 210 according to this example embodiment. The display screen shown in FIG. 25 is not limited, and may be the display screen of a mobile terminal, the display screen of a PC, or an apparatus dedicated for face recognition or surveillance. Note that in FIG. 25, the same reference numerals as those in FIG. 2A denote the same components and a repetitive description thereof will be omitted.

The display screen of the terminal 210 shown on the upper side of FIG. 25 displays a captured face image 2510 and a collation target face image 2520 which have been determined by a face recognition apparatus 340 to be dissimilar, as denoted by reference numerals 2511 and 2521. However, the face images are actually identical except that the person wears glasses in the collation target face image 2520. If the face recognition apparatus 340 erroneously recognizes that the face images are dissimilar, the display control apparatus according to this example embodiment determines specific partial regions or connected regions as a factor to determine that the face images are dissimilar to cause erroneous recognition, in response to re-recognition by the face recognition apparatus 340 or indication by the operator from the operator terminal 210. The display control apparatus according to this example embodiment notifies the operator that partial regions or connected regions 2512 and 2522 cause erroneous recognition.

The display screen of the terminal 210 on the lower side of FIG. 25 displays a captured face image 2530 and a collation target face image 2540, which have been determined by the face recognition apparatus 340 to be similar, as denoted by reference numerals 2531 and 2541. However, the captured face image 2530 includes a male and the collation target face image 2540 includes a female, and thus the face images are actually different. If the face recognition apparatus 340 erroneously recognizes that the face images are similar, the display control apparatus according to this example embodiment determines specific partial regions or connected regions as a factor for determining that the face images are similar to cause erroneous recognition, in response to re-recognition by the face recognition apparatus 340 or indication by the operator from the operator terminal 210. The display control apparatus according to this example embodiment notifies the operator that the similarity of the same pairs of glasses in partial regions or connected regions 2532 or 2542 causes erroneous recognition.

Note that FIG. 25 shows the rectangular partial regions or connected regions. However, regions indicating a factor for erroneous recognition are not limited to the rectangular shape or the number of regions on each face image is not necessarily one.

<<Face Recognition System>>

Figure 26:
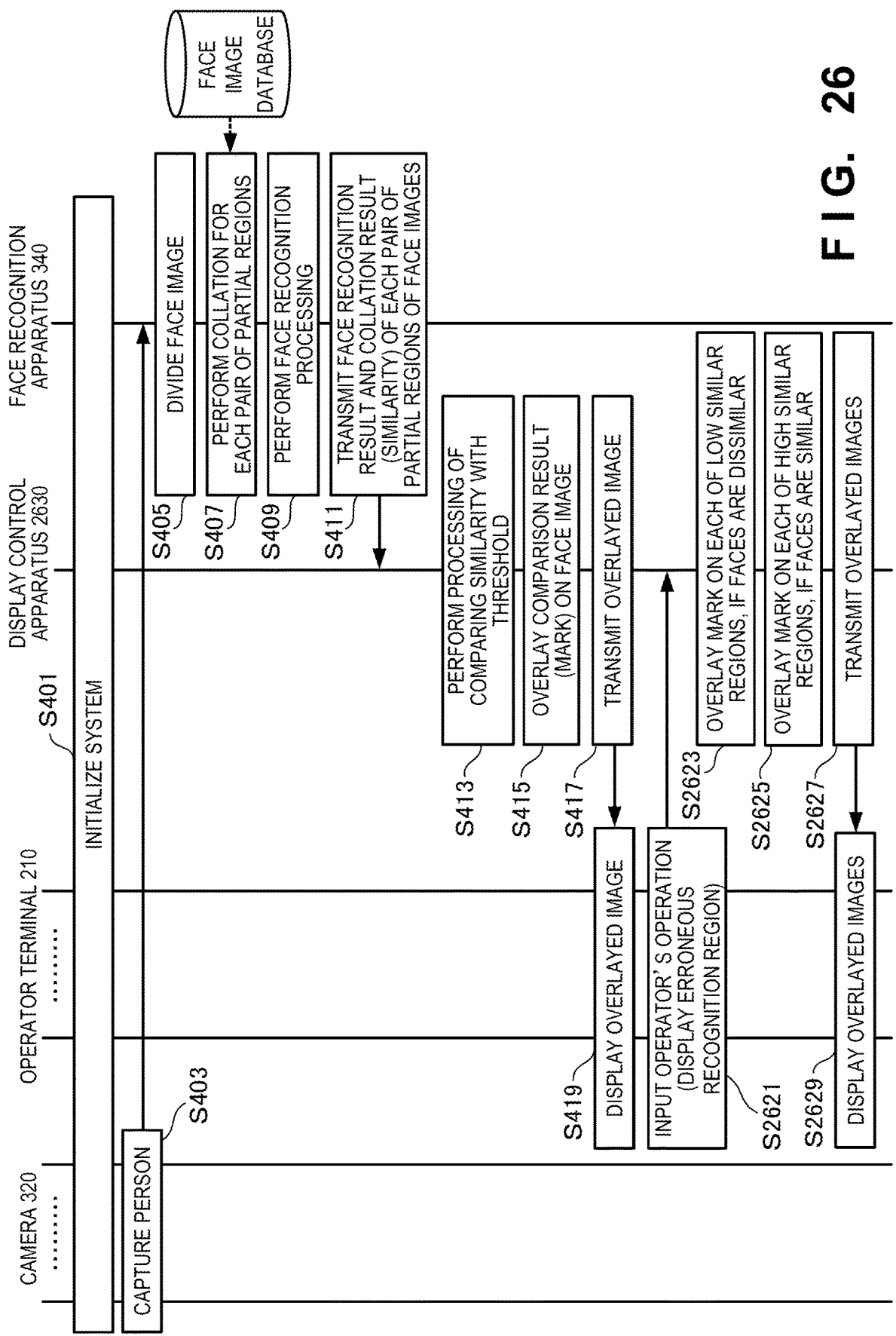
FIG. 26 is a sequence chart showing the operation procedure of a face recognition system according to the fourth example embodiment of the present invention.

FIG. 26 is a sequence chart showing the operation procedure of the face recognition system according to this example embodiment. Note that in FIG. 26, the same step numbers as those in FIG. 4 denote the same steps and a repetitive description thereof will be omitted.

After performing overlay and display according to FIG. 4 in steps S401 to S419, if the operator notices erroneous recognition by the face recognition apparatus 340, he/she instructs the operator terminal 210 to display a factor for erroneous recognition. In step S2621, the operator terminal 210 requests a display control apparatus 2630 according to this example embodiment to display a factor for erroneous recognition.

If faces are erroneously recognized to be dissimilar, the display control apparatus 2630 generates, in step S2623, overlaid image data by overlaying a mark on each of low similar regions. On the other hand, if the faces are erroneously recognized to be similar, the display control apparatus 2630 generates, in step S2625, overlaid image data by overlaying a mark on each of high similar regions. In step S2627, the display control apparatus 2630 transmits, to the operator terminal 210, overlaid images respectively indicating the regions as an erroneous recognition factor. In step S2629, the operator terminal 210 notifies the operator of the regions as the erroneous recognition factor by displaying the overlaid images, as shown in FIG. 25.

<<Functional Arrangement of Display Control Apparatus>>

Figure 27:
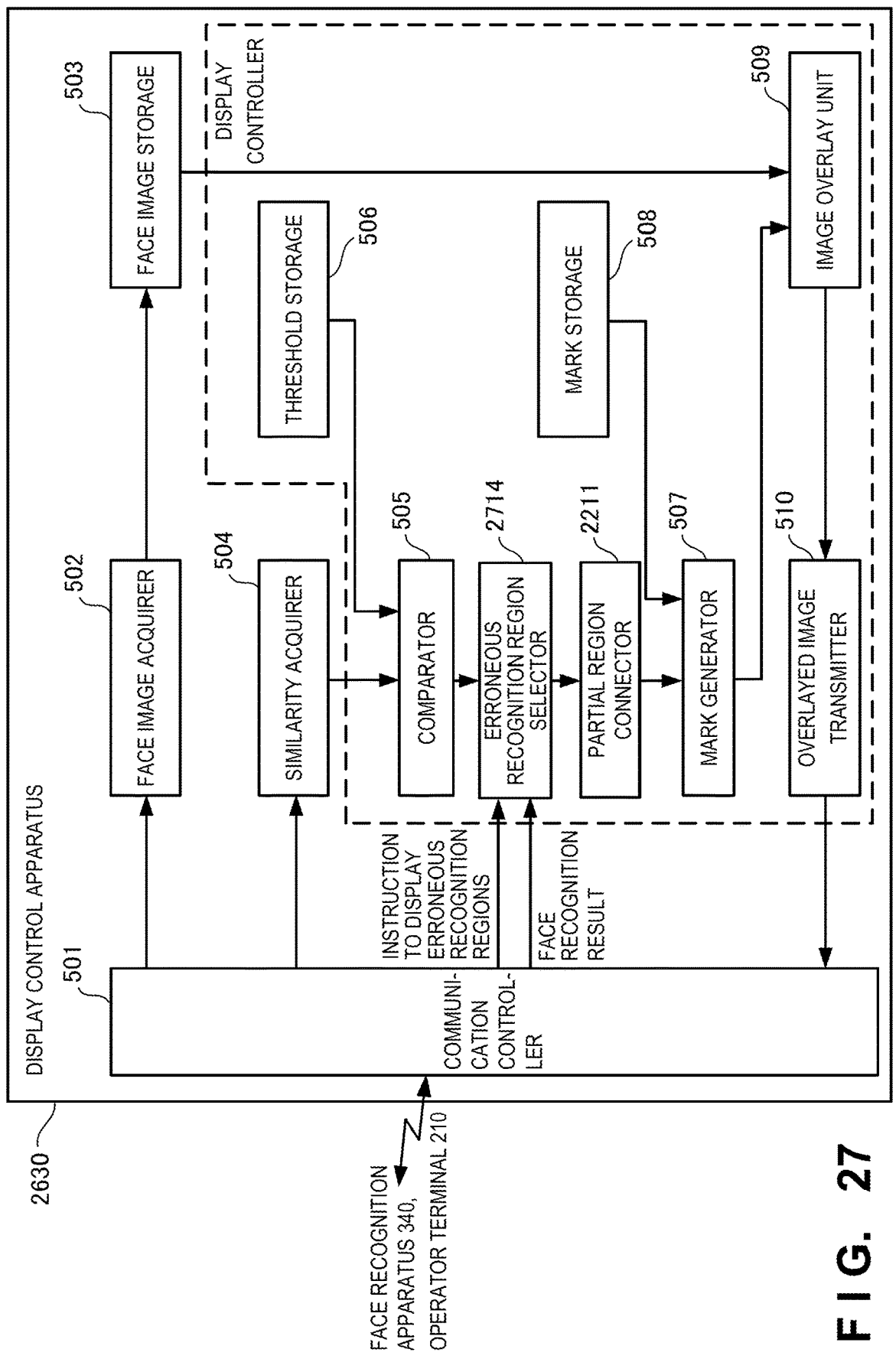
FIG. 27 is a block diagram showing the functional arrangement of a display control apparatus according to the fourth example embodiment of the present invention.

FIG. 27 is a block diagram showing the functional arrangement of the display control apparatus 2630 according to this example embodiment. Note that in FIG. 27, the same reference numerals as those in FIG. 5 or 22 denote the same functional components and a repetitive description thereof will be omitted.

An erroneous recognition region selector 2714 receives an instruction to display the regions as the erroneous recognition factor from the operator terminal 210 and the recognition result of the face recognition apparatus 340, and selects, if the face images are erroneously recognized to be similar based on a result of comparing the similarity of each pair of partial regions with a threshold by a comparator 505, regions having particularly high similarities. On the other hand, if the face images are erroneously recognized to be dissimilar, the erroneous recognition region selector 2714 selects regions having particularly low similarities. Then, the erroneous recognition region selector 2714 causes a partial region connector 2211 to generate a connected region of the selected partial regions.

<<Display Control Processing Procedure>>

Figure 28:
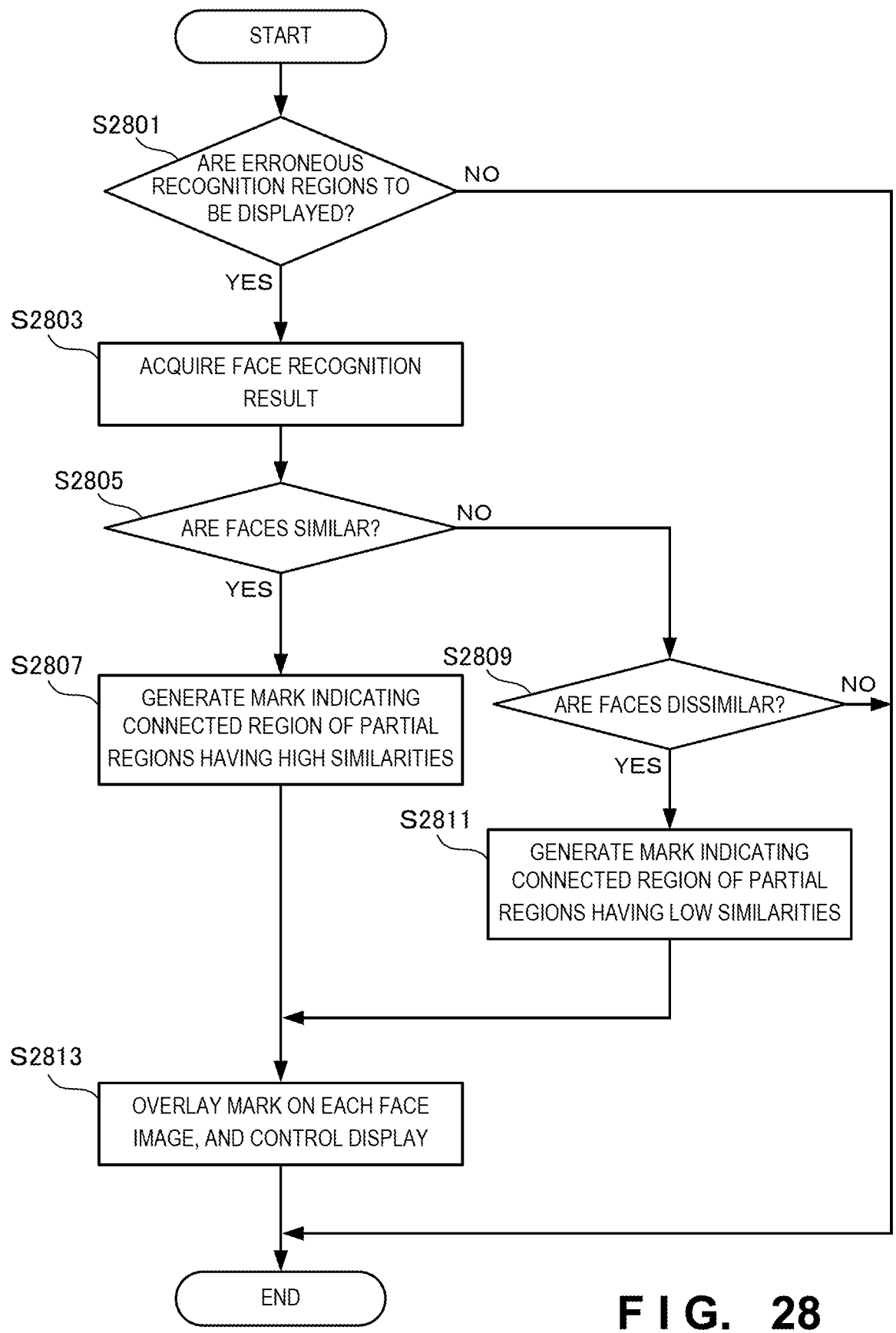
FIG. 28 is a flowchart illustrating the procedure of the display control processing of the display control apparatus according to the fourth example embodiment of the present invention.

FIG. 28 is a flowchart illustrating the procedure of the display control processing of the display control apparatus 2630 according to this example embodiment. This flowchart is executed by a CPU 1610 of FIG. 16 using a RAM 1640, thereby implementing the functional components of FIG. 27. Note that processing of overlaying the mark of the similarity on the face images is similar to the processing procedure shown in FIG. 17 and a description thereof will be omitted.

In step S2801, the display control apparatus 2630 determines whether the operator terminal 210 has instructed to display the regions as the erroneous recognition factor. If an instruction to display the regions as the erroneous recognition factor has been sent, the display control apparatus 2630 acquires the recognition result of the face recognition apparatus 340 in step S2803.

In step S2805, the display control apparatus 2630 determines whether the acquired face recognition result indicates "similar". If the face recognition result indicates "similar", in step S2807 the display control apparatus 2630 generates a connected region of partial regions that have particularly high similarities and have influenced the face recognition result indicating "similar", and generates a mark indicating the connected region as the erroneous recognition factor. If the face recognition result indicates no "similar", the display control apparatus 2630 determines in step S2809 whether the acquired face recognition result indicates "dissimilar". If the face recognition result indicates "dissimilar", in step S2811 the display control apparatus 2630 generates a connected region of partial regions that have particularly low similarities and have influenced the face recognition result indicating "dissimilar", and generates a mark indicating the connected region as the erroneous recognition factor.

In step S2813, the display control apparatus 2630 overlays the generated mark on each face image, and controls display of the overlaid images on the operator terminal 210, as shown in FIG. 25.

According to this example embodiment, since partial regions as a factor for erroneous face recognition are generated, and overlaid and displayed on face images, the operator can readily grasp a factor for erroneous face recognition, and confirm or modify the face recognition result on the spot.

Fifth Example Embodiment

A face recognition system including a display control apparatus according to the fifth example embodiment of the present invention will be described next. The display control apparatus according to this example embodiment is different from those according to the second to fourth example embodiments in that partial regions as a factor for recognizing that faces are similar are generated, and overlaid and displayed on face images. The remaining components and operations are the same as those in the second to fourth example embodiments. Hence, the same reference numerals denote the same components and operations, and a detailed description thereof will be omitted.

<<Display Screen of Face Recognition Result>>

FIG. 29 is a view showing an outline of the display screen of a terminal 210 according to this example embodiment. The display screen shown in FIG. 29 is not limited, and may be the display screen of a mobile terminal, the display screen of a PC, or an apparatus dedicated for face recognition or surveillance. Note that in FIG. 29, the same reference numerals as those in FIG. 2A denote the same components and a repetitive description thereof will be omitted.

The display screen of the terminal 210 on the upper side of FIG. 29 displays a captured face image 2910 and a collation target face image 2920, which have been determined by a face recognition apparatus 340 as similar faces 2911. The display screen on the upper side of FIG. 29 displays face images of a parent and child. Note that both the images may be captured face images or collation target face images. If the face recognition apparatus 340 recognizes the images as the similar faces 2911, when the operator or user inquires about similar portions from the operator terminal 210 or the mobile terminal, the operator or user is notified of particularly similar portions by overlaying and displaying, on the face images, partial regions or connected regions 2912 and 2922 as a main factor for recognizing the images as the similar faces 2911.

The display screen of the terminal 210 on the lower side of FIG. 29 displays a captured face image 2930 and a collation target face image 2940, which have been determined by the face recognition apparatus 340 as similar faces 2931. The display screen on the lower side of FIG. 29 displays a face image of a celebrity on the right side. Note that both the images may be captured face images or collation target face images. If the face recognition apparatus 340 recognizes the images as the similar faces 2931, when the operator or user inquires about similar portions from the operator terminal 210 or the mobile terminal, the operator or user is notified of particularly similar portions by overlaying and displaying, on the face images, partial regions or connected regions 2932 and 2942 as a main factor for recognizing the images as the similar faces 2931.

Note that FIG. 29 shows the rectangular partial regions or connected regions. However, regions indicating a factor for the recognition result indicating similar faces are not limited to the rectangular shape or the number of regions on each face image is not necessarily one.

<<Face Recognition System>>

Figure 30:
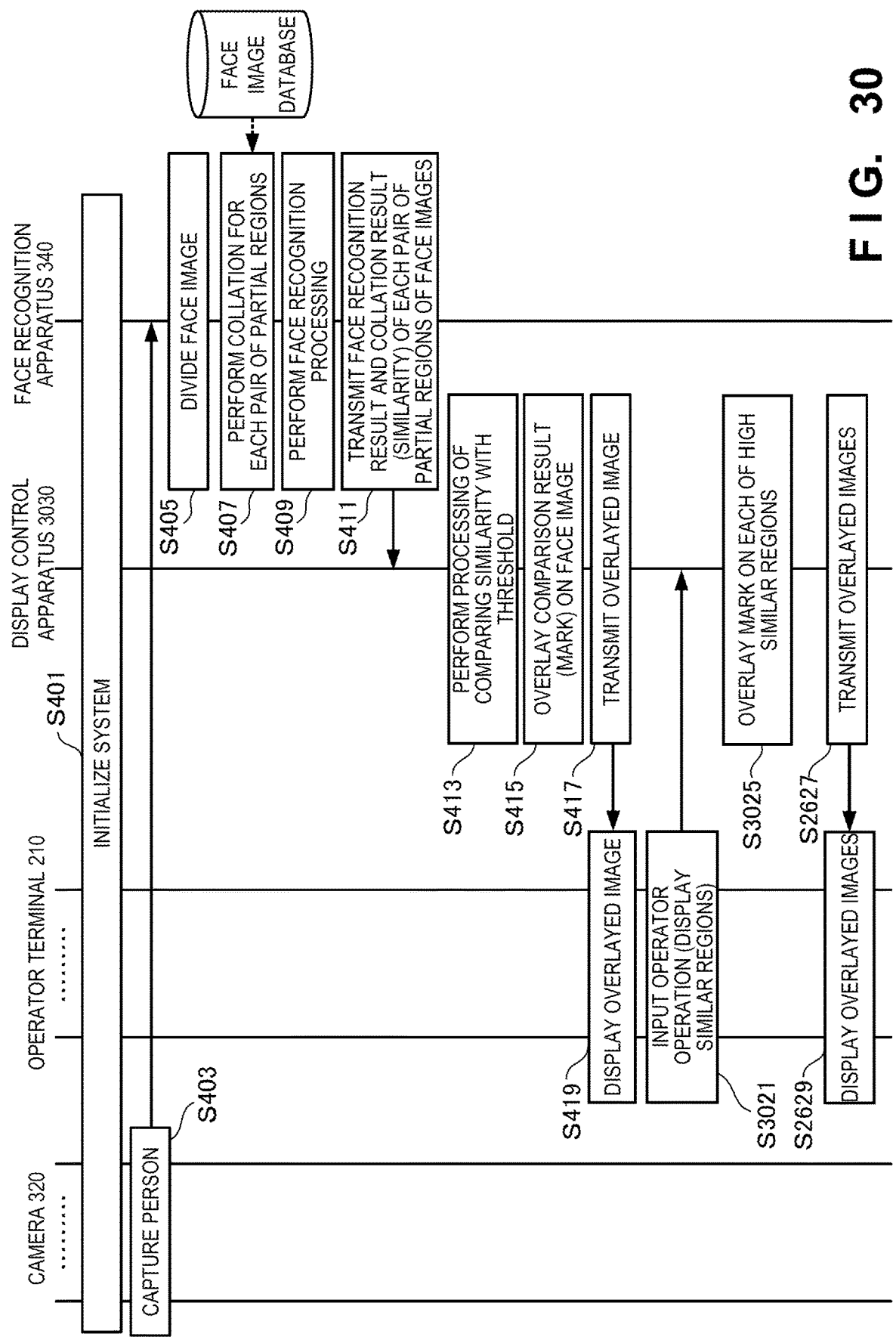
FIG. 30 is a sequence chart showing the operation procedure of a face recognition system according to the fifth example embodiment of the present invention.

FIG. 30 is a sequence chart showing the operation procedure of the face recognition system according to this example embodiment. Note that in FIG. 30, the same step numbers as those in FIG. 4 or 26 denote the same steps and a repetitive description thereof will be omitted.

After performing overlay and display according to FIG. 4 in steps S401 to S419, if the operator obtains a recognition result indicating "similar faces" by the face recognition apparatus 340, the operator or the user instructs the operator terminal 210 or the mobile terminal to display a factor for determining "similar faces". In step S3021, the operator terminal 210 requests a display control apparatus 3030 according to this example embodiment to display a factor for determining "similar faces".

In step S3025, the display control apparatus 3030 generates overlaid image data by overlaying a mark on each of high similar regions. In step S2627, the display control apparatus 3030 transmits, to the operator terminal 210, overlaid images respectively indicating the regions as a factor for recognizing the "similar faces". In step S2629, the operator terminal 210 displays the overlaid images, as shown in FIG. 29, thereby notifying the operator of the regions as the factor for recognizing the "similar faces". Note that the instruction to display the recognition factor from the operator terminal 210 has been explained with reference to FIG. 30. However, the same applies to processing of a user instruction from the mobile terminal.

<<Functional Arrangement of Display Control Apparatus>>

Figure 31:
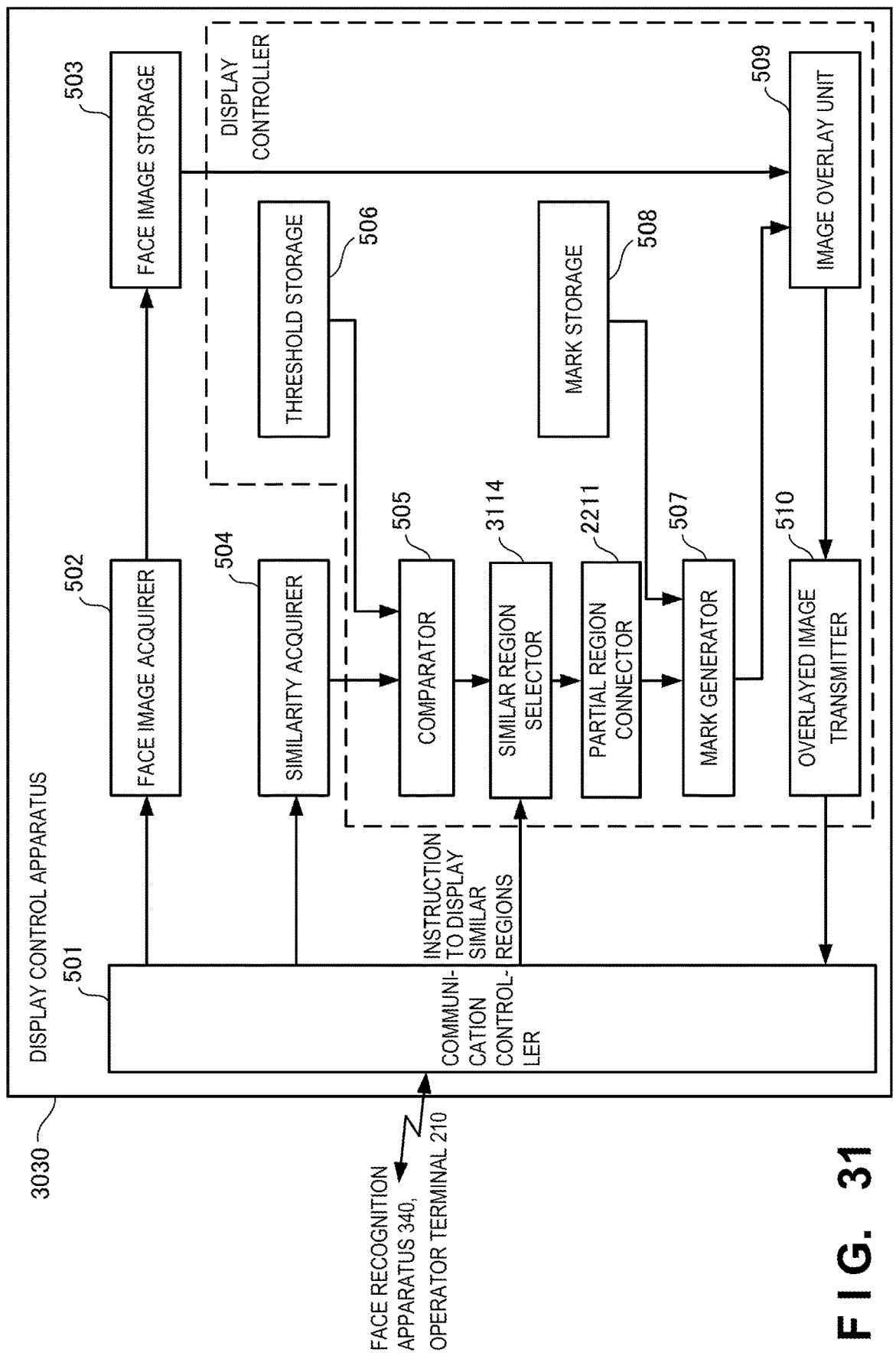
FIG. 31 is a block diagram showing the functional arrangement of a display control apparatus according to the fifth example embodiment of the present invention.

FIG. 31 is a block diagram showing the functional arrangement of the display control apparatus 3030 according to this example embodiment. Note that in FIG. 31, the same reference numerals as those in FIG. 5 or 22 denote the same functional components and a repetitive description thereof will be omitted.

A similar region selector 3114 receives an instruction to display the regions as a factor for recognizing the "similar faces" from the operator terminal 210, selects regions having particularly high similarities based on an output of a result of comparing the similarity of each pair of partial regions with a threshold by a comparator 505, and causes a partial region connector 2211 to generate a connected region of the selected partial regions.

<<Display Control Processing Procedure>>

Figure 32:
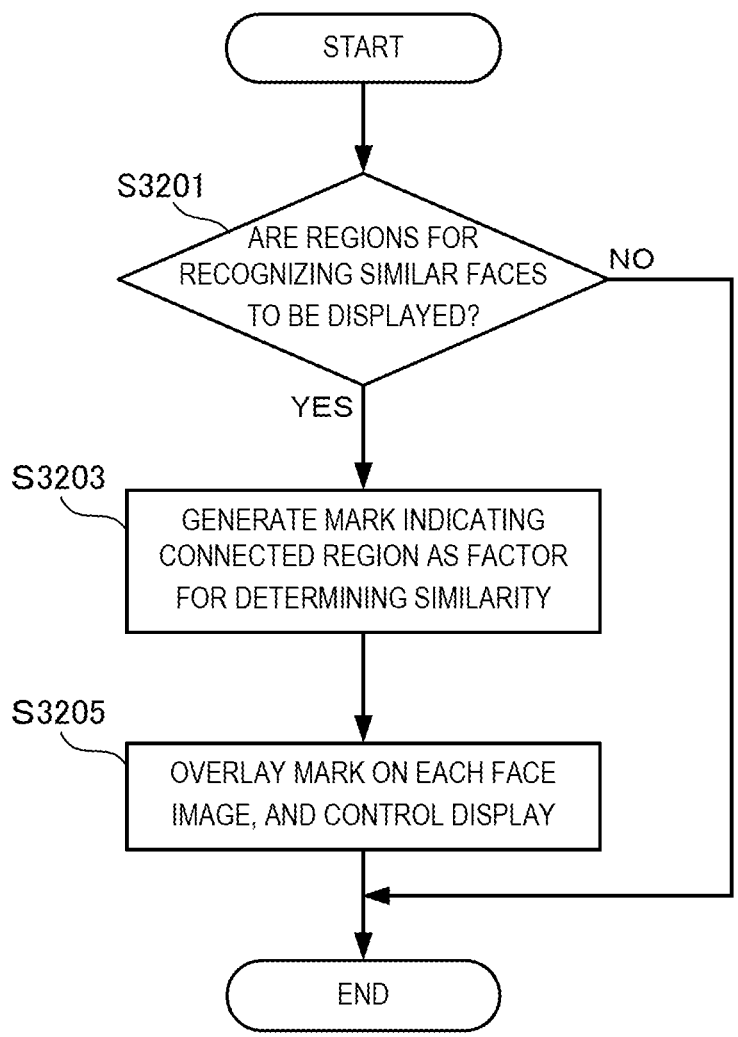
FIG. 32 is a flowchart illustrating the procedure of the display control processing of the display control apparatus according to the fifth example embodiment of the present invention.

FIG. 32 is a flowchart illustrating the procedure of the display control processing of the display control apparatus 3030 according to this example embodiment. This flowchart is executed by a CPU 1610 of FIG. 16 using a RAM 1640, thereby implementing the functional components of FIG. 31. Note that processing of overlaying the mark of the similarity on the face images is similar to the processing procedure shown in FIG. 17 and a description thereof will be omitted.

In step S3201, the display control apparatus 3030 determines whether the operator terminal 210 or the mobile terminal has instructed to display the regions as the factor for recognizing the similar faces. If an instruction to display the regions as the factor for recognizing the similar faces has been sent, in step S3203 the display control apparatus 3030 generates a connected region of the partial regions that have particularly high similarities and have influenced the face recognition result indicating "similar", and generates a mark indicating the connected region as the factor for recognizing the similar faces. In step S3205, the display control apparatus 3030 overlays the generated mark on each face image, and controls display of the overlaid images on the operator terminal 210, as shown in FIG. 29.

According to this example embodiment, since partial regions as a factor for recognizing that faces are similar are generated, and overlaid and displayed on face images, the operator can readily grasp the factor for recognizing that the faces are similar.

Sixth Example Embodiment

A face recognition system including a display control apparatus according to the sixth example embodiment of the present invention will be described next. The display control apparatus according to this example embodiment is different from those according to the second to fifth example embodiments in that face recognition results are accumulated and learned, and a region of interest or a region of non-interest for performing collation for a generated face image is overlaid and displayed on the face images. The remaining components and operations are the same as those in the second to fifth example embodiments. Hence, the same reference numerals denote the same components and operations, and a detailed description thereof will be omitted.

<<Display Screen in Face Recognition>>

Figure 33:
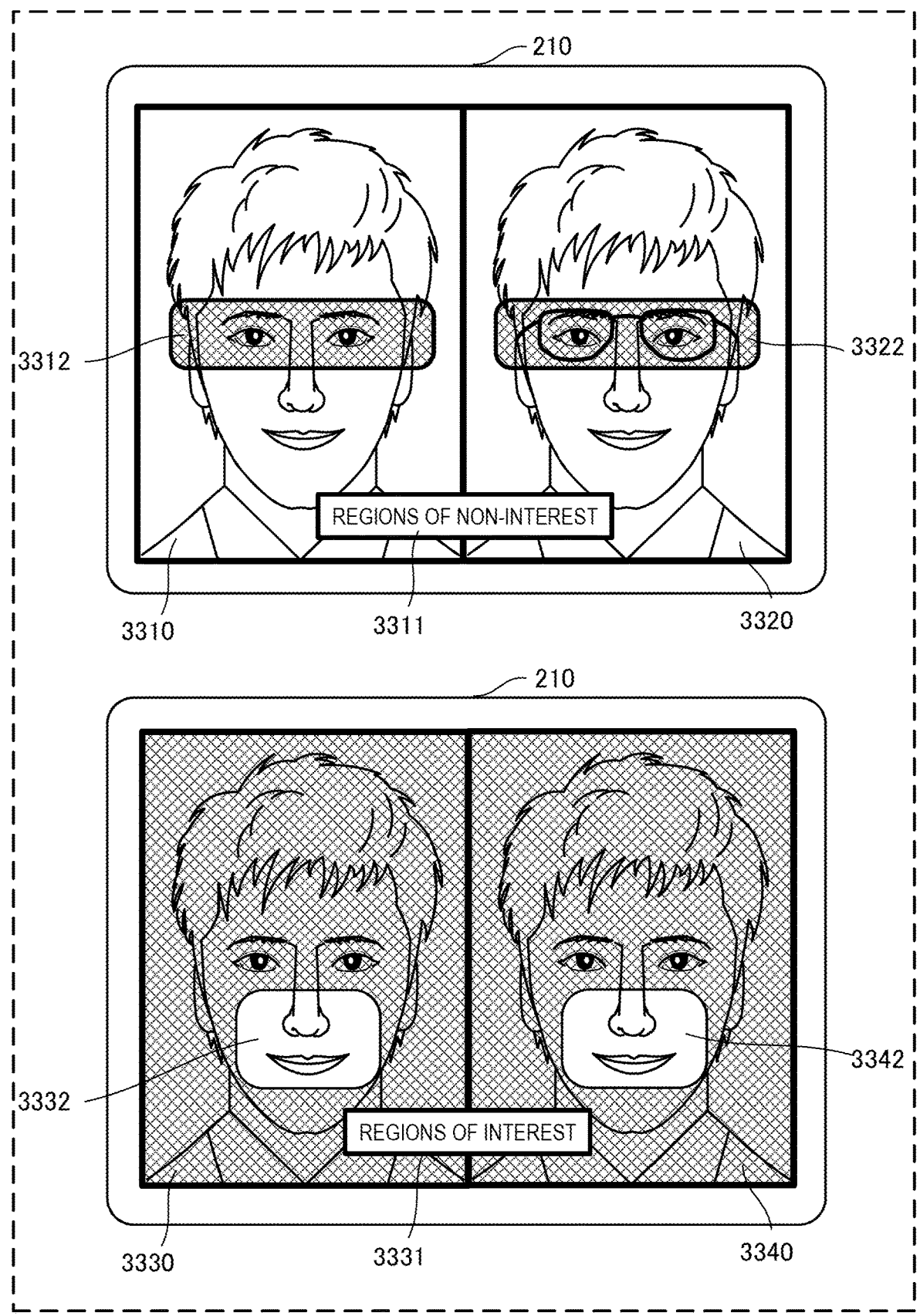
FIG. 33 is a view showing an outline of a display screen according to the sixth example embodiment of the present invention.

FIG. 33 is a view showing an outline of the display screen of a terminal 210 according to this example embodiment. The display screen shown in FIG. 33 is not limited, and may be the display screen of a mobile terminal, the display screen of a PC, or an apparatus dedicated for face recognition or surveillance. Note that in FIG. 33, the same reference numerals as those in FIG. 2A denote the same components and a repetitive description thereof will be omitted.

The display screen of the terminal 210 on the upper side of FIG. 33 displays a captured face image 3310 and a collation target face image 3320 on which partial regions or connected regions 3312 and 3322 as a factor for erroneous recognition are overlaid as regions of non-interest 3311 by accumulating a history of recognition results and learning it in the face recognition apparatus 340. Note that both the images may be captured face images or collation target face images. Alternatively, one of the captured face image and the collation target face image may be displayed. Based on the accumulation of the history of recognition results, for example, even if face images are the same, if the person wears glasses, the eyes and their peripheral regions are erroneously recognized to be dissimilar in the general face images or these face images. Thus, marks are overlaid on the face images to exclude the eyes and their peripheral regions from a recognition target. With reference to the overlaid images, the operator can determine whether the remaining regions are similar or dissimilar without paying attention to the eyes and their peripheral regions, thereby reducing the possibility that the images are erroneously recognized to be dissimilar.

The display screen of the terminal 210 on the lower side of FIG. 33 displays a captured face image 3330 and a collation target face image 3340 on which partial regions or connected regions 3332 and 3342 as a factor for erroneous recognition are overlaid as regions 3331 of interest by accumulating the history of recognition results and learning it in the face recognition apparatus 340. Note that both the images may be captured face images or collation target face images. Alternatively, one of the captured face image and the collation target face image may be displayed. It is leaned based on the accumulation of the history of recognition results that, for example, if eyes and noses and their peripheral regions in general face images or these face images are similar, the influence of similarity or dissimilarity of the remaining regions on a recognition result is small. Marks are then overlaid on the face images to exclude the regions other than the eyes and noses and their peripheral regions from a recognition target. With reference to the overlaid images, the operator can avoid erroneous recognition caused by similarity or dissimilarity of the remaining regions, by paying attention to the eyes and noses and their peripheral regions.

Note that FIG. 33 shows the rectangular partial regions or connected regions. However, regions indicating the regions of non-interest or regions of interest are not limited to the rectangular shape or the number of regions on each face image is not necessarily one.

<<Face Recognition System>>

Figure 34:
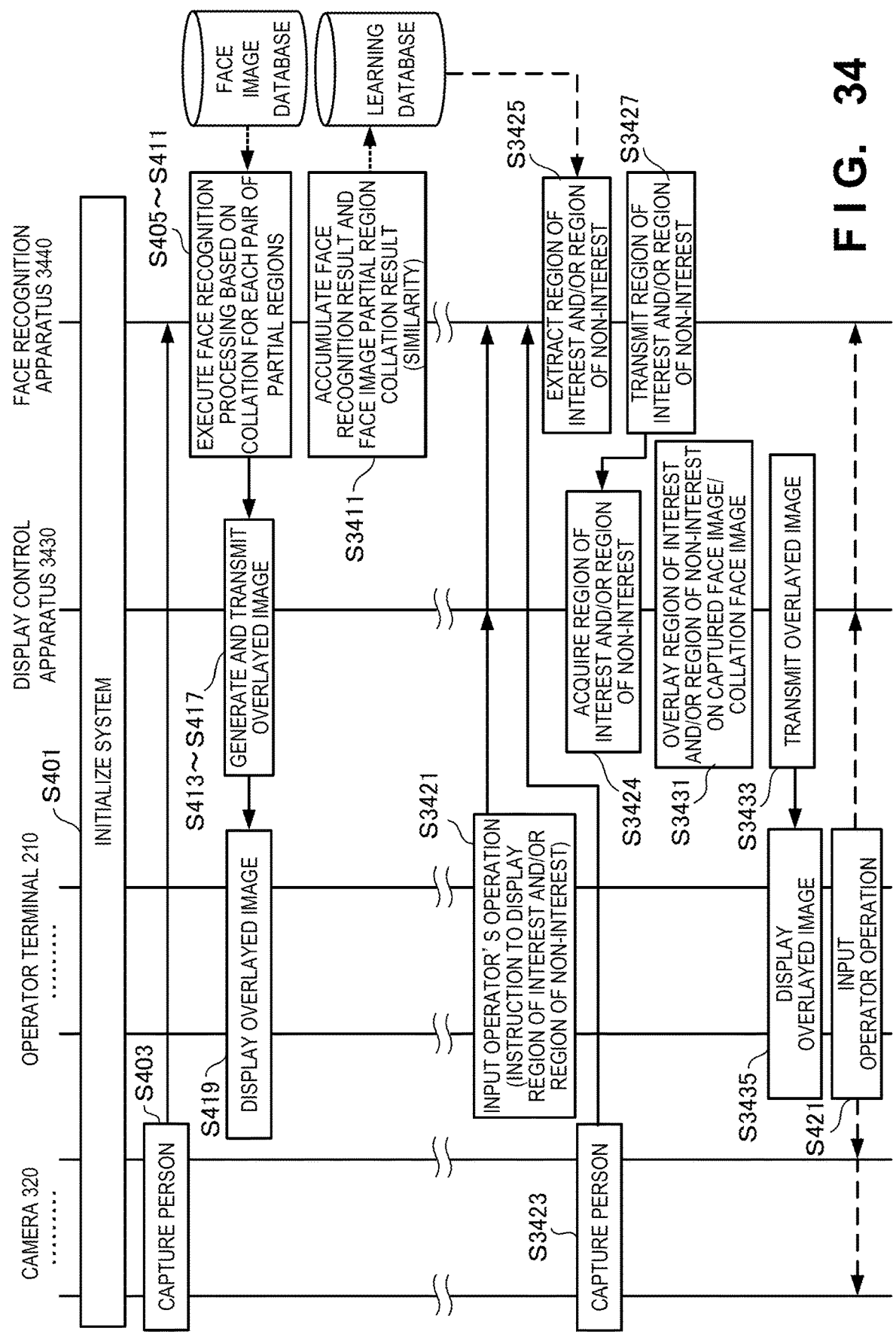
FIG. 34 is a sequence chart showing the operation procedure of a face recognition system according to the sixth example embodiment of the present invention.

FIG. 34 is a sequence chart showing the operation procedure of the face recognition system according to this example embodiment. Note that in FIG. 34, the same step numbers as those in FIG. 4 denote the same steps and a repetitive description thereof will be omitted.

After performing overlay and display according to FIG. 4 in steps S401 to S419, a face recognition apparatus 3440 accumulates, in step S3411, a face recognition result and a face image partial region collation result (similarity) in a face recognition history (learning) database to be analyzable.

The operator inputs, to the operator terminal 210, an instruction to overlay a region of interest and/or a region of non-interest before face recognition of himself or herself. Alternatively, a setting may be made in advance in the operator terminal 210. In step S3421, the operator terminal 210 requests the face recognition apparatus 3440 to overlay and display the region of interest and/or region of non-interest.

In step S3425, the face recognition apparatus 3440 extracts the region of interest and/or region of non-interest from the information accumulated in the learning database. Then, in step S3427, the face recognition apparatus 3440 transmits the extracted region of interest and/or region of non-interest to a display control apparatus 3430.

The display control apparatus 3430 acquires, in step S3424, the region of interest and/or region of non-interest from the face recognition apparatus 3440, and overlays, in step S3431, the region of interest and/or region of non-interest on the captured face image and/or collation target face image. In step S3433, the display control apparatus 3430 transmits an overlaid image indicating the region of interest and/or region of non-interest to the operator terminal 210. In step S3435, the operator terminal 210 displays the overlaid image, as shown in FIG. 33, to notify the operator of the region of interest and/or region of non-interest.

Note that FIG. 33 shows the rectangular partial regions or connected regions. However, regions indicating the factor for the recognition result indicating that the faces are similar are not limited to the rectangular shape or the number of regions on each face image is not necessarily one. In addition, if the display control apparatus 3430 and the face recognition apparatus 3440 are integrally formed, extraction of the region of interest and/or region of non-interest and overlaying on the face images are executed simultaneously.

<<Functional Arrangement of Display Control Apparatus>>

FIG. 35 is a block diagram showing the functional arrangement of the display control apparatus 3430 according to this example embodiment. Note that in FIG. 35, the same reference numerals as those in FIG. 5 denote the same functional components and a repetitive description thereof will be omitted.

Under an instruction from the operator terminal 210, a region-of-interest/region-of-non-interest acquirer 3515 acquires, by communication, a mark of the region of interest and/or the region of non-interest extracted and transmitted by the face recognition apparatus 3440. An image overlay unit 3509 generates overlaid image data by overlaying the mark of the partial region obtained from the mark generator 507 or the region of interest and/or the region of non-interest acquired by the region-of-interest/region-of-non-interest acquirer 3515 on the face images obtained from a face image storage 503.

Note that the mark may be another mark such as a mark corresponding to a connected region.

<<Display Control Processing Procedure>>

Figure 36:
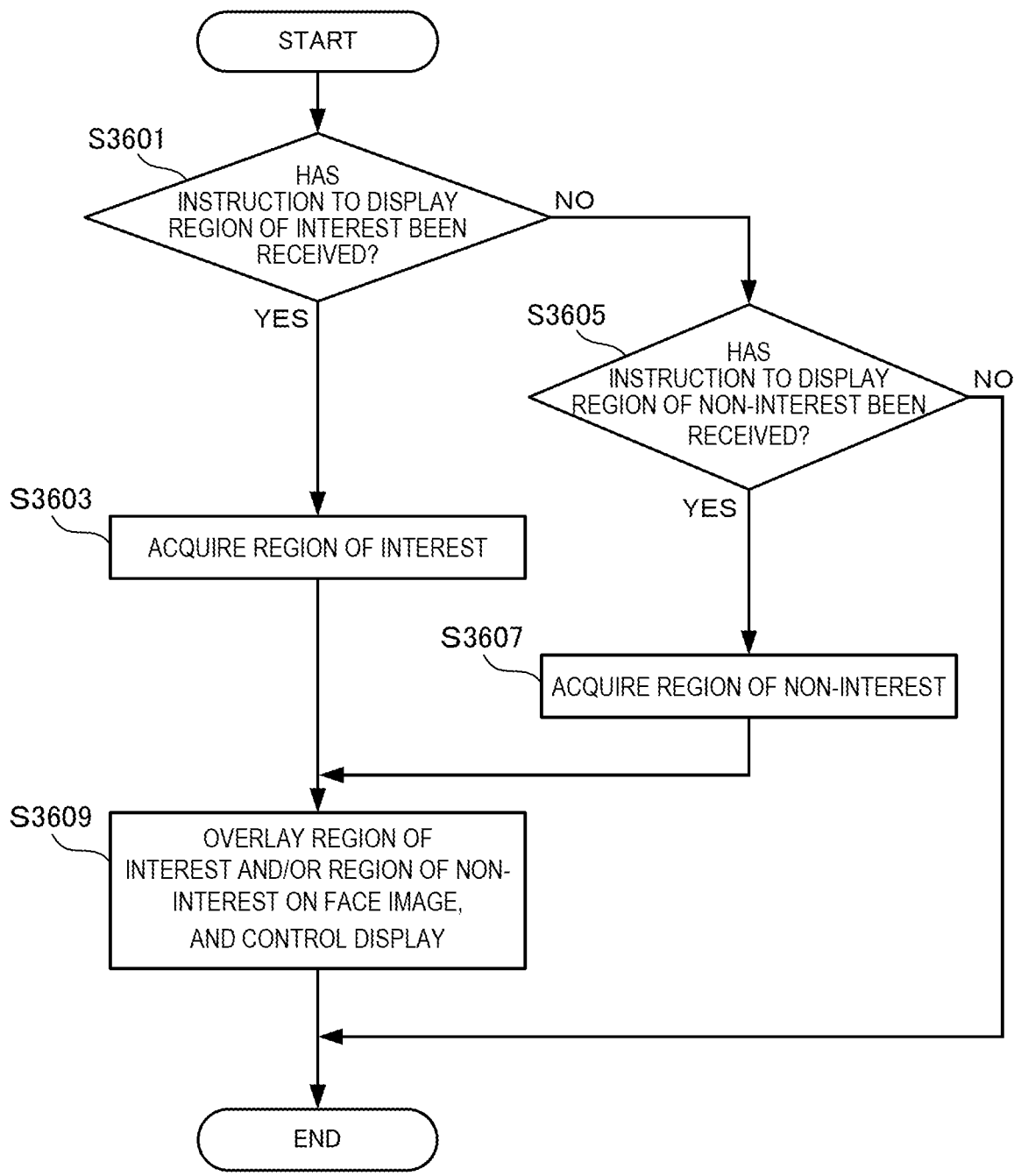
FIG. 36 is a flowchart illustrating the procedure of the display control processing of the display control apparatus according to the sixth example embodiment of the present invention.

FIG. 36 is a flowchart illustrating the procedure of the display control processing of the display control apparatus 3430 according to this example embodiment. This flowchart is executed by a CPU 1610 of FIG. 16 using a RAM 1640, thereby implementing the functional components of FIG. 35. Note that processing of overlaying the mark of the similarity on the face images is similar to the processing procedure shown in FIG. 17 and a description thereof will be omitted.

In step S3601, the display control apparatus 3430 determines whether a region to be overlaid is a region of interest. If a region of interest is to be overlaid and displayed, the display control apparatus 3430 acquires, in step S3603, the region of interest from the face recognition apparatus 3440. If the region to be overlaid is not a region of interest, the display control apparatus 3430 determines in step S3605 whether the region to be overlaid is a region of non-interest. If a region of non-interest is to be overlaid and displayed, the display control apparatus 3430 acquires, in step S3607, the region of non-interest from the face recognition apparatus 3440. In step S3609, the display control apparatus 3430 overlays the acquired region of interest or non-interest on the face images, and controls display on the operator terminal 210.

Note that an illustration and description of the flowchart when the region of interest and the region of non-interest are displayed will be omitted.

<<Functional Arrangement of Face Recognition Apparatus>>

Figure 37:
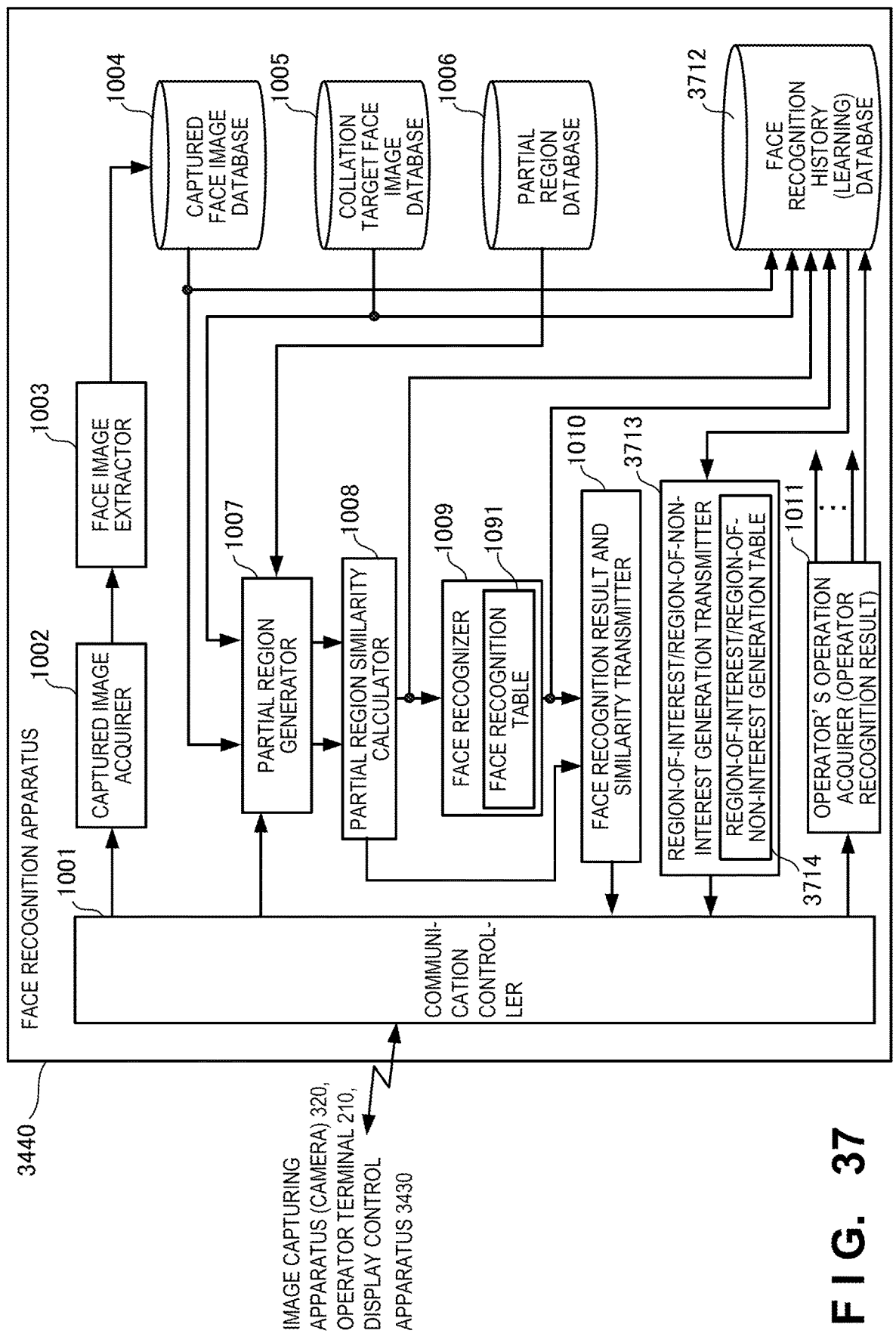
FIG. 37 is a block diagram showing the functional arrangement of a face recognition apparatus according to the sixth example embodiment of the present invention.

FIG. 37 is a block diagram showing the functional arrangement of the face recognition apparatus 3440 according to this example embodiment. Note that in FIG. 37, the same reference numerals as those in FIG. 10 denote the same functional components and a repetitive description thereof will be omitted.

A face recognition history (learning) database 3712 accumulates a recognition result based on the similarities of the pairs of partial regions in the face recognition apparatus 3440 and a history of recognition target face images and recognition factors. A region-of-interest/region-of-non-interest generation transmitter 3713 includes a region-of-interest/region-of-non-interest generation table 3714, and generates a region of interest/region of non-interest with reference to the face recognition history (learning) database 3712.

(Face Recognition History Database: Learning Database)

Figure 38:
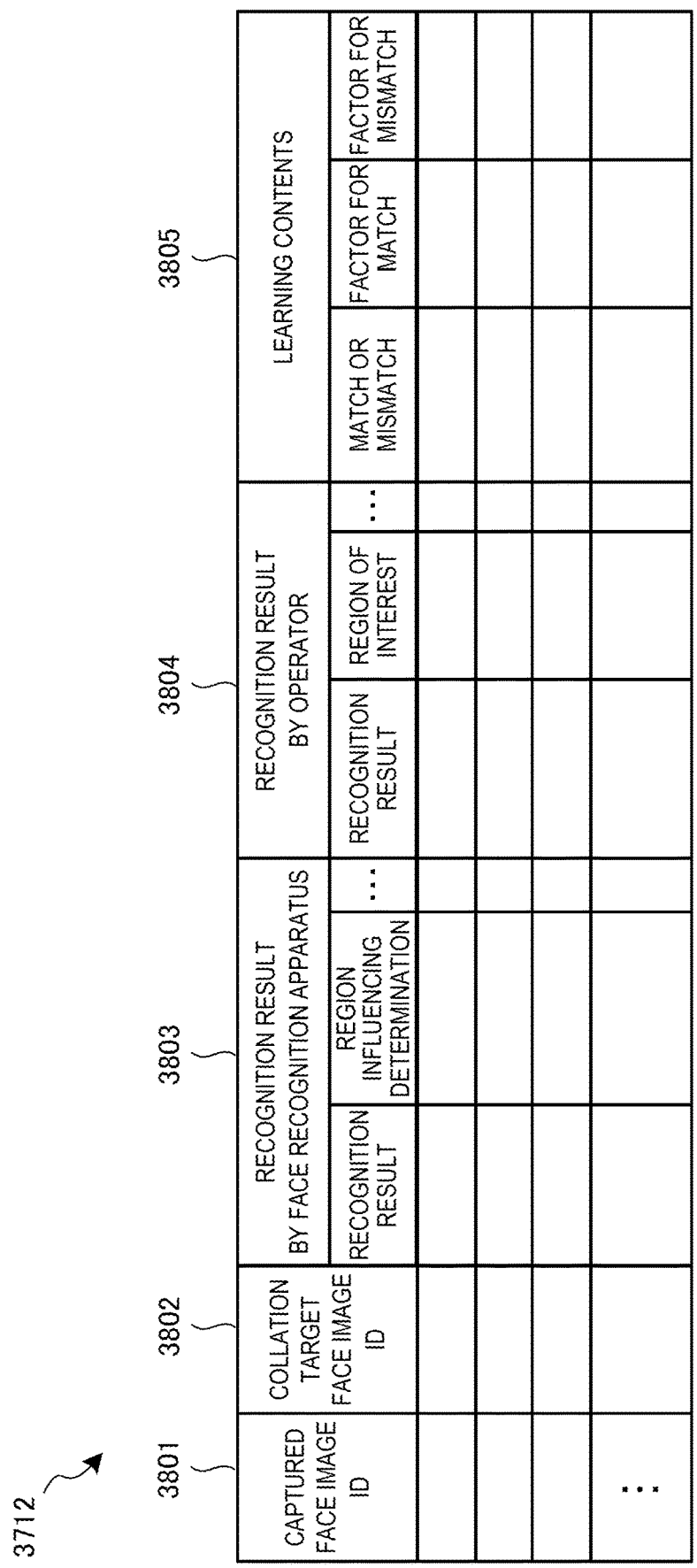
FIG. 38 is a table showing the structure of a face recognition history (learning) database according to the sixth example embodiment of the present invention.

FIG. 38 is a table showing the structure of the face recognition history (learning) database 3712 according to this example embodiment. The structure of the face recognition history (learning) database 3712 is not limited to that shown in FIG. 38.

The face recognition history (learning) database 3712 accumulates a recognition result 3803 by the face recognition apparatus and a recognition result 3804 by the operator in association with a captured image ID 3801 for identifying a captured face image and a collation target face image ID 3802 for identifying a collation target face image. The face recognition history (learning) database 3712 stores learning contents 3805. The recognition result 3803 by the face recognition apparatus includes, for example, a recognition result and a region influencing the determination. The recognition result 3804 by the operator includes, for example, a recognition result and a region of interest. The learning contents 3805 include a match or mismatch result between the recognition result by the face recognition apparatus and that by the operator, a factor for the match, and a factor for the mismatch.

Note that although not shown in FIG. 38, recognition conditions such as a face recognition date and time may be accumulated as long as they are necessary for learning.

(Region-of-Interest and Region-of-Non-Interest Generation Table)

FIG. 39 is a table showing the structure of the region-of-interest and region-of-non-interest generation table 3714 according to this example embodiment. The region-of-interest and region-of-non-interest generation table 3714 is used by the region-of-interest/region-of-non-interest generation transmitter 3713 to generate a region of interest and a region of non-interest based on the history accumulated in the face recognition history (learning) database 3712.

The region-of-interest and region-of-non-interest generation table 3714 stores partial region coordinates 3902 on the face image and a degree 3903 of influence on a recognition result in association with a partial region ID 3901 for identifying a partial region of the face image. The degree 3903 of influence on the recognition result includes a high influence score that highly influences the recognition result and a low influence score that does not highly influence the recognition result. The region-of-interest and region-of-non-interest generation table 3714 stores data 3904 indicating whether the partial region is set as a region of interest, and data 3905 indicating whether the partial region is set as a region of non-interest. Note that in FIG. 39, each of upper two partial regions is determined as a region of interest, the third region is determined as a region of non-interest, and the fourth region is determined as neither a region of interest nor a region of non-interest.

Note that FIG. 39 shows only the partial regions. However, the same applies to a connected region and the like.

<<Region-of-Interest and/or Region-of-Non-Interest Generation Processing Procedure>>

Figure 40:
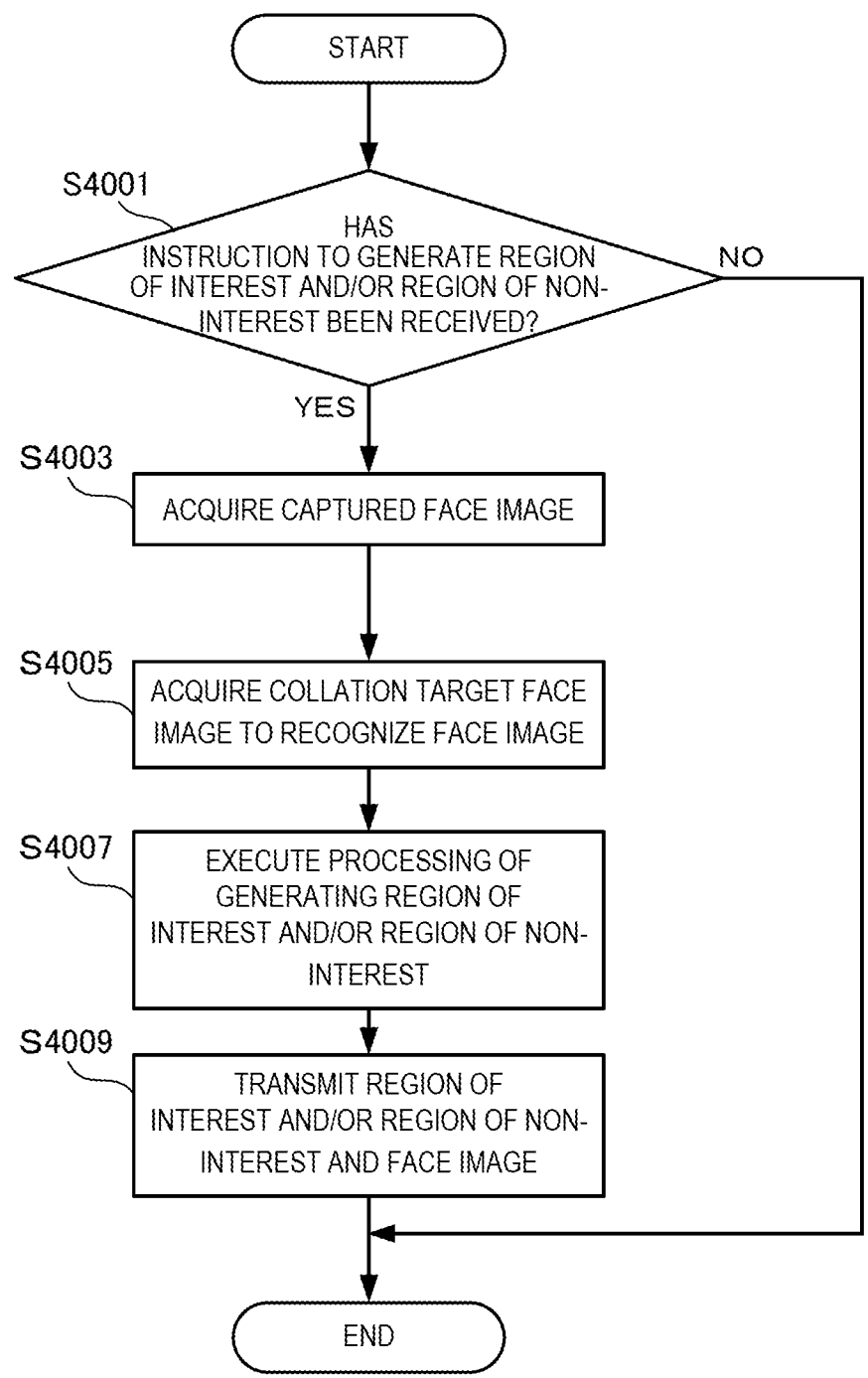
FIG. 40 is a flowchart illustrating the procedure of region-of-interest and/or region-of-non-interest generation processing according to the sixth example embodiment of the present invention.

FIG. 40 is a flowchart illustrating the procedure of region-of-interest and/or region-of-non-interest generation processing according to the example embodiment. This flowchart is executed by a CPU 1910 of FIG. 19 using a RAM 1940, thereby implementing the functional components of FIG. 37. Note that processing of overlaying the mark of the similarity on the face images is similar to the processing procedure shown in FIG. 17 and a description thereof will be omitted.

In step S4001, the face recognition apparatus 3440 determines whether the operator terminal 210 has instructed to generate a region of interest and/or region of non-interest. If an instruction to generate a region of interest and/or region of non-interest has been sent, the face recognition apparatus 3440 acquires, in step S4003, a captured face image from an image capturing apparatus (camera) 320. In step S4005, the face recognition apparatus 3440 acquires a collation target face image to recognize the acquired captured face image. In step S4007, the face recognition apparatus 3440 generates a region of interest and a region of non-interest from the acquired captured face image and collation target face image with reference to the history accumulated in the face recognition history (learning) database 3712. In step S4009, the face recognition apparatus 3440 transmits the generated region of interest and/or region of non-interest and the face images to the display control apparatus 3430 to undergo overlay and display.

According to this example embodiment, face recognition results are accumulated and learned, and a region of interest and a region of non-interest for performing collation for a generated face image is overlaid and displayed on the face images. Thus, the operator can readily perform face recognition.

Seventh Example Embodiment

A face recognition system including a display control apparatus according to the seventh example embodiment of the present invention will be described next. The display control apparatus according to this example embodiment is different from those according to the second to sixth example embodiments in that it is included in functional components forming the face recognition system. The remaining components and operations are the same as those in the second to sixth example embodiments. Hence, the same reference numerals denote the same components and operations, and a detailed description thereof will be omitted.

<<Face Recognition System>>

Figure 41:
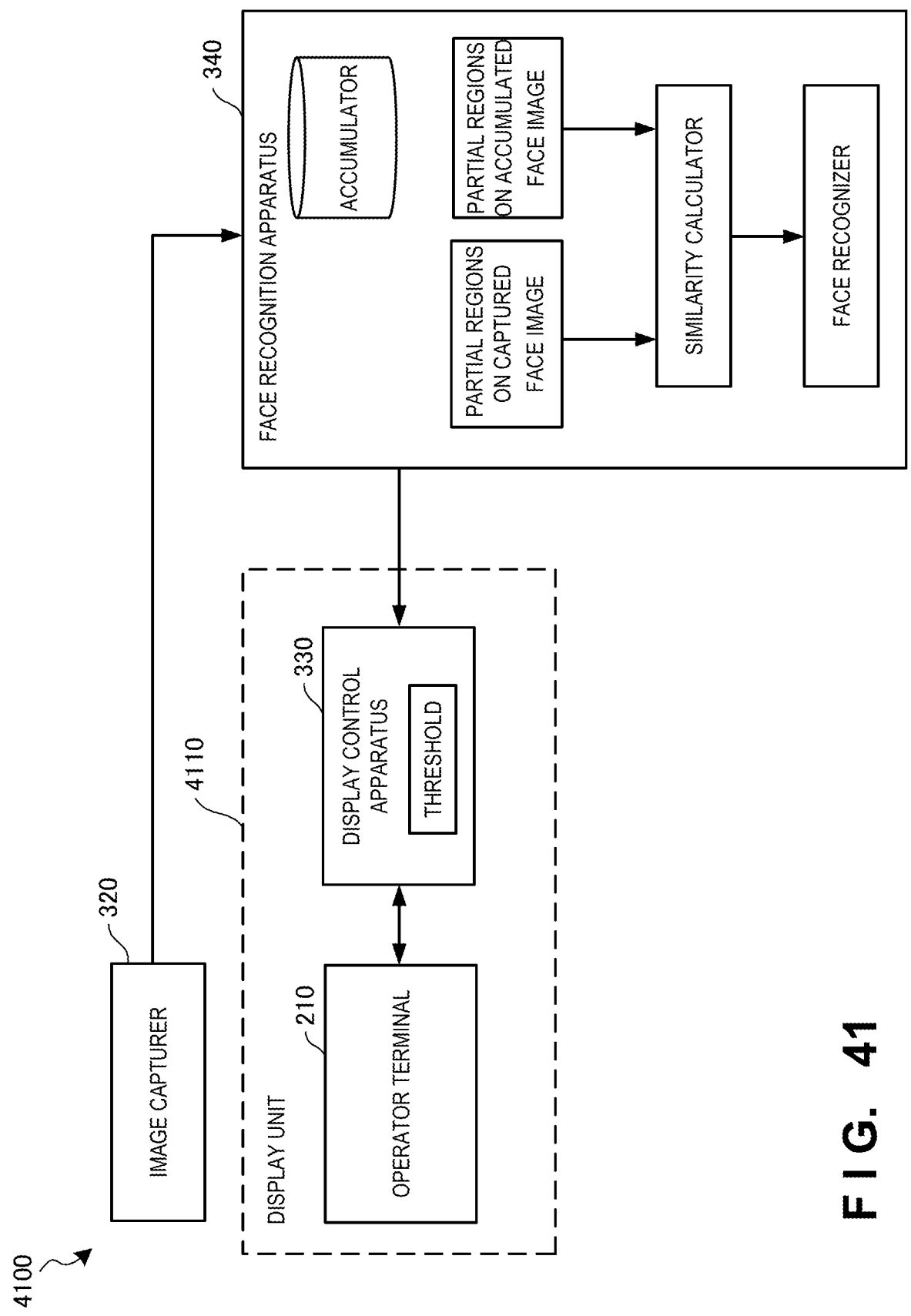
FIG. 41 is a block diagram showing the arrangement of a face recognition system according to the seventh example embodiment of the present invention.

FIG. 41 is a block diagram showing the arrangement of a face recognition system 4100 according to this example embodiment. The face recognition system 4100 is represented by the minimum number of functional components forming the face recognition system.

The face recognition system 4100 includes an image capturer 320, a face recognition apparatus 340, and a display unit 4110. The display unit 4110 includes a display control apparatus 330 that generates a mark indicating whether the similarity of each pair of partial regions exceeds a threshold, and overlays the mark on a face image, and an operator terminal 210 with a display unit 1403 that displays an overlaid image. The face recognition apparatus 340 includes an accumulator, a generator that generates partial regions on a captured face image, a generator that generates partial regions on an accumulated face image, a similarity calculator that calculates the similarity of each pair of partial regions, and a face recognizer based on the similarities of the pairs of partial regions.

According to this example embodiment, the effects of the above example embodiments can be implemented by different combinations of various functional components.

Eighth Example Embodiment

A face recognition system including a display control apparatus according to the eighth example embodiment of the present invention will be described next. The display control apparatus according to this example embodiment is different from those according to the second to seventh example embodiments in that it is implemented as a display control server in a cloud server. The remaining components and operations are the same as those in the second to seventh example embodiments. Hence, the same reference numerals denote the same components and operations, and a detailed description thereof will be omitted.

<<Face Recognition System>>

Figure 42A:
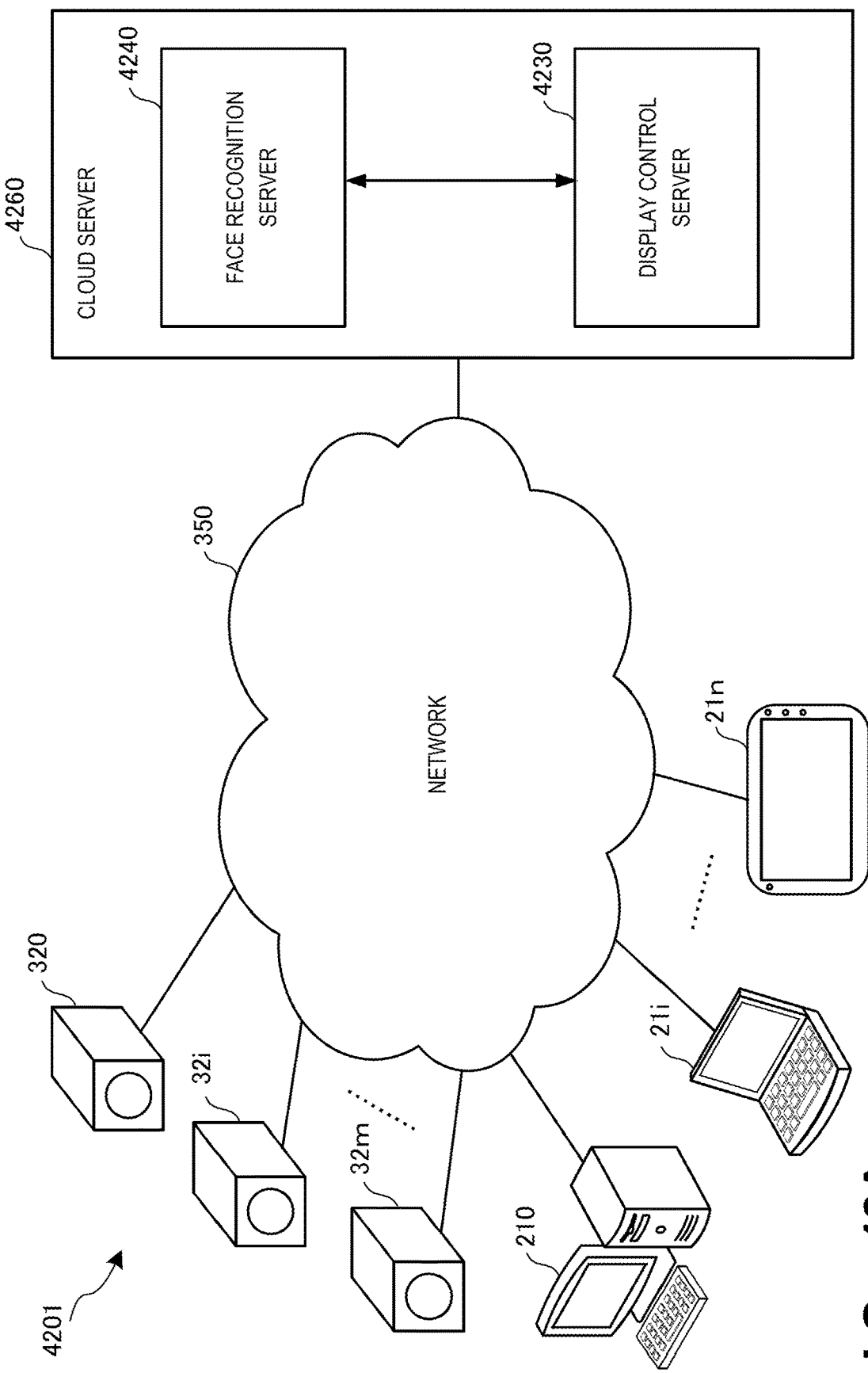
FIG. 42A is a block diagram showing the arrangement of a face recognition system according to the eighth example embodiment of the present invention.

FIG. 42A is a block diagram showing the arrangement of a face recognition system 4201 according to this example embodiment. Note that in FIG. 42A, the same reference numerals as those in FIG. 3 denote the same components and a repetitive description thereof will be omitted.

The face recognition system 4201 includes a cloud server 4260 connected to a network 350. The cloud server 4260 includes a display control server 4230 corresponding to the display control apparatus described in the above example embodiments and a face recognition server 4240 corresponding to the face recognition apparatus.

In accordance with a request to overlay, on a face image, a mark as support of various face recognition processes, which has been received from an operator terminal 210 for surveillance arranged in an airport or the like, and a note PC 21*i* or a mobile terminal (smartphone, tablet, or the like) as a user terminal, the cloud server 4260 executes integration processing to control display of the overlaid image on each of terminals 210 to 21*n*.

FIG. 42B is a block diagram showing the arrangement of a face recognition system 4202 according to this example embodiment. Note that in FIG. 42B, the same reference numerals as those in FIG. 3 or 42A denote the same components and a repetitive description thereof will be omitted.

In the face recognition system 4202, terminals 4211 to 421*n* are mobile terminals (smartphones, tablets, or mobile phones) of users. If a video captured by a camera incorporated in the mobile terminal of the user is transmitted to a cloud server 4260, the cloud server 4260 displays, on the screen of the mobile terminal of the user, a mark overlaid image as support of face recognition processing desired by the user.

According to this example embodiment, the effect of each of the above example embodiments can be implemented by requesting the cloud server even if the self apparatus has no function.

Ninth Example Embodiment

A face recognition system including a display control apparatus according to the ninth example embodiment of the present invention will be described next. The display control apparatus according to this example embodiment is different from those according to the second to eighth example embodiments in that it is included as part of a face recognition application in a communication terminal serving as a face recognition system. The remaining components and operations are the same as those in the second to eighth example embodiments. Hence, the same reference numerals denote the same components and operations, and a detailed description thereof will be omitted.

<<Face Recognition System>>

Figure 43:
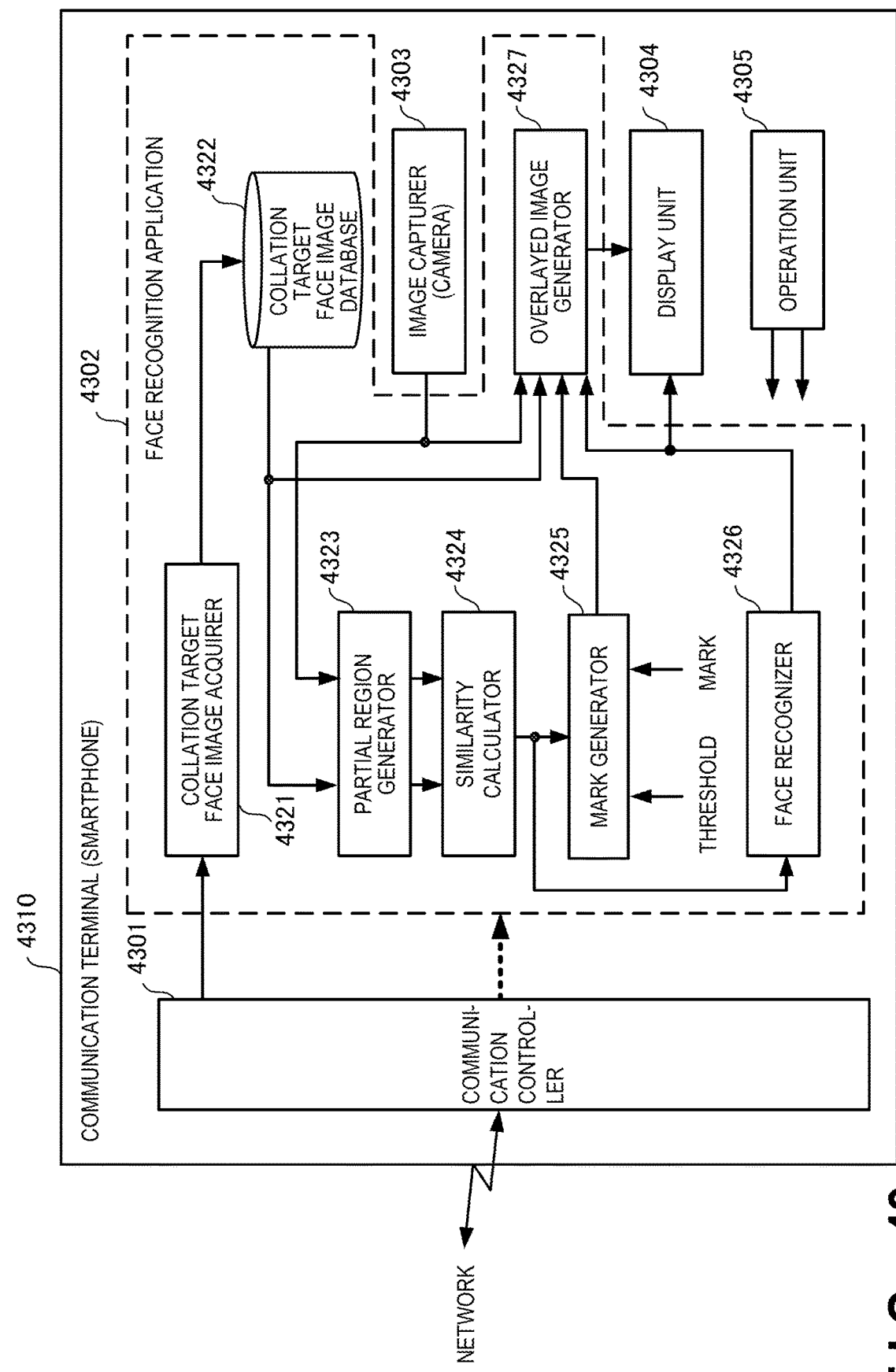
FIG. 43 is a block diagram showing the functional arrangement of a communication terminal as a face recognition system according to the ninth example embodiment of the present invention.

FIG. 43 is a block diagram showing the functional arrangement of a communication terminal 4310 serving as a face recognition system according to this example embodiment. Note that FIG. 43 shows new reference numerals "43XX" which denote functional components obtained by centrally incorporating the functional components shown in FIGS. 5 and 10 in the communication terminal 4310. The functional components having the same names have the same processing functions, and a repetitive description thereof will be omitted.

The communication terminal 4310 includes a communication controller 4301, a face recognition application 4302, an image capturer (camera) 4303, a display unit 4304, and an operation unit 4305. The face recognition application 4302 corresponds to an application program downloaded to the communication terminal 4310. The face recognition application 4302 may be incorporated in the communication terminal 4310 in advance.

The face recognition application 4302 includes a collation target face image acquirer 4321, a collation target face image database 4322, a partial region generator 4323, and a similarity calculator 4324. Furthermore, the face recognition application 4302 includes a mark generator 4325 that generates a mark based on a threshold and mark information, a face recognizer 4326 that recognizes a face image based on the similarities of pairs of partial regions, and an overlaid image generator 4327 that overlays the mark on a collation target face image and/or a face image captured by the image capturer (camera) 4303, and displays the image on the display unit 4304.

According to this example embodiment, the effect of each of the above example embodiments can be implemented by only the terminal.

OTHER EXAMPLE EMBODIMENTS

Note that the above example embodiments have explained the example in which the display control apparatus and the face recognition apparatus are separately provided. However, the apparatuses may be integrated into one apparatus or part of one of the apparatuses may be included in the other apparatus. For example, the display control apparatus may have a partial region collation function, and notify the face recognition apparatus of a collation result. Furthermore, a new apparatus that collates partial regions and outputs the result to the display control apparatus and the face recognition apparatus may be provided as a partial region collation apparatus. That is, this arrangement may be adopted as long as it is possible to implement the functions included in the display control apparatus and face recognition apparatus according to this example embodiment.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when a display control program as an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. A display control apparatus comprising:
a processor; and
a display controller,
wherein said processor is configured to acquire similarity between a partial region of a first face image and a partial region of a second face image by performing a comparison between the partial region of the first face image and the partial region of the second face image,
wherein said display controller overlays, on at least one of the first and second face images, a result of the comparison in accordance with a level of the acquired similarity, and displays at least one of the overlaid first face image and the overlaid second face image,
wherein said display controller overlays and displays, on the at least one of the first and second face images, at least one of a similar portion including similar regions and a dissimilar portion including dissimilar regions, that have been determined in accordance with the level of the required similarity, and
wherein said display controller overlays and displays the similar portion and the dissimilar portion in contrast with each other on the at least one of the face first and second images.

2. The display control apparatus according to claim 1, wherein said display controller generates a connected region by connecting the partial regions similarities of which fall within a predetermined range, and overlays and displays the connected region on the at least one of the first and second face images.

3. The display control apparatus according to claim 1, wherein said processor is further configured to
acquire partial regions of interest having a result to be interested in the comparison, and
said display controller overlays and displays the partial regions of interest on the at least one of the first and second face images.

4. The display control apparatus according to claim 1, wherein said processor is further configured to
acquire partial regions of non-interest having a result not to be interested in the comparison, and
said display controller overlays and displays the partial regions of non-interest on the at least one of the first and second face images.

5. The display control apparatus according to claim 1, wherein said display controller performs the comparison on receiving an operation by an operator.

6. A display control apparatus comprising:
a processor; and
a display controller,
wherein said processor is configured to acquire similarity between a partial region of a first face image and a partial region of a second face image by performing a comparison between the partial region of the first face image and the partial region of the second face image,
wherein said display controller overlays, on at least one of the first and second face images, a result of the comparison in accordance with a level of the acquired similarity, and displays at least one of the overlaid first face image and the overlaid second face image,
wherein said display controller overlays the result of the comparison on the at least one of the first and second face images, by overlaying, on the at least one of first and second face images, at least one of a first region the similarity of which exceeds a threshold and a second region the similarity of which does not exceed the threshold, and wherein said processor is further configured to
acquire a similarity between each pair of a partial region of a first face image and a partial region of the second face image by performing a comparison between the each pair of partial regions of the first face image and the second face image, and
said display controller
generates at least one of a first mark indicating a partial region the similarity of which exceeds the threshold and a second mark indicating a partial region the similarity of which does not exceed the threshold, and
generates display data by overlaying the at least one of the first mark and the second mark on one of the partial region of the first face image and the partial region of the second face image.

7. The display control apparatus according to claim 6, wherein said display controller comprises a mark storage that stores conditions for generating the first mark and the second mark and images for displaying the first mark and the second mark in association with each other.

8. The display control apparatus according to claim 6, wherein the first and second marks are represented by one of a symbol of a predetermined shape, a colored partial region, and a filled partial region.

9. The display control apparatus according to claim 6, wherein said display controller changes one of a size, a density, and a transparency of the first and second marks in accordance with a change of the similarity.

10. A display control method comprising:
acquiring a similarity between partial region of a first face image and a partial region of a second face image by performing a comparison between the partial region of the first face image and the partial region of the second face image; and
overlaying, on at least one of the first and second face images, a result of the comparison in accordance with a level of the acquired similarity, and displaying at least one of the overlaid first face image and the overlaid second face image,
wherein at least one of a similar portion including similar regions and a dissimilar portion including dissimilar regions, that have been determined in accordance with the level of the required similarity, is overlaid and displayed on the at least one of the first and second face images, and
wherein the similar portion and the dissimilar portion are overlaid and displayed in contrast with each other on the at least one of the face first and second images.

11. A non-transitory computer-readable storage medium storing a display control program for causing a computer to execute a method, comprising:
acquiring a similarity between a partial region of a first face image and a partial region of a second face image by performing a comparison between the each pair of partial region of the first face image and the partial region of the second face image; and
overlaying, on at least one of the first and second face images, a result of the comparison in accordance with a level of the acquired similarity, and displaying at least one of the overlaid first face image and the overlaid second face image,
wherein at least one of a similar portion including similar regions and a dissimilar portion including dissimilar regions, that have been determined in accordance with the level of the required similarity, is overlaid and displayed on the at least one of the first and second face images, and
wherein the similar portion and the dissimilar portion are overlaid and displayed in contrast with each other on the at least one of the face first and second images.

12. A face recognition system comprising:
an image capturer that generates a first face image;
an accumulator that accumulates a second face image;
a deriving unit that derives a similarity between a partial region of the first face image and a partial region of the second face image by performing a comparison between the partial region of the first face image and the partial region of the second face image;
a face recognizer that recognizes the first face image based on derived similarities of the partial region of the first face image and the partial region of the second face image;
a display unit that overlays, on at least one of the first face image and the second face image, a result of the comparison in accordance with a level of the derived similarity, and displays at least one of the overlaid first face image and the overlaid second face image;
a history unit that accumulates a result of recognizing the first face image and at least one of a similar portion including similar regions and a dissimilar portion including dissimilar regions in association with each other; and
a region generator that generates at least one of a region of interest interested in the collation processing and a region of non-interest interested in the comparison with reference to the accumulated history,
wherein said display unit overlays and displays at least one of the region of interest and the region of non-interest on at least one of the first face image and the second face image.

* * * * *